United States Patent [19]
Dupree et al.

[11] Patent Number: 5,949,994
[45] Date of Patent: Sep. 7, 1999

[54] DEDICATED CONTEXT-CYCLING COMPUTER WITH TIMED CONTEXT

[75] Inventors: Wayne P. Dupree; Jeff Lucas, both of Midland, Mich.; Gerrit Verniers, Moerbere-waas, Belgium; Larry Root; Steve Churchill, both of Midland, Mich.

[73] Assignee: The Dow Chemical Company, Midland, Mich.

[21] Appl. No.: 08/797,967

[22] Filed: Feb. 12, 1997

[51] Int. Cl.$^6$ .................................................. G06F 9/06
[52] U.S. Cl. .......................... 395/569; 395/672; 395/673
[58] Field of Search ................................. 395/569, 672, 395/673

[56] References Cited

U.S. PATENT DOCUMENTS

| | | | |
|---|---|---|---|
| 4,445,174 | 4/1984 | Fletcher | 711/121 |
| 4,992,934 | 2/1991 | Portanova et al. | 395/385 |
| 5,050,067 | 9/1991 | McLagan et al. | 395/678 |
| 5,099,414 | 3/1992 | Cole et al. | 395/200.37 |
| 5,261,109 | 11/1993 | Cadambi et al. | 395/291 |
| 5,371,849 | 12/1994 | Peaslee et al. | 345/501 |
| 5,410,722 | 4/1995 | Cornaby | 395/672 |
| 5,546,455 | 8/1996 | Joyce et al. | 379/265 |
| 5,640,519 | 6/1997 | Langendorf et al. | 395/291 |
| 5,715,409 | 2/1998 | Bucher et al. | 395/309 |
| 5,838,986 | 11/1998 | Garg et al. | 395/569 |

*Primary Examiner*—Mark R. Powell
*Assistant Examiner*—Jeffrey Allen Rossi
*Attorney, Agent, or Firm*—Harness, Dickey & Pierce, P.L.C.

[57] ABSTRACT

A dedicated context cycling microprocessor which features a plurality of input/output circuits for receiving and transmitting information and an individual set of dedicated on-board resources for each plurality of processing contexts. A distinct processing context is provided for each of a plurality of the input/output circuits, and a timed context is also provided for concurrently scheduling multiple processing contexts and enforcing time constraints associated with this schedule. The timed context has a pseudo-queue list which represents an ordered set of data parameters and program memory addresses for scheduling each of the processing contexts. The dedicated on-board resources include a plurality of registers for each of the processing contexts, such as at least one general purpose register and a program counter. A multiplexer circuit is also provided for moving data between the input/output circuits, the dedicated registers of the processing contexts and the computational unit. The input/output circuits include at least one serial and shared memory management unit, a plurality of embedded SCSI interfaces and a plurality of memory mapped registers. The dedicated context cycling microprocessor is also adapted to work in conjunction with, and effectively control another microprocessor, as well as control the access to an external memory system which is shared between these two microprocessors.

27 Claims, 27 Drawing Sheets

Fig-14A

Table 38 (COMBO):

| 39 | 38..37 | 36..35 | 34..33 | 32..30 | 29..28 | 27..25 | 24..21 | 20..18 | 17 | 16.15 | 14.13 | 12..8 | 7..0 |
|---|---|---|---|---|---|---|---|---|---|---|---|---|---|
| COMBO | INT CND | JMP TGT | COMP S2 | COMP OP | COMP S1 | MMU S2 | MMU OP | MMU S1 | GP3 | GP2 | GP1 | MOVE OPT. | PIMMED |
| 0 | 0.CD0<br>1.CD1<br>2.CD2<br>3.CD3 | 0.PC+1<br>1.PC+1+IM<br>2.GP3<br>3.0 | 0.GP2<br>1.IMG1<br>2.GP3<br>3.0 | 0.EQ<br>1.NEQ<br>2.GT<br>3.GTE<br>4.LT<br>5.LTE<br>6.S1@S2T<br>7.S1@S2F | 0.GP2<br>1.LRR<br>2.MVB<br>3.MMO | 0.GP1<br>1.GP2<br>2.GP3<br>3.LRR<br>4.+1<br>5.1'S<br>6.PIMMED<br>7.0 | 0.AND<br>1.OR<br>2.EXOR<br>3.+<br>4.−<br>5.*<br>6./<br>7.S1 IF CO ELSE S2<br>8.BSET@S2<br>9.BCLR@S2<br>A.BSUB AT S2 W/ CO<br>B.ROTATE/MERGE 8<br>C.CHKSUM<br>D.ENCR/DECR<br>E.DYNAMIC KEY<br>F.PARITY | 0.GP1<br>1.GP2<br>2.GP3<br>3.LRR<br>4.CP<br>5.MVBUS<br>6.PC+1<br>7.RAWIN | 0.NOA<br>1.MMO | 0.NOA<br>1.MMO<br>2.−1<br>3.MVB | 0.NOA<br>1.MMO<br>2.+1<br>3.LRR | | |

Table 40 (LIM):

| 39..38 | 37 | 36..34 | 33..31 | 30..28 | 27..26 | 25 | 24 | 23..20 | 19 | | | | 0 |
|---|---|---|---|---|---|---|---|---|---|---|---|---|---|
| INST TYPE | JMP TGT | MMU S2 | MMU OP | MMU S1 | GP3 | GP2 | GP1 | MOVE OPT | LIMMED | | | | |
| LIM 1 0 | 0.PC+1<br>1.MMO | 0.GP1<br>1.GP2<br>2.GP3<br>3.LINTO<br>4.LINT1<br>5.LFRC0<br>6.LFRC1<br>7.0 | 0.AND<br>1.OR<br>2.EXOR<br>3.+<br>4.−<br>5.*<br>6.R/M40<br>7.S2 | 0.GP1<br>1.GP2<br>2.GP3<br>3.LINTO<br>4.CP<br>5.MVBUS<br>6.PC+1<br>7.RAWIN | 0.NOA<br>1.MMO<br>2.PC+1<br>3.MVB | 0.NOA<br>1.MMO | 0.NOA<br>1.MMO | | | | | | |

| 39..38 | 37..36 | 35..34 | 33..31 | 30..29 | 28 | 27 | 20 | 19 | 0 |
|---|---|---|---|---|---|---|---|---|---|
| INST TYPE | JMP TGT | COMP S2 | COMP OP | COMP S1 | LRR | PIMMED | | LIMMED | |
| 0 | 0.PC+1<br>1.PC+1+IM<br>2.GP3<br>3.LI | 0.GP2<br>1.IMG1<br>2.GP3<br>3.0 | 0.EQ<br>1.NEQ<br>2.GT<br>3.GTE<br>4.LT<br>5.LTE<br>6.S1⊖S2T<br>7.S1⊖S2F | 0.GP2<br>1.LRR<br>2.CP<br>3.LINT0 | 0.NOA<br>1.LINT0 | | | | |
| LIC<br>1 1 | | | | | | | | | |

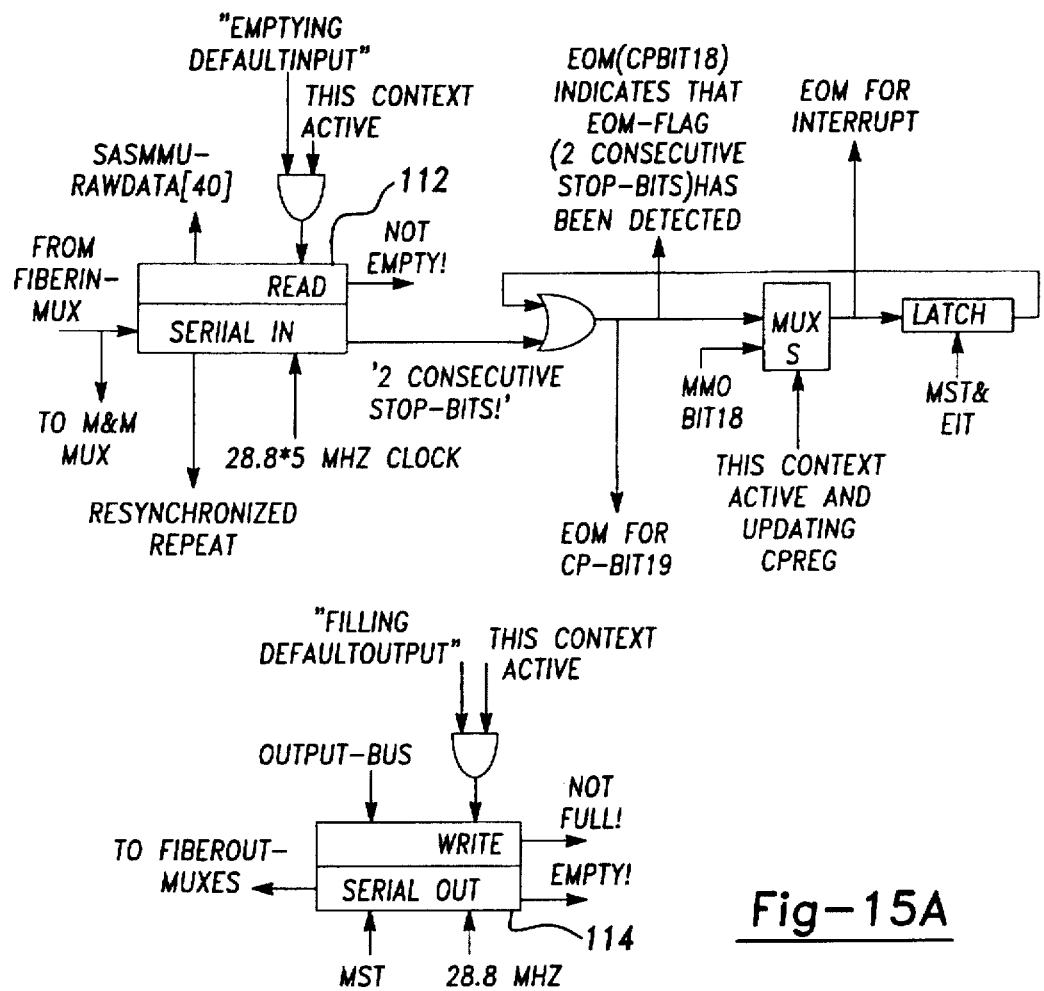
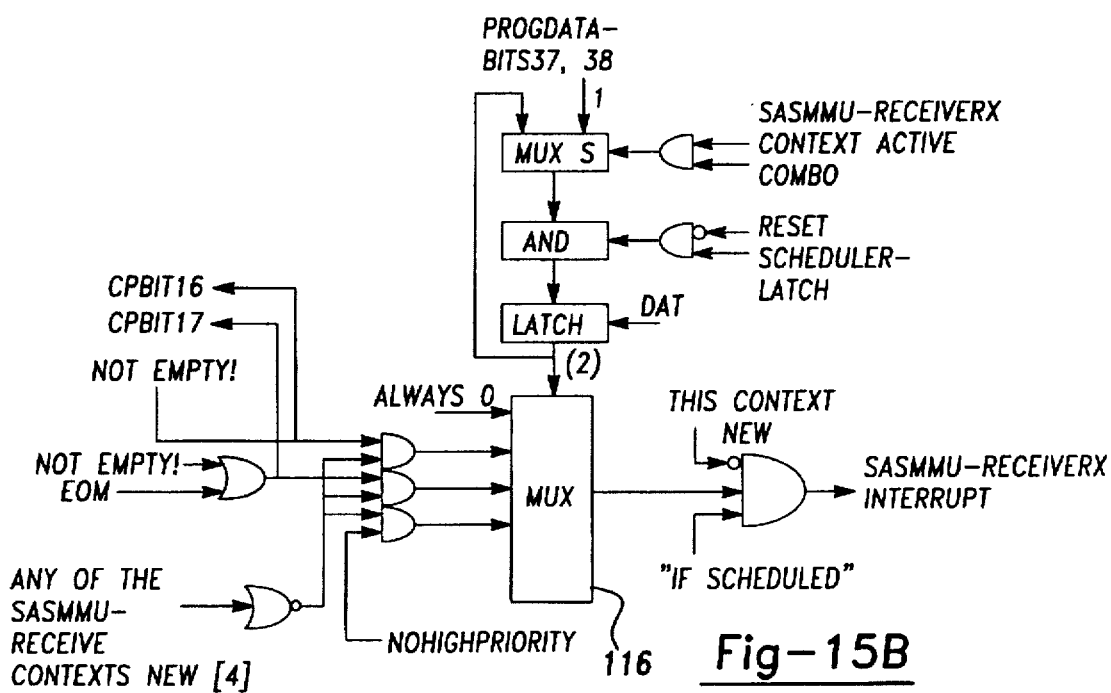
Fig-15A
Fig-15B

DEDICATED CONTEXT-CYCLING COMPUTER WITH TIMED CONTEXT

BACKGROUND OF THE INVENTION

The present invention generally relates to computer architectures and particularly to a dedicated context-cycling microprocessor which is capable of functioning as either a stand-alone processor or as an intelligent interface between one or more external devices and the shared data memory of another computer, such as a Harvard architecture computer.

To achieve high speed, some multiprocessor computers employ specialized dedicated processors for handling specific tasks. For example, it is common to supplement the main central processing unit with a separate math coprocessor, the math coprocessor being specifically designed to perform arithmetic computations at high speed. Although the math coprocessor may perform different computational functions (add, subtract, multiply, divide) these functions are all of the same type or class. A math coprocessor would not be suitable to handle asynchronous data communication in addition to its other arithmetic functions. The math coprocessor is an example of a special purpose processor for a multiprocessor architecture that is dedicated to performing only one task.

As multiprocessor computer systems become more sophisticated, single purpose coprocessors begin to have drawbacks. It would be desirable if multiprocessor systems could be designed to support different classes of tasks by the coprocessor. For example, The Dow Chemical Company has developed a common core computer that employs a Harvard architecture computer as its main central processing unit. The Applicants' assignee has found the Harvard architecture to be highly desirable in process control applications where high speed performance is of utmost importance. The context-cycling microprocessor of the present invention works as an asynchronous data communication handler for this Harvard architecture common core computer.

A computer which includes the following characteristics is generally referred to as having a "Harvard" architecture. Namely, the computer will be designed with separate instruction and data stores and independent buses will be provided to enable the central processing unit (CPU) of the computer to communicate separately with each of these stores. Contrast this architecture with the "von Neumann" or "Princeton" based computer architecture, which generally employs the same physical store for both instructions and data, and a single bus structure for communication with the CPU.

Various approaches have been taken to designing a microcomputer or microprocessor with a Harvard architecture, as represented by the following patents: Yasui et al., U.S. Pat. No. 5,034,887, issued on Jul. 23, 1991, entitled "Microprocessor With Harvard Architecture"; Portanova et al., U.S. Pat. No. 4,992,934, issued on Feb. 12, 1991, entitled "Reduced Instruction Set Computing Apparatus And Methods"; Mehrgardt et al., U.S. Pat. No. 4,964,046, issued on Oct. 16, 1990, entitled "Harvard Architecture Microprocessor With Arithmetic Operations And Control Tasks for Data Transfer Handled Simultaneously"; and Simpson, U.S. Pat. No. 4,494,187, issued on Jan. 15, 1985, entitled "Microcomputer With High Speed Program Memory." Additionally, it should be noted that the Intel i860 64-bit microcomputer has been described as having an on-board Harvard architecture due to the provision of separate instruction and data cache paths. In this regard, a description of the Intel i860 chip design may be found in i860 *Microprocessor Architecture*, by Neal Margulis, Osborne McGraw-Hill 1990.

The use of separate instruction and data communication paths in a Harvard architecture machine effectively increases the overall speed of the computer by enabling an instruction to be accessed at the same time that data for this or another instruction is accessed. In the context of programmed operations, the instruction is usually referred to as the "opcode" (the operation code), and the data is referred to the "operand." While the benefit in speed of using the Harvard architecture is significant, a significant advance in this design has also been described in commonly assigned Sederlund et al., U.S. patent application Ser. No. 08/319,453, filed on Oct. 6, 1994, entitled "An Extended Harvard Architecture Memory System." This extended memory system employs an address store for containing an ordered sequence of program memory addresses. The address store (referred to as "queue memory") determines the sequence of operations to be implemented through its list of program memory addresses. In this regard each of these program memory addresses identifies the location of the first instruction of a particular subroutine which is contained in the program memory. The address store may also contain the addresses of one or more subroutine arguments which are, in turn, contained in either a value store or in a data memory. Thus, the address store may be utilized as a location server for both the program memory and the data memory of a computer which is based upon the Harvard architecture.

As the preceding suggests, The Dow Chemical Company is committed to the use of highly advanced computer systems that are uniquely suited to process control applications. In this regard, whereas the massively multiplexed CPU design, based on a Harvard architecture, is highly efficient at performing process control instructions at very high speed, another computer architecture is needed to best handle numerous asynchronous events that occur in process control applications. In this regard, although The Dow Chemical Company envisions its massively multiplexed CPU design and the dedicated context-cycling computer of the present invention to be well suited to chemical and manufacturing process applications, the foregoing innovations are equally suited to all other types of process control applications, ranging from power plant to spacecraft.

The present invention provides a dedicated context-cycling microprocessor or computer for handling the input and output tasks on behalf of its associated Harvard architecture central processing unit. As it turns out, providing this functionality is not as easy as it might appear. In a complex process control system there are many widely varying input/output functions and asynchronous events that must be handled. Inasmuch as the main process control computer has been designed to operate at extremely high speeds, the input/output functions must also be handled at comparable high speeds, otherwise the input/output becomes a bottleneck in the system. One approach, consistent with conventional practice, would be to provide a separate coprocessor for each input/output function. However, this would dramatically increase the cost of the system and would unduly complicate the interface between the main processor and the input/output processors.

Another approach would be to employ a single coprocessor that may be programmatically cycled through different functional states. However, such an approach has not heretofore been feasible because of the computational overhead required to save one context state before operating the next.

The present invention solves the problem by providing a dedicated context-cycling microprocessor that has dedicated registers and program counters for each different functional context. As used herein the term "context" (within a processor) refers to a specialized physical circuit having a dedicated program counter to identify the current location in a program instance for fetching an op code for execution in a computational unit—such as the computational unit of a general purpose computer processor. The specialized physical circuit is useful for exchanging data between external entities and the configuration and computational assets of the processor (including the computational unit) according to a predefined protocol, or for performing predefined data manipulation functions. The context may also include an embedded state machine that may operate independently of the computational unit to aid in the exchange of data.

In the preferred configuration, a plurality of contexts share common assets, such as by time division multiple access, each context cycling through active and inactive states according to a context priority scheme. Common assets are assets actively used by only one context at a time (such as, without limitation, external data memory, computational unit, comparator, program counter calculator and local memory). Each context assumes one of a plurality of functional states, including at least one active state and at least one inactive state. In the active state the context may communicate with the computational unit and may also use other common assets. In the inactive state, the embedded state machine of a context may continue to function although the program counter of its context is not being used to identify an op code for the manipulation of configuration and computational assets. Each context has a data store, such as a memory or register, for retaining the process and configuration state of pertinent resources, attributes, or aspects associated with either the interface or the function while another context is active. In the preferred embodiment, each context is configured as an embedded microcontroller associated with a processor for performing mathematical computatations.

The context-cycling microprocessor rapidly cycles from context to context without the usual overhead of saving state; the dedicated registers and program counters automatically save state without wasting processor cycles as in the conventional practice.

Accordingly, it is a principal objective of the present invention to provide a microprocessor design which has special capabilities for handling input/output and asynchronous events.

It is a more specific objective of the present invention to provide a microprocessor design which is capable of dynamically cycling between a number of both device and time handling contexts.

It is another objective of the present invention to provide a context-cycling microprocessor design which may be utilized in either a stand-alone processor or as an intelligent communication interface for another processor which operates as the source and destination of data.

It is a further objective of the present invention to provide a context-cycling microprocessor design which is capable of acting as a time-line enforcer.

It is an additional objective of the present invention to provide a context-cycling microprocessor design which is also capable of acting as a plurality of distinct, but coordinated controllers for processing communication requests with external devices.

It is also an objective of the present invention to provide a context-cycling microprocessor design which is capable of not only rapidly handling external communication requests, but also capable of managing a shared memory system in conjunction with another microprocessor.

SUMMARY OF THE INVENTION

To achieve the foregoing objectives, the present invention provides a dedicated context-cycling microprocessor which features a plurality of input/output circuits for receiving and transmitting information and an individual set of dedicated on-board resources for each of a plurality of processing contexts. A distinct processing context is provided for each of a plurality of the input/output circuits and a timed context is also provided for concurrently scheduling multiple processing contexts and enforcing time constraints associated with this schedule. The timed context has a pseudo-queue list which represents a time-ordered set of data parameters and program memory addresses for scheduling each of the processing contexts. Each of the processing contexts may also employ their own pseudo-queue list of parameters which are needed to accomplish a specific context task. The dedicated on-board resources include a plurality of registers for each of the processing contexts, such as at least one general purpose register and a program counter. Accordingly, each of these processing contexts is capable of operating as a separate controller which is unaware of the other controllers, except for the timed context which has access to the program counters for all of the other processing contexts. In other words, the context-cycling microprocessor according to the present invention is capable of operating as many separate controllers, each with its own set of hardware assets. The cycling between these separate processing contexts is controlled through a scheduling pseudo-queue and priority bidding, such that the context is capable of fire and forget operation. In other words, the context-cycling microprocessor may turn its attention to another processing context before the currently active processing context has completed its task. In one form of the present invention, only one context is active (running an instruction) at any particular time because these contexts do share certain resources, such as an on-board computational unit as well as externally accessible memories.

The dedicated context-cycling microprocessor according to the present invention preferably includes at least one computational unit for performing mathematical and/or logical operations, a bus structure for transferring instructions and data with external memory systems and a multiplexer circuit for moving data between the input/output circuits, the dedicated registers of the processing contexts and the computational unit. In one form of the present invention the bus structure is a multiplexed program/data bus and the multiplexer circuit includes an internal move bus which is connected for output to the multiplexed program/data bus. The input/output circuits include at least one serial and shared memory management unit, which is comprised of parallel-to-serial transmitter and serial-to-parallel receiver circuits that are capable of communicating a plurality of serial word frames without any dead time between them. The input/output circuits also include a plurality of embedded SCSI interfaces and a plurality of internal and/or external memory mapped registers.

The dedicated context-cycling microprocessor is also adapted to work in conjunction with and effectively control another microprocessor, as well as control the access to an external memory system which is shared between these two microprocessors. In this regard the context-cycling microprocessor is capable of immobilizing the other microprocessor through one or more timing signals. In one form of the present invention the context-cycling microprocessor is capable of directly transferring information which has been received at one of its input circuits to the shared memory of this microprocessor. In the event that the shared memory system is currently being used by the other microprocessor, then the data will be maintained in a registered transceiver until the shared memory becomes available.

Additional features and advantages of the present invention will become more fully apparent from a reading of the detailed description of the preferred embodiment and the accompanying drawings in which:

BRIEF DESCRIPTION OF THE DRAWINGS

FIGS. 14A and 14B are charts illustrating the instruction types utilized by the context-cycling microprocessor.

FIGS. 15A–15E provide a set of detailed block diagrams for the serial and shared memory management units shown in FIG. 3.

DETAILED DESCRIPTION OF THE PREFERRED EMBODIMENTS

Common Core Computer Overview

Figure 1:
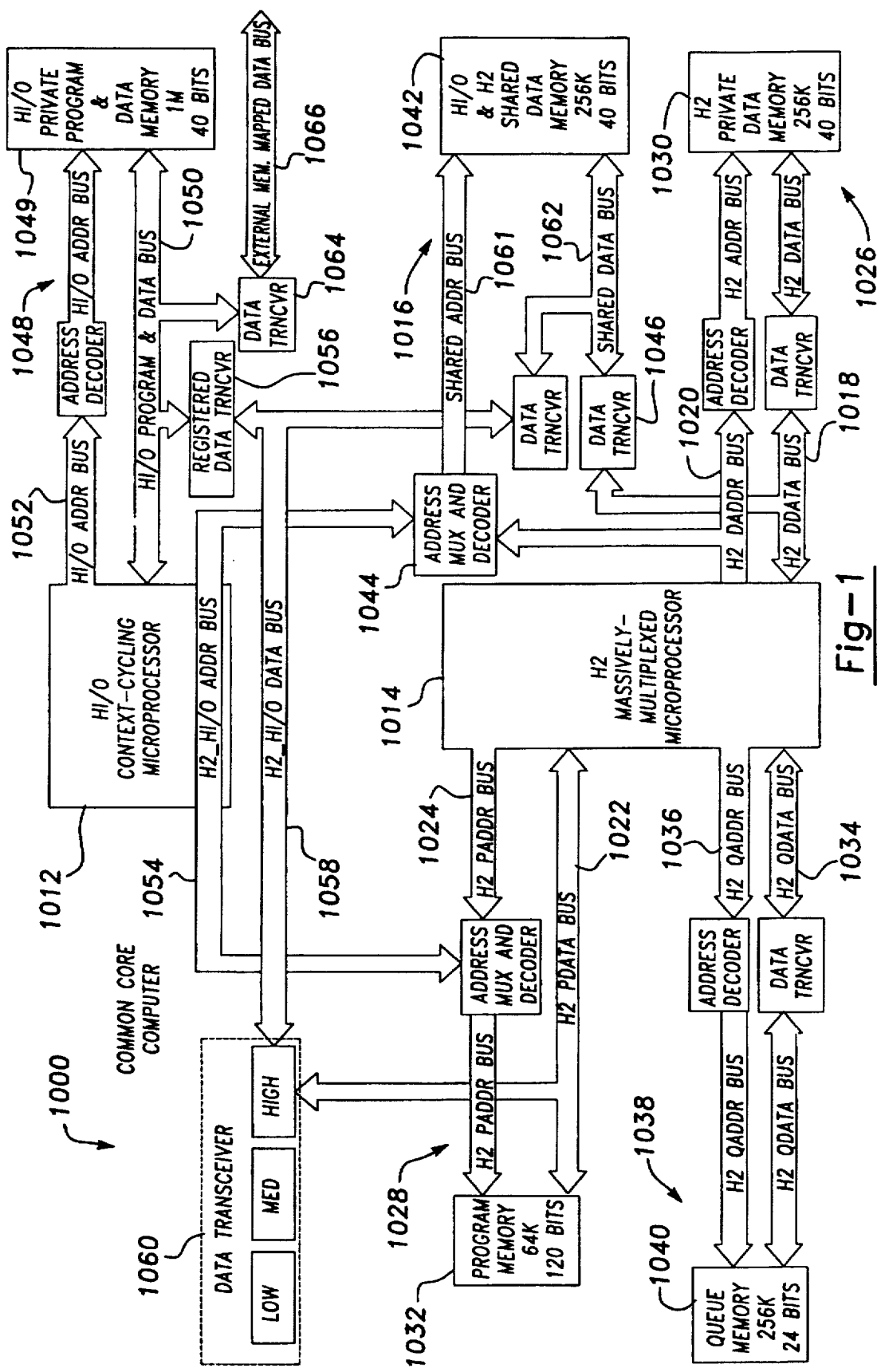
FIG. 1 is a block diagram of a Harvard architecture-based common core computer which employs a context-cycling microprocessor according to the present invention.

Referring to FIG. 1, a block diagram of a common core computer 1000 is shown. In particular, the common core computer 1000 features a dedicated context-cycling microprocessor 1012 according to the present invention. The common core computer 1000 further includes a Harvard architecture microprocessor 1014 and a shared memory system 1016. For sake of simplicity, the Harvard architecture microprocessor 1014 is generally referred to herein as the "H2" microprocessor. Similarly, the dedicated context-cycling microprocessor 1012 is also generally referred to herein as the "HI/O." However, it should be noted that the HI/O microprocessor 1012 is sometimes referred to as the "HarvI/O" microprocessor in the drawings.

While the HI/O microprocessor 1012 is designed for use as a stand-alone processor, FIG. 1 specifically serves to illustrate how the HI/O microprocessor 1012 may advantageously be used to work with another microprocessor. In this particular embodiment, the HI/O microprocessor 1012 is used to provide an intelligent interface between the shared memory system 1016 of the H2 microprocessor 1014 and external devices. For example, the H2 microprocessor 1014 may be used in a process control computer which receives input signals from a number of field sensors and determines the output signals needed to drive the physical equipment that governs the process, such as pumps and valves. In such a case, the H2 microprocessor 1014 is the eventual destination of all field input data and source of all field output data. Accordingly, the design of the H2 microprocessor 1014 should focus on rapidly executing the instructions needed to process the various input signals received. Nevertheless, the need exists to transmit both input and output data from the H2 microprocessor 1014 to other external devices, such as a computer network which includes one or more operator stations for supervising the process being controlled. Thus, the HI/O microprocessor 1012 has been designed with exceptional capabilities for rapidly managing asynchronous events, such as communication requests for data from the H2 microprocessor 1014 and other external computer communication and computation entities. The design of the common core computer 1000 capitalizes on the signal transfer capabilities of the HI/O microprocessor 1012 as will be more fully appreciated below.

In the embodiment of the common core computer 1000 illustrated in FIG. 1, the H2 microprocessor 1014 is shown to be of a Harvard architecture design which utilizes an expanded memory system. As generally provided in a Harvard architecture-based design, the H2 microprocessor 1014 includes separate data and program bus structures. Specifically, the H2 microprocessor 1014 includes data bus 1018 (DDATA), a data address bus 1020 (DADDR), a program data bus 1022 (PDATA) and a program address bus 1024 (PADDR). The data bus 1018 and the data address bus 1020 are used to provide read/write communication with an external data memory system 1026 while the program data bus 1022 and the program address bus 1024 are used to provide read/write communication with an external program memory system 1028. The data memory system 1026 includes a private data memory circuit 1030, while the program memory system provides a physically separate program memory circuit 1032.

Preferably, the H2 microprocessor 1014 also includes a queue data bus 1034 (QDATA) and a queue address bus 1036 (QADDR) for communicating with an external queue memory system 1038. The queue memory system 1038 includes a queue memory circuit 1040 which is used to store an ordered list of program memory addresses (as well as subroutine arguments). Each of these program memory addresses generally represents the initial address of a distinct subroutine which has been stored in the program memory circuit 1032. In other words, the H2 microprocessor 1014 is preferably programmed to proceed sequentially down through the "queue list" found in the queue memory circuit 1040 in order to execute the instructions which are contained in the subroutines stored in the program memory circuit 1032. This approach has several advantages, such as significant decrease in the amount of memory required to store an application program for the computer. Additionally, execution speed may be enhanced because normal subroutine overhead is avoided, such as pushing one or more addresses onto a stack. Additional subroutine arguments may be readily changed by a programmer without having to recompile the program. Rather, the argument value may be changed directly in the memory location referenced in queue memory circuit 1040.

The H2 microprocessor 1014 is preferably constructed of a central processing unit design such as that described in the U.S. patent application Ser. No. 08/179,256, entitled "A Massive Multiplexed Super Scalar Harvard Architecture Computer." However, the common core computer 1000 may also employ other types of microprocessor designs in the appropriate application, such as those based upon the Harvard architecture. In this regard, the use of separate data/program bus structures in a Harvard architecture facilitates the use of a data memory that may be shared with at least one other computer entity without unduly complicating the operational constraints on the microprocessor or adversely affecting its processing throughput.

A fundamental departure in Harvard architecture design is described in commonly assigned Dupree et al., U.S. patent application Ser. No. 08/179,256, filed on Jan. 10, 1994, entitled "A Massive Multiplexed Super Scalar Harvard Architecture Computer." This massively multiplexed CPU employs a very wide instruction word format which eliminates the need for microcode decoding or even an instruction register and parallel processing to achieve compound super-scalar operations. More specifically, this CPU employs a plurality of independent computational circuits, a separate internal result bus for transmitting the resultant output from each of these computational circuits, and a plurality of general purpose registers coupled to each of the computational circuits. Each of the general purpose registers has multiplexed input ports which are connected to each of the result buses. Each of the general purpose registers also has an output port which is connected to a multiplexed input port of at least one of the computational circuits. Each of the computational circuits is dedicated to at least one unique mathematical function and at least one of the computational circuits includes at least one logical function. At least one of the computational circuits includes a plurality of concurrently operable mathematical and logical processing circuits and an output multiplexer for selecting one of the resultant outputs for transmission on its result bus. The very long instruction word format uses a series of assigned bit locations to represent the selection and operation codes for each of the CPU components. These selection codes are directly transmitted to each of the CPU components by a program control circuit. A separate data control circuit and data bus are further provided to achieve a Harvard architecture design for the CPU.

Shared Memory System and Bus Structure

As illustrated in FIG. 1, the shared memory system 1016 includes a shared data memory circuit 1042 which has the same 40-bit word width as the private data memory circuit 1030 of the H2 microprocessor 1014. In some of the Figures, word width is indicated by brackets ||. The H2 microprocessor 1014 may either write to or read from the shared data memory circuit 1042 or the private data memory circuit 1030 depending upon the appropriate control signals, such as a memory enable signal and a write/read opcode bit. In the present embodiment, the H2 microprocessor 1014 transmits these memory control signals (for example, the shared active opcode bit) to the HI/O microprocessor 1012, which is responsible for deciding which device will actually be given access to the shared data memory circuit 1042. However, with such a configuration, it is preferred that the H2 microprocessor be given priority to the shared data memory circuit 1042 over the HI/O microprocessor 1012.

The data memory circuit 1030 is characterized as private; it is considered private by the H2 microprocessor 1014. However, other entities may access this memory as well. In other words, as long as access to the data memory circuit 1030 is transparent to the H2 microprocessor 1014, other external computer entities may also have access to this memory.

As with the other memory systems discussed thus far, the shared memory system 1016 includes an address decoder/buffer circuit 1044. Similarly, the shared memory system 1016 also includes a transceiver circuit 1046. The address decoder/buffer circuit 1044 is used to extract an 18-bit address from the 24-but wide data address bus 10 and store this address in a latch. The transceiver circuit 1046 is used to control the direction, destination and source of data transfer to or from the shared data memory circuit 1042 in response to the write/read control signal controlled by the HI/O microprocessor 1012 (namely the H2SharedR/W signal shown in FIG. 2). In one embodiment according to the present invention, the address decoder/buffer circuit 1044 is comprised of three FCT157 muxes and an FCT157 3-to-8 decoder circuit and FCT244 buffers, all from Integrated Device Technology, Santa Clara, Calif. Similarly, the transceiver circuit 1046 may be comprised of five FCT245 transceiver circuits from Integrated Device Technologies. However, as with the other components specifically referenced herein, it should be appreciated that other suitable circuit devices could be employed in the appropriate application.

The HI/O microprocessor 1012 is also shown in FIG. 1 to include its own private memory system 1048 employing private program and data memory circuits 1049. While the HI/O microprocessor 1012 could be constructed to have a Harvard architecture like that of the H2 microprocessor 1014, the presently preferred HI/O microprocessor utilizes a multiplexed program/data bus structure. In this regard, the multiplexed program/data bus structure is comprised of the 40-bit wide program and data bus 1050 and the 20-bit wide program and data address bus 1052. Such a multiplexed bus structure was employed in order to reduce the number of input/output pins needed by the HI/O microprocessor 1012 in light of the significant number of input/output circuits designed into the HI/O microprocessor, as will be discussed more fully below.

The HI/O microprocessor 1012 also includes a separate 24-bit wide H2_HI/O address bus 1054 for use in accessing either the shared memory system 1016 or the program memory system 1028 of the H2 microprocessor 1014. The separate address bus is used in the HI/O microprocessor 1012 to enable the HI/O microprocessor to complete a shared memory operation (delayed due to instruction skew and possible access by the H2 microprocessor 1014), and still allow the HI/O microprocessor to execute other instructions. This works as follows. Once the H2 microprocessor 1014 has completed its access to the shared data memory circuit 1042, an H2 opcode bit is cleared, informing the HI/O microprocessor that H2 will not be doing a shared memory operation during the next instruction period, and HI/O is clear to initiate a shared access of its own. The HI/O microprocessor 1012 preferably employs a 40-bit opcode which corresponds to the data word width of the H2 microprocessor 1014, as well as a one-third segment of the 120-bit instruction word format employed in the H2 microprocessor 1014. It should be understood that the design of a context-cycling microprocessor according to the present invention is not limited to any particular data/address bit width combination. While the HI/O microprocessor 1012 could also be provided with a Queue memory system like the Queue memory system 1038 for the H2 microprocessor 1014, a Queue memory system is more advantageous for the H2 microprocessor, due to the regularity in which the H2 microprocessor calls routines on a repeated basis.

In order for the HI/O microprocessor 1012 to access either the shared memory system 1016 or the program memory system 1028 of the H2 microprocessor 1014, a registered transceiver 1056 is also connected to the program and data bus 1050. In one embodiment according to the present invention, the registered transceiver is comprised of five 29FCT52 devices from Integrated Device Technology. This particular transceiver has a pair of internal latches which are interconnected front-to-back for storing and controlling the bidirectional flow of data. The HI/O microprocessor 1012 is capable of loading the program memory circuit 1032 of the H2 microprocessor 1014 with a programmed set of instructions through the circuit created by program and data bus 1050, the registered transceiver 1056, the H2_HI/O data bus 1058, the data transceiver 1060 and the program data bus 1022, with the addresses being transmitted on the H2_HI/O address bus 1054. Similarly, the HI/O microprocessor 1012 is capable of reading input and output signal data stored in the shared data memory circuit 1042 through the circuit created by program and data bus 1050, the registered transceiver 1056, the H2_HI/O data bus 1058, the transceiver circuit 1046 and the shared data bus 1062 with the addresses being transmitted on the H2_HI/O address bus 1054 (through address decoder/buffer circuit 1044 to shared address bus 1061).

FIG. 1 also shows that another data transceiver 1064 may be connected to the HI/O program and data bus 1050. The transceiver 1064 is used to facilitate external access to the HI/O's program and data bus 1050, such as through the HI/O external memory mapped data bus 1066. For example, such external access may be used for memory mapped devices, such as a debug panel (for reading a key depressed on the panel or writing to an LCD display).

Figure 10A:
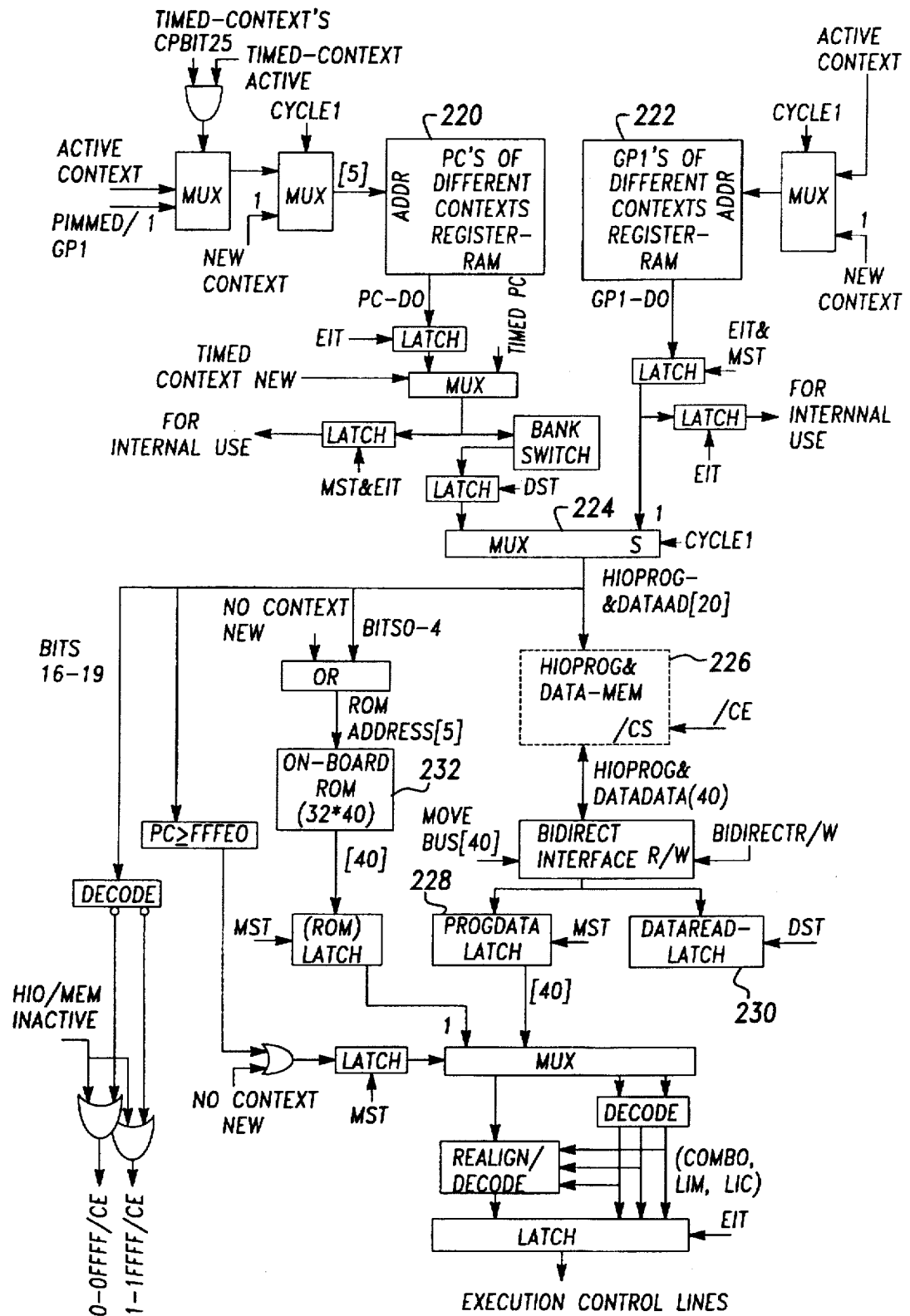
FIG. 10A is a detailed block diagram of the multiplexed program/data bus structure shown in FIG. 3.

Before proceeding with a further description of the context-cycling processor, a deeper understanding of the bus structure and memory architecture may be helpful. In FIG. 10A a detailed block diagram of the multiplexed program/data bus structure is shown; and in FIG. 10B, a detailed block diagram is shown of the bank switching functionality whereby memory may be rapidly bank switched by changing the value of bits 23 through 20 of internal memory mapped register at local RAM address FA.

Figure 10B:
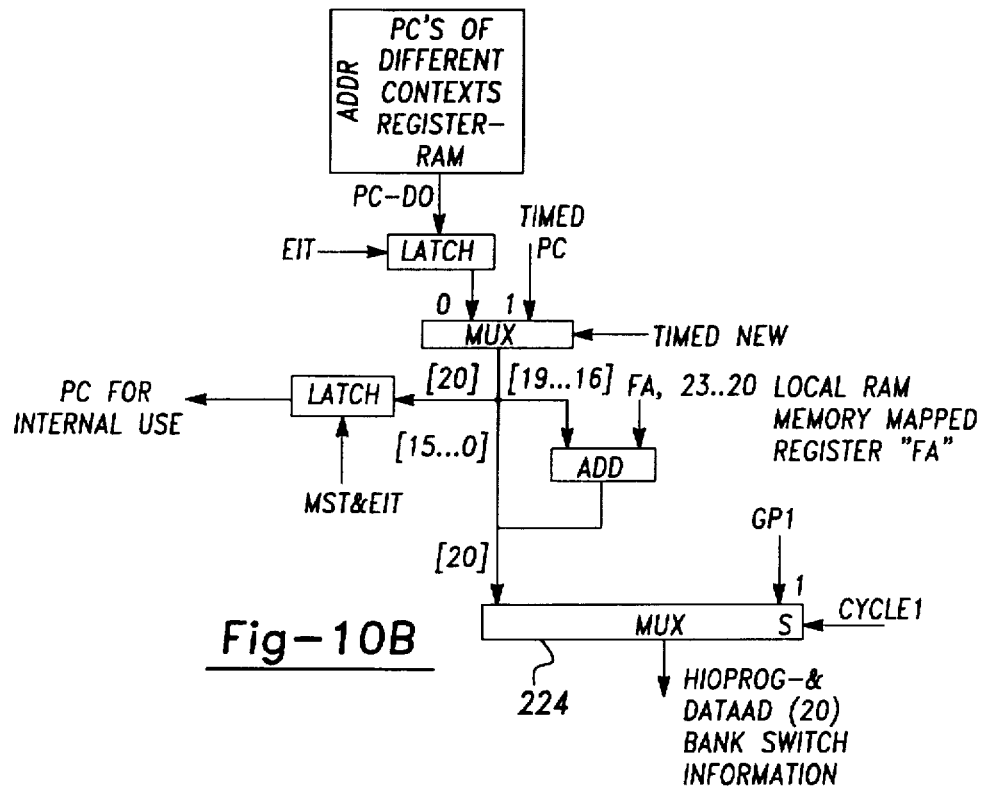
FIG. 10B is a detailed block diagram of the bank switch circuit of the preferred embodiment.

Referring to FIG. 10A, the GP1 register and the program counter are multiplexed to supply the data and PC addresses, respectively, to external RAM. Note how the program counters of different contexts 220 and the GP1 registers 222 are ultimately multiplexed through multiplexer 224. The data read from RAM memory 226 is distributed to the opcode latch 228 and the data read latch 230. In this embodiment when the processor is accessing memory in the internal ROM range of program memory (above FFFEO) a value from onboard ROM 232 is substituted as the opcode. Bank switching is implemented in the presently preferred embodiment. Referring to FIG. 10B the circuitry to accomplish this is illustrated. The bank switching information is supplied as the output of multiplexer 224. Bank switching is used to allow quick switching to a different block of memory within the HI/O processor. This allows parallel programs to be available concurrently inside the HI/O processor. To toggle between these two programs all that must change is the 4 bits (bits 20–23) and these bits are added to the upper 4 bits of the program counter of every instruction that runs. By writing to these 4 bits, the system automatically bank switches, allowing the other parallel program to operate. This enhances the speed of the system in a program load situation.

Figure 2:
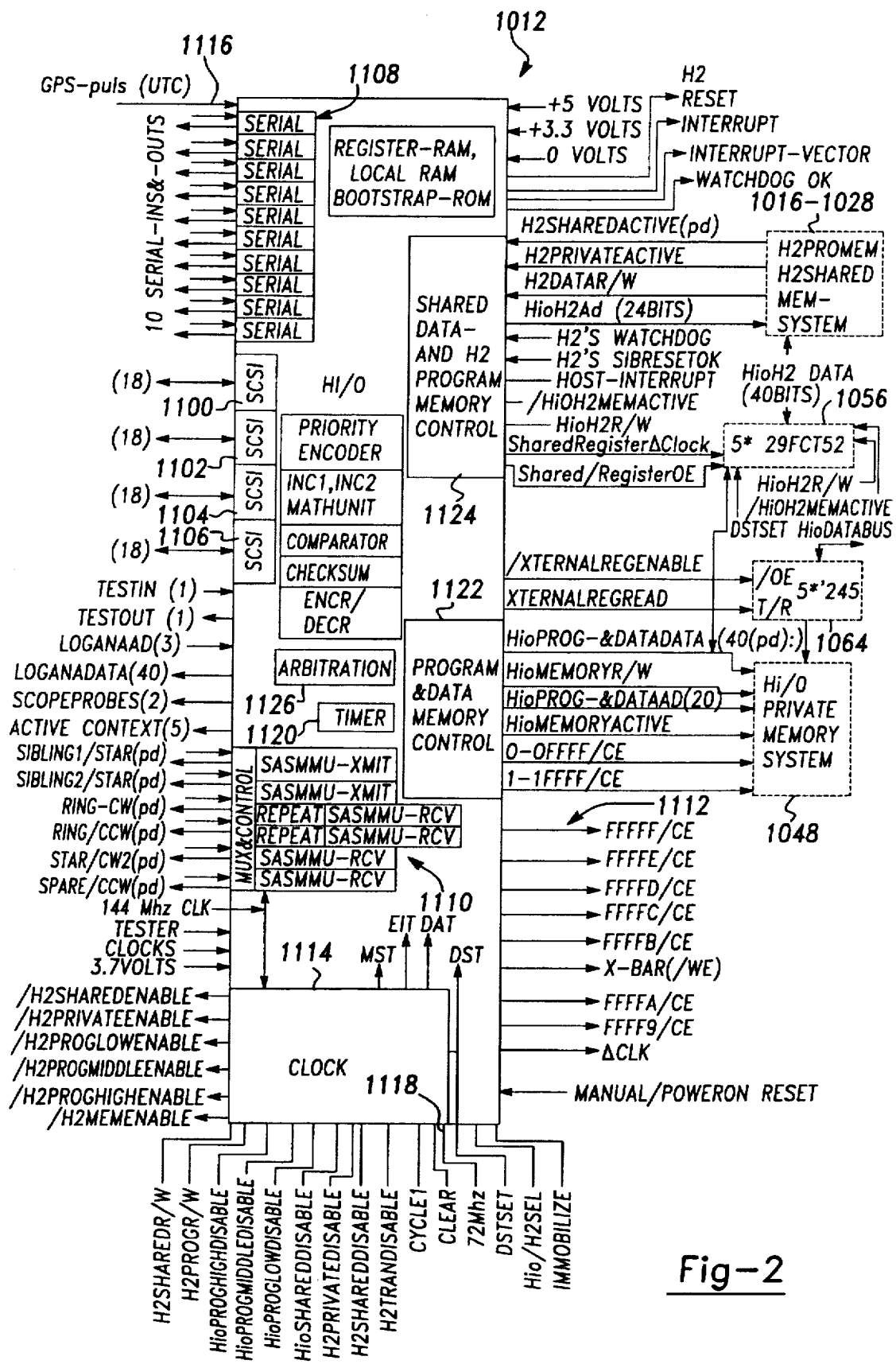
FIG. 2 is a simplified block diagram of the context-cycling microprocessor shown in FIG. 1.

A program and data memory control circuit 1122 is provided for controlling the HI/O private memory system 1048 (shown in phantom in FIG. 2). Similarly, a shared data and H2 program memory control circuit 1124 is provided for controlling both the shared memory system 1016 and the program memory system 1028 of the H2 microprocessor 1014 (shown together in phantom in FIG. 2). In this regard, each of the memory system control signals generated by the HI/O microprocessor 1012 are identified in FIG. 2. The HI/O microprocessor 1012 also includes several other circuits, which are illustrated in FIG. 2, but are best seen in FIG. 3.

Context-Cycling Processor

Referring to FIG. 2, a simplified block diagram of the HI/O microprocessor 1012 is shown. In this regard, the HI/O microprocessor 1012 includes a substantial number and variety of input and output circuits which are embedded into this single chip central processing unit. While the principles of the present invention are not limited to a single chip implementation, the ability to include all of the I/O functionality of the HI/O microprocessor 1012 into a single integrated circuit chip is considered to be advantageous. In one embodiment according to the present invention, the HI/O microprocessor 1012 may be constructed through the use of a large scale Application Specific Integrated Circuit (ASIC). An ASIC is a type of integrated circuit which includes a significant number of logic gates that may be connected together to perform specific circuit functions. For example, the HI/O microprocessor 1012 may be embodied in a 391 pin package, 100K ASIC device by LSI Logic Corp., Milpitas, Calif. This particular ASIC device contains well over 100,000 gates that may be combined together to form a variety of different circuits. However, it should be appreciated that other suitable integrated circuit technologies may be employed to construct HI/O microprocessor 1012 in the appropriate application, including a fully custom integration.

With respect to its input/output circuit capabilities, the HI/O microprocessor 1012 includes a set of four "small computer system interface" SCSI circuits 1100–1106. A SCSI circuit is a high speed parallel interface that generally conforms to the X3T9.2 standard promulgated by the Committee of the American National Standards Institute (ANSI). Each of these SCSI circuits may be used to connect the HI/O microprocessor 1012 to a number of external peripheral devices, such as magnetic disk drives, optical disk drives and printers. The HI/O microprocessor 1012 also includes a set of ten serial input/output circuits 1108 for 8-bit serial communication with such devices as modems, a mouse, keyboards, printers and even other computers. These serial circuits may also be used to gather input signals from and distribute output signals to a network of remote field computer units, such as the type of multitiered network described in the Glaser et al., U.S. patent application Ser. No. 07/864, 931, filed on Mar. 31, 1992, entitled "Process Control Interface System Having Triply Redundant Remote Field Units."

The HI/O microprocessor 1012 further includes a set of six serial and shared memory management unit (SASMMU) circuits 1110. The SASMMU circuits 1110 are parallel-to-serial and serial-to-parallel converters for transmitting and receiving information at a serial baud rate of 28.782 mega baud. At this extremely high baud rate, a 40-bit word will be received every 1.4 microseconds. Separate SASMMU circuits 1110 are used for transmitting and receiving in order to maximize the information transfer capabilities of the HI/O microprocessor 1012. Details of these circuits are shown in FIGS. 15A–15E.

Figure 15C:
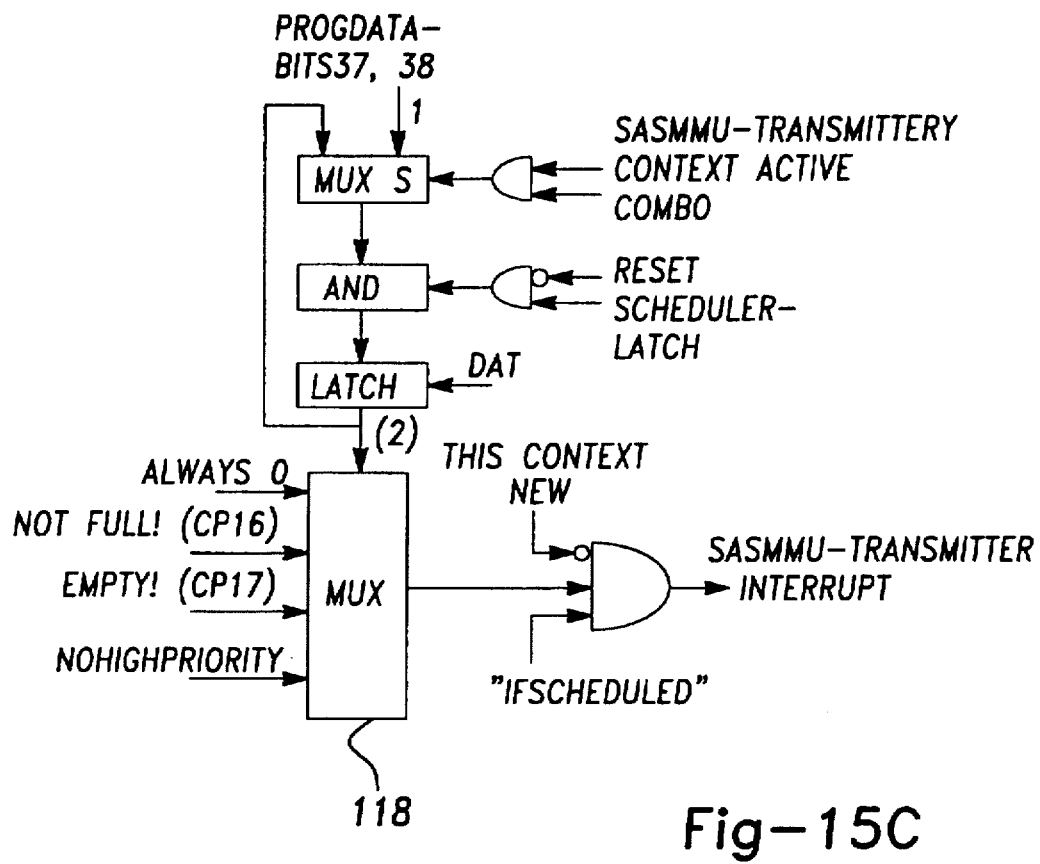

Referring to FIGS. 15A–15E, the SASMMU circuits are seen in more detail. FIG. 15A shows a SASMMU input register 112 and a SASMMU output register 114. The interrupt multiplexers for a SASMMU receiver are shown in FIG. 15B at 116. The interrupt multiplexer for a SASMMU transmitter is shown at 118 in FIG. 15C. Note that program data bits 37 and 38 of a COMBO instruction type are used (for both transmitter and receiver) to select what the interrupt source will be until changed again. (A COMBO instruction is one of several different types of opcode instructions described below.)

The context cycling processor assigns priorities to different contexts to determine which context should be run next. The different priorities ensure that no data are lost. The SASMMU contexts are ordinarily assigned a very high priority because of the very high serial baud rate. However, the SASMMU contexts can programmatically reduce their effective priority to allow other lower priority contexts to utilize processor cycles.

Figure 15E:
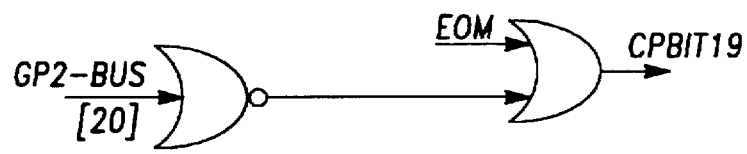
Figure 15D:
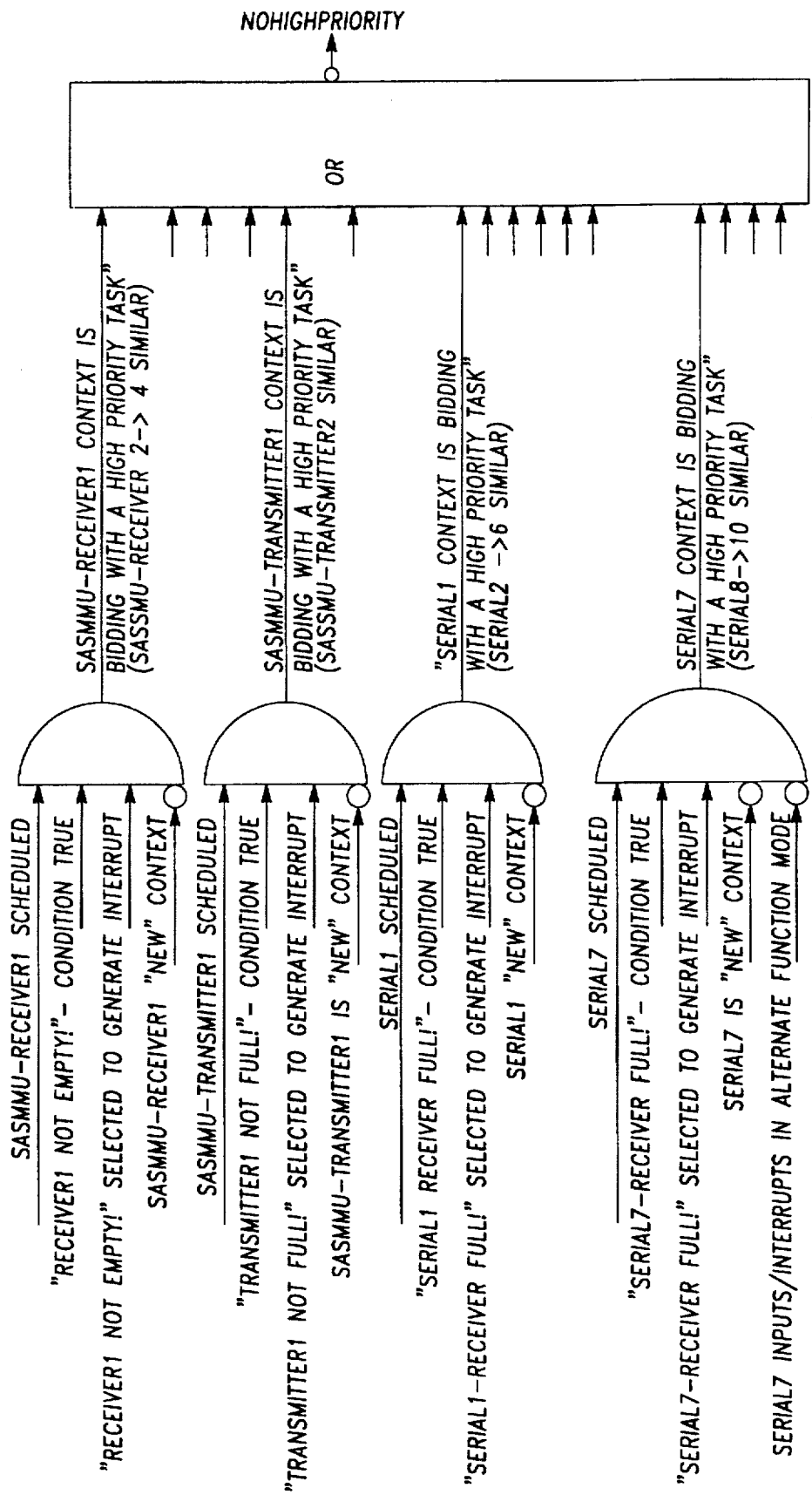

FIG. 15D shows how SASMMU contexts can effectively lower their priority by choosing an interrupt source referred to as "no high priority." Normally, SASMMUs are considered very high priority (due to the very high data transfer rates). By running SASMMU contexts, other contexts of lower priority can be effectively blocked from performing any operations. To handle this, the SASMMU circuits are capable of selecting a lower priority operation when low data rate operations are being performed. The logic circuitry of FIG. 15D shows how this no high priority signal is generated. FIG. 15E shows how one of the CP bits (context purpose bits) of the SASMMU context is generated. In this case CP bit 19 is illustrated. This is the end-of-message bit. Two successive stop bits generates this EOM signal. The end-of-message signal can be used as an interrupt, or as a CP bit. The CP bits of a context are generally used for configuration of hardware assets associated with that particular context.

Active Redundancy and Arbitration

When the common core computer 1000 is used in a process control computer, it is preferred that the process control computer actually comprise a set of three actively redundant common core computers, which make independent process control decisions on mutually exchanged input information from the field. In such process control computers, the SASMMU circuits 1110 may advantageously be used to provide communication between each of the redundant common core computers. To support redundancy, a substantial number of input signals may need to be mutually exchanged between the redundant common core computers in a very limited amount of time during a precise time interval in an overall process control cycle. For example, in one preferred method of process control, a 1 second cycle is provided, during which all of the following must occur: receiving and mutually exchanging over 1,000 input signals, arbitrating between these input signals, making process control decisions based upon the arbitrated input signal values, mutually exchanging the output signal values which represent these process control decisions and transmitting all of the necessary output signals to the field. While the H2 microprocessor 1014 is preferably used to make the needed process control decisions, the HI/O microprocessor 1012 is also capable of being programmed to execute the instructions for these types of decisions. For example, while the H2 microprocessor could be programmed to arbitrate between input signals received from sensors in the field, it is preferred that the HI/O microprocessor 1012 be utilized for this purpose, as its hardware-based arbitration is capable of faster execution. The arbitration circuitry to accomplish this is shown in FIG. 16.

Figure 16:
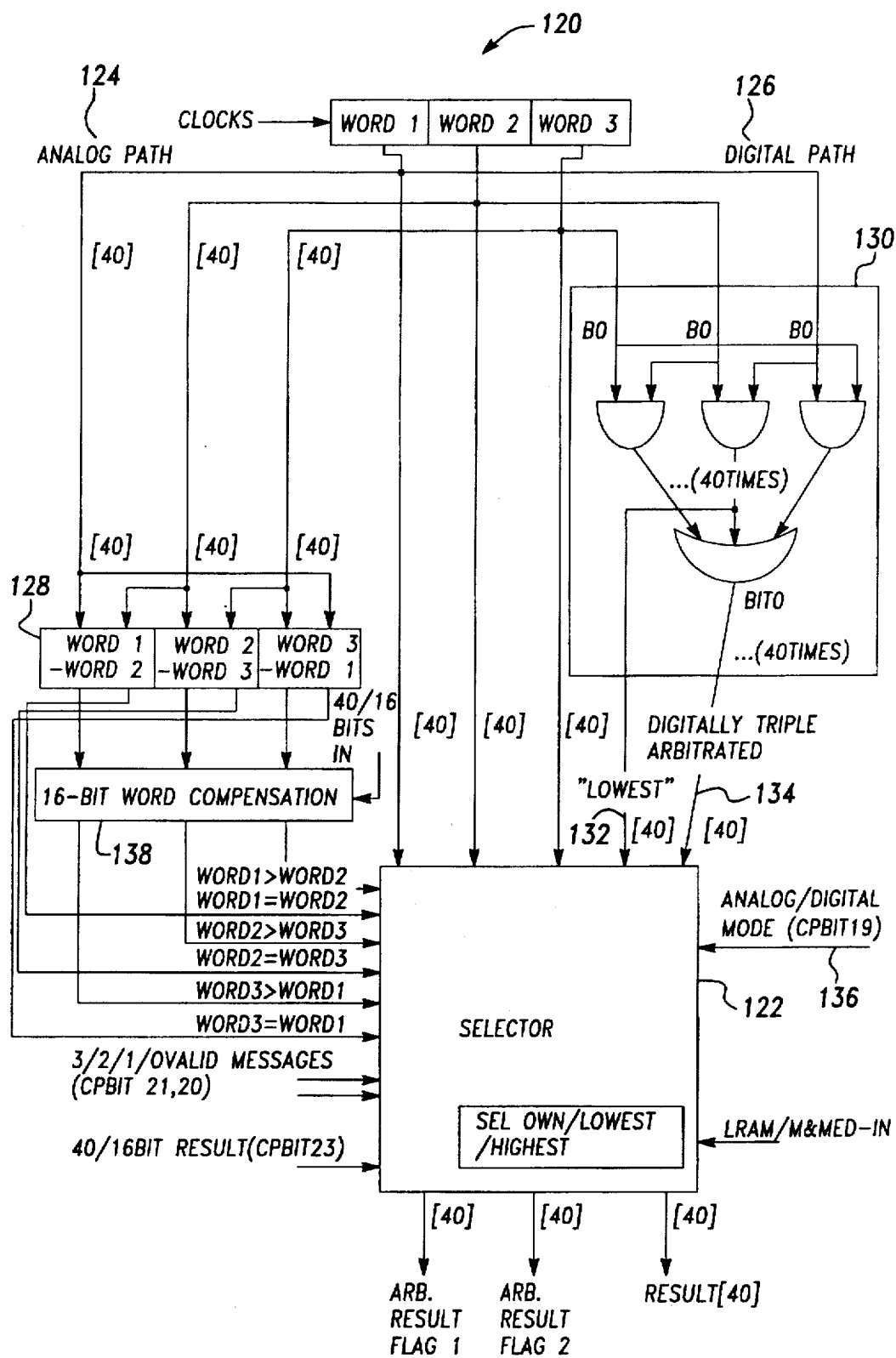
FIG. 16 is a detailed block diagram for the arbitration circuit shown in FIG. 3.

Referring to FIG. 16, the arbitration circuitry arbitrates data from triply redundant computers, each supplying a separate data word. In FIG. 16 these are depicted as word 1, word 2 and word 3, as shown at 120. Ideally, all three word values should be the same, if all three computers and data sources are performing properly. If all three word values are not the same, then the arbitration selector circuitry 122 determines which computer and/or data source is out of tolerance. A process control system will generally operate on both analog and digital signals. The analog signals are first converted to digital signals through appropriate analog to digital conversion circuitry. Nevertheless, the converted values still represent analog values. In FIG. 16 there is a separate analog path 124 and digital path 126. Analog values (digitally represented) are fed to processor block 128 whereas digital values are fed to processor block 130. Processor block 128 compares each of the word 1, word 2 and word 3 values with one another. Processor block 130 performs a similar function using AND gates and OR gates to determine the lowest signal of each bit position on line 132 and the digitally triple arbitrated value of each bit position on line 134. A bit by bit compare is performed by the arbitration circuitry and the selector circuitry 122 arbitrates based on 2 out of 3 wins. Selector circuitry 122 can also be set to arbitrate to take the lowest digital or analog value. In some cases the lowest digital value is considered the best default value to select (as it typically will represent a valve in the open or closed state that is preferred when there has been a system malfunction). The analog/digital mode of the incoming data is set on line 136. Because analog values can be expressed as either 40 bit words or 16 bit words, a bit compensation circuit 138 is provided to fill out 16 bit words into their 40 bit equivalent.

The data Table I lists the result for each different possible input combination to selector circuitry 122. The result is used by the system to indicate when the arbitration circuitry has detected a disagreement.

TABLE I

| 3/2/1/10 In-Service | Word1 & Word2 Agree ? | Word2 & Word3 Agree ? | Word3 & Word1 Agree ? | Word1 > Word2 ? | Word2 > Word3 ? | Word3 > Word1 ? | Own/ Lowest/ Highest | Answer |
|---|---|---|---|---|---|---|---|---|
| 0 | x | x | x | x | x | x | x | word1 |
| 1 | x | x | x | x | x | x | x | word1 |
| 2 | 0 | x | x | 0 | x | x | own | word1 |
| 2 | 0 | x | x | 0 | x | x | lowest | word1 |
| 2 | 0 | x | x | 0 | x | x | high | word2 |
| 2 | 0 | x | x | 1 | x | x | own | word1 |
| 2 | 0 | x | x | 1 | x | x | lowest | word2 |
| 2 | 0 | x | x | 1 | x | x | high | word1 |
| 2 | 1 | x | x | x | x | x | x | word1 |
| 3 | 0 | 0 | 0 | x | x | x | own | word1 |
| 3 | 0 | 0 | 0 | 0 | 0 | 1 | lowest | word1 |
| 3 | 0 | 0 | 0 | 0 | 0 | 1 | highest | word3 |
| 3 | 0 | 0 | 0 | 0 | 1 | 0 | lowest | word3 |
| 3 | 0 | 0 | 0 | 0 | 1 | 0 | highest | word2 |
| 3 | 0 | 0 | 0 | 0 | 1 | 1 | lowest | word1 |
| 3 | 0 | 0 | 0 | 0 | 1 | 1 | highest | word2 |
| 3 | 0 | 0 | 0 | 1 | 1 | 0 | lowest | word2 |
| 3 | 0 | 0 | 0 | 1 | 0 | 0 | highest | word1 |
| 3 | 0 | 0 | 0 | 1 | 0 | 1 | lowest | word2 |
| 3 | 0 | 0 | 0 | 1 | 0 | 1 | highest | word3 |
| 3 | 0 | 0 | 0 | 1 | 1 | 0 | lowest | word3 |
| 3 | 0 | 0 | 0 | 1 | 1 | 0 | highest | word1 |
| 3 | 0 | 0 | 1 | x | x | x | x | word1 |
| 3 | 0 | 1 | x | x | x | x | x | word2 |
| 3 | 1 | x | x | x | x | x | x | word1 |

Processor Timing

Figure 9:
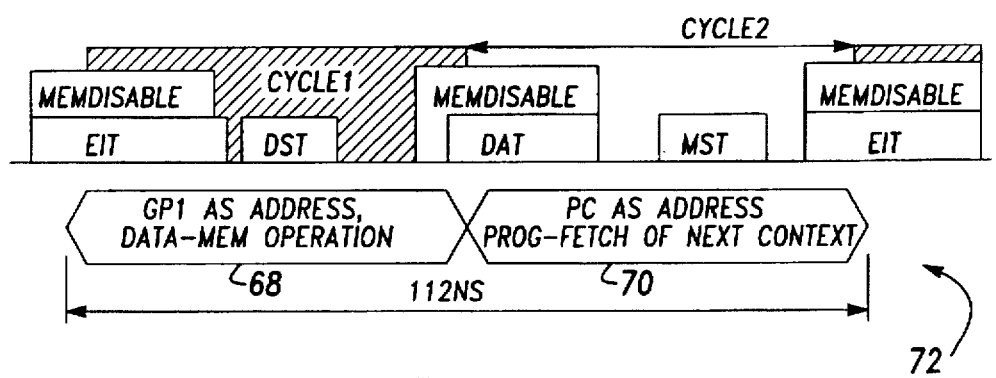
FIG. 9 is a timing diagram of the clock signals used by the context-cycling microprocessor.

The HI/O microprocessor 1012 further includes a clock circuit 1114, which is responsive to a 144 MHZ oscillator and an external synchronizing signal, such as the "universal time clock" (UTC) pulse signal 1116. In this regard, the UTC pulse signal effectively operates as an interrupt signal for the timed context of the HI/O microprocessor 1012. The UTC pulse signal 1116 is beamed from a satellite in the U.S. government's "global positioning system" (GPS) every second, and the clock circuit 1114 preferably is synchronized within 1 microsecond to the UTC pulse signal. The clock circuit 1114 is used to generate a set of internal clock signals (Mst, Eit, Dst and Dat), as well as produce a number of timing-dependent signals which are used by external devices (such as the memory systems). In the common core computer 1000, the H2 microprocessor 1014 receives its clock signals from the HI/O microprocessor 1012, such as the fundamental 72 MHZ clock signal 1118. The HI/O microprocessor 1012 also includes a separate 24-bit timer circuit 1120 which is used to set timeout values for the processing contexts to be discussed below. The HI/O microprocessor 1012 is also capable of temporarily suspending the operation of the H2 microprocessor 1014 by applying an Immobilize signal, without necessarily affecting the operation of the H2 microprocessor after the Immobilize signal has been restored to its normally inactive state. In this regard, the Immobilize signal may be used to prevent a clock-enabling CLEAR signal on one of the H2 microprocessor clock signals. Referring to FIG. 9, a timing diagram of some of the clock signals used by the HI/O microprocessor 1012 is shown.

Figure 17:
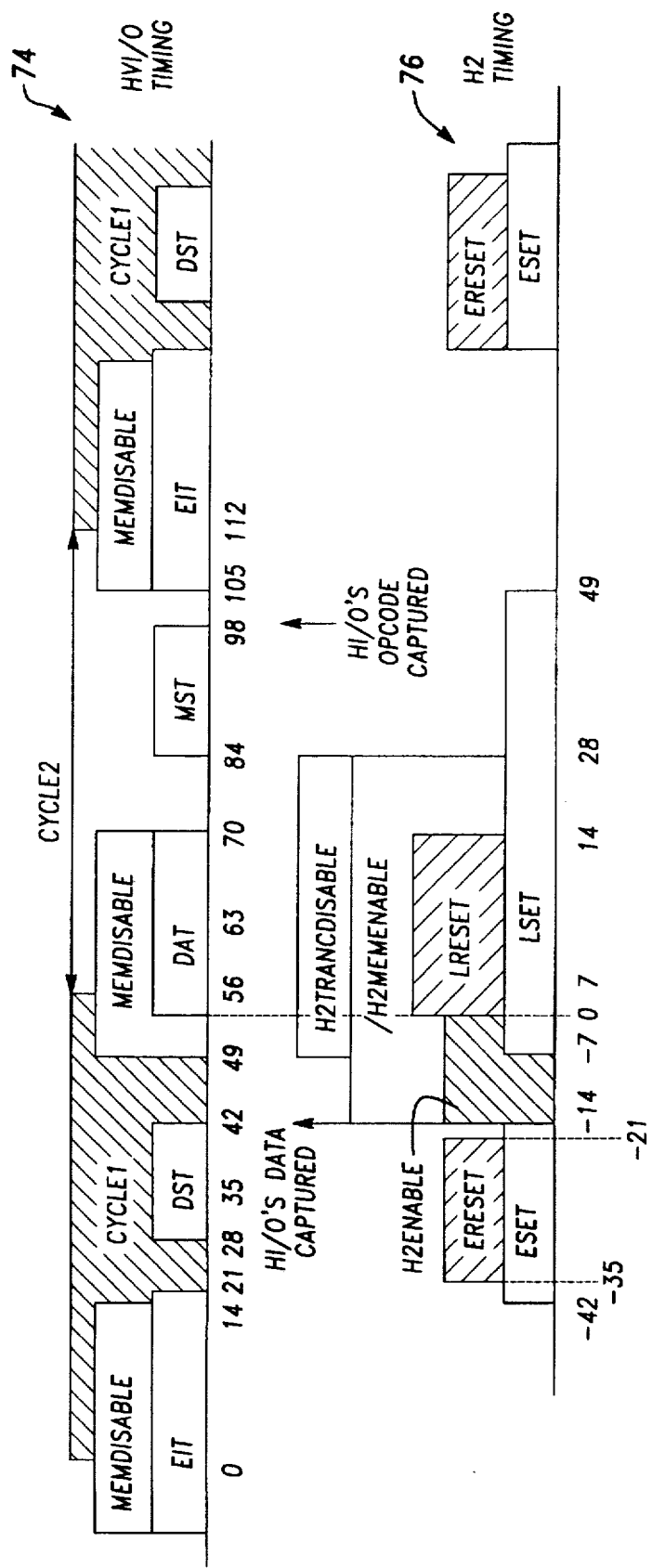
FIG. 17 is a timing diagram of the clock signals used in connection with the shared memory interface and coprocessing Harvard architecture ASIC.

FIG. 9 shows the manner in which processor cycles are utilized in the presently preferred embodiment. As noted above, the clock circuit 1114 generates the internal clock signals Mst, Eit, Dst and Dat. These are shown in FIG. 9. The presently preferred embodiment subdivides the fundamental 112 ns clock period into two components, designated cycle 1 and cycle 2, each being of equal duration. The fundamental clock period is broken in two to provide timing for the active context and the new context. As will be more fully explained, the system makes a distinction between the "active" context and the "new" context. The new context becomes the active context during the next cycle. The active context is the context currently running and the new context is the context that will run next. As illustrated at 68 the value in register GP1 of the active context is used as an address to access data memory (for data memory operations). This is allocated to cycle 1. As depicted at 70, the value in the program counter of the new context may serve as an address to access program memory (to fetch the op code to be executed during the next instruction period). This is allocated to cycle 2. Although not fully illustrated in FIG. 9, the next cycle 1 would immediately follow the illustrated cycle 2. Thus, as depicted at 72, the GP1 register would again be used to address data memory. The instruction performed on that data memory would be the one fetched at 70. When used as an input/output coprocessor for the H2 microprocessor, it is desirable to skew the respective clocks of the HI/O and H2 processors by several nanoseconds. This makes it easier to access shared memory. FIG. 17 shows how this is accomplished in the preferred embodiment. FIG. 17 is similar to FIG. 9. It illustrates cycle 1 and cycle 2 of the HI/O processor at 74 and the corresponding timing of the H2 processor at 76. Note the H2 processor does not perform context switching nor does it have a shared program/data memory, and therefore it does not require having its clock period broken into two cycles.

Figure 3A:
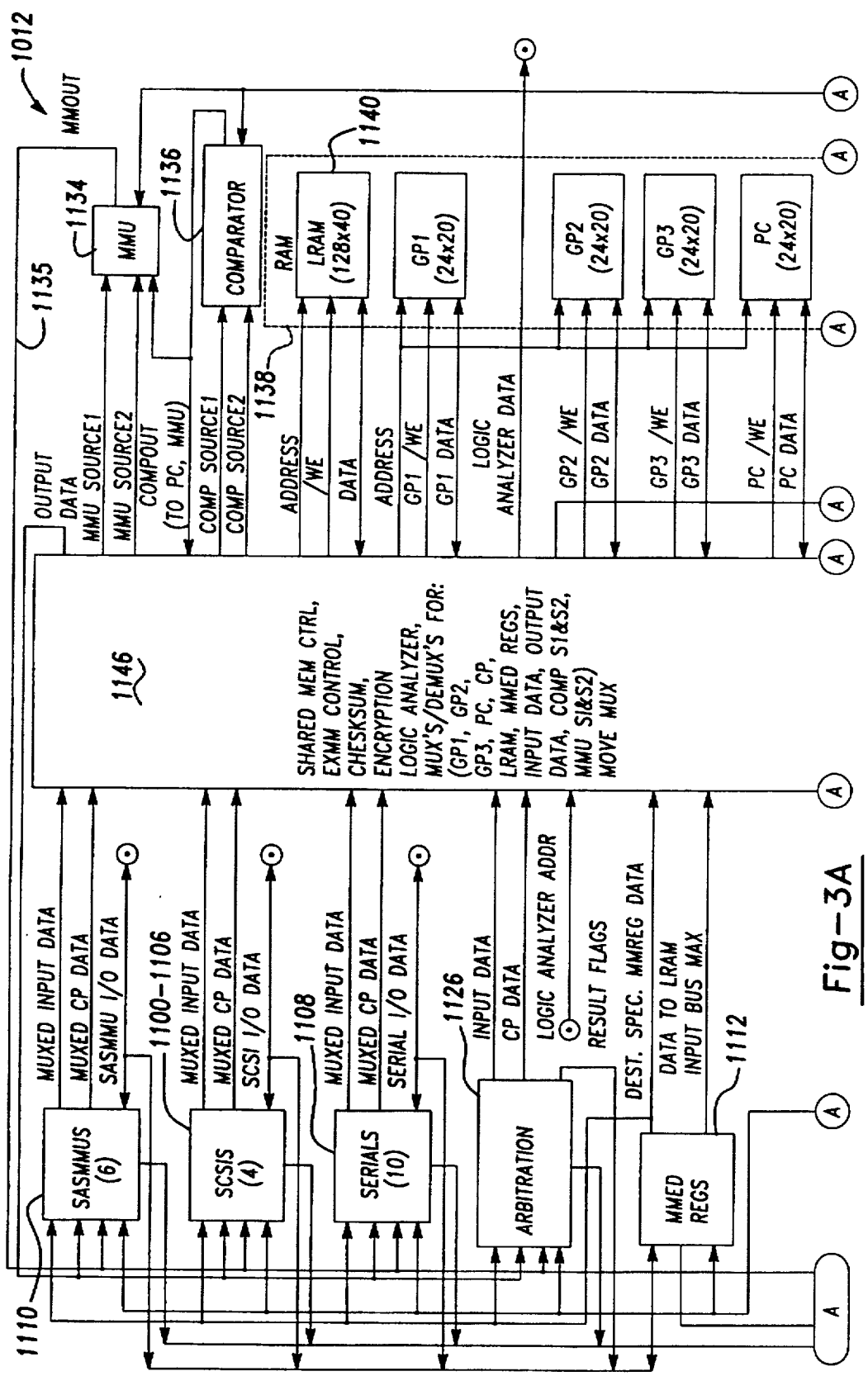
FIG. 3 (FIGS. 3A and 3B, collectively) is a detailed block diagram of the context-cycling microprocessor shown in FIG. 1.
Figure 3B:
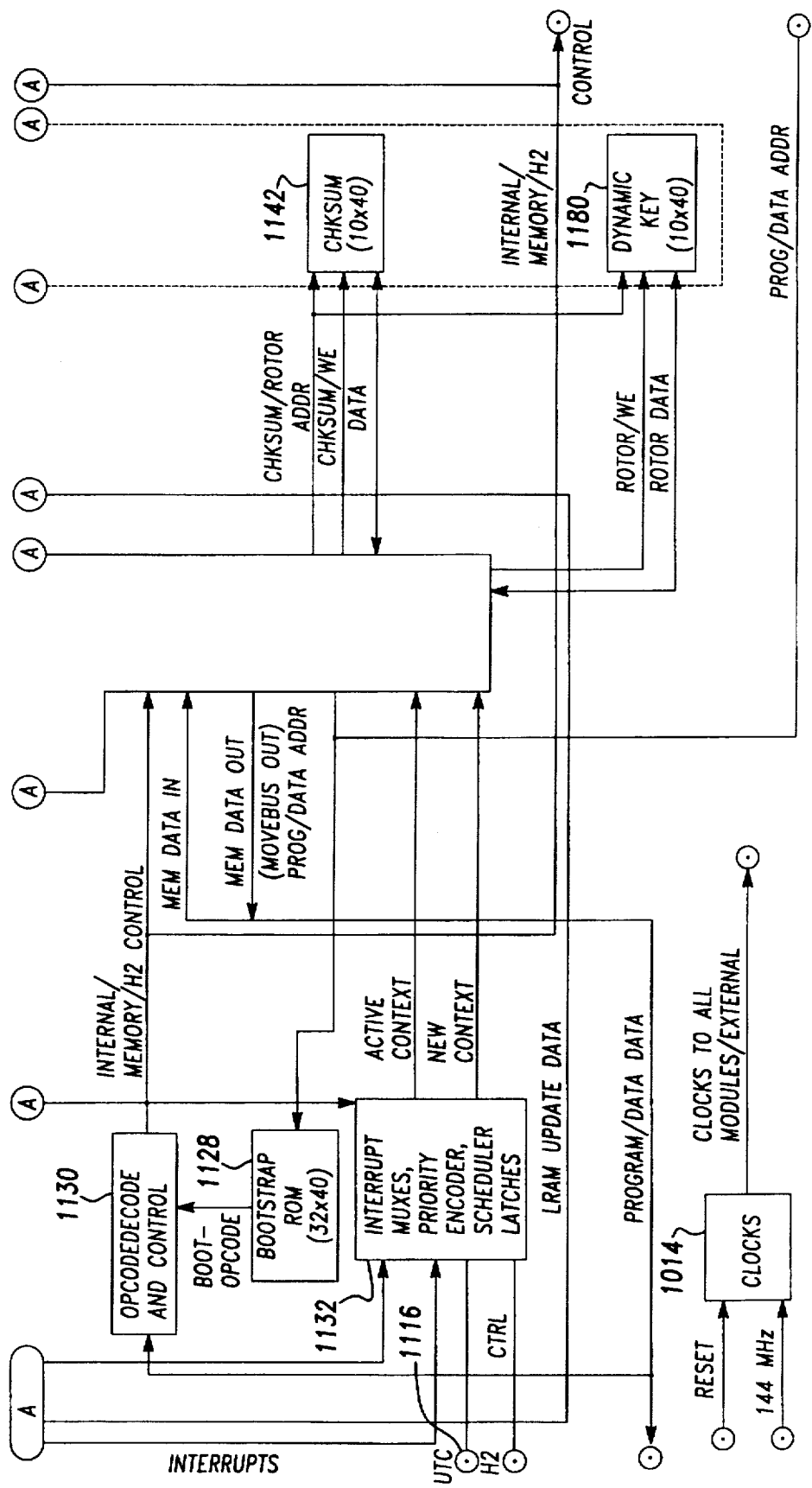

Turning now to FIG. 3 (FIGS. 3A and 3B, collectively), a detailed block diagram of the HI/O microprocessor 1012 is shown. FIG. 3 illustrates the circuits already introduced including arbitration circuit 1126. As previously noted, the arbitration circuit is used to arbitrate between corresponding signals from up to three sources (digital and digitally-represented analog data). For example, these sources could represent the input signals received from sensors in the field and the corresponding input signals received from the sibling microprocessors of the other two common core computers in a process control node.

Figure 13:
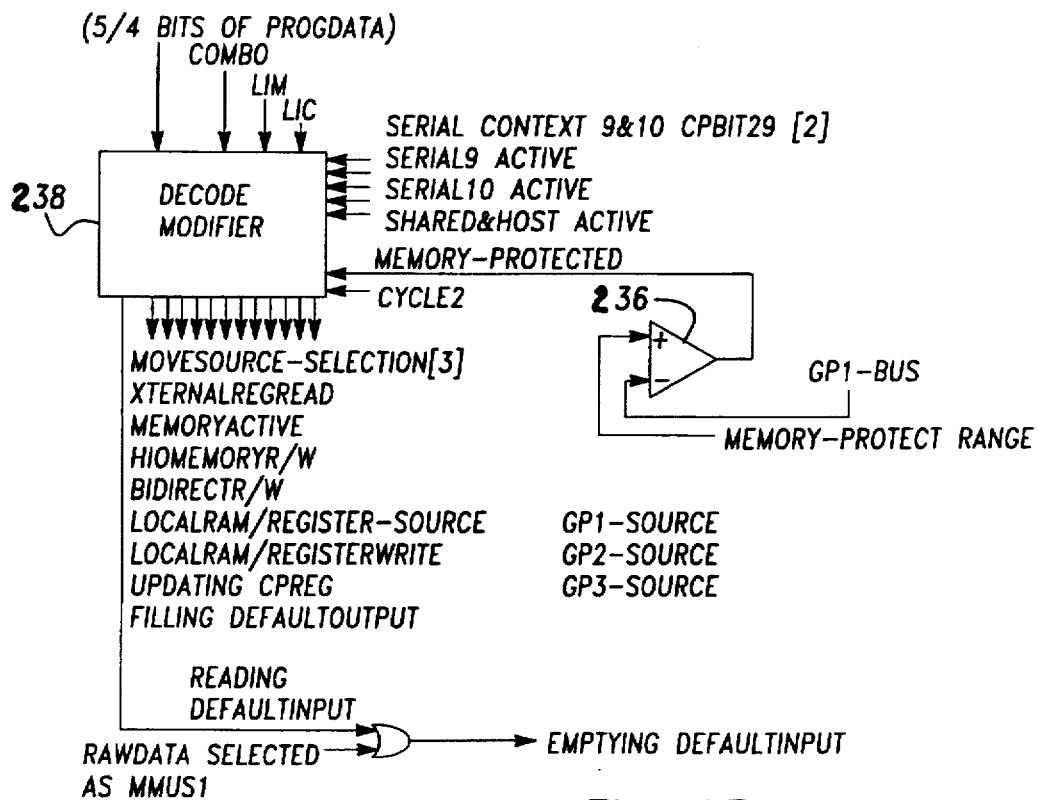
FIG. 13 is a block diagram of the opcode decoder shown in FIG. 3 and memory protect functionality.

A bootstrap ROM circuit 1128 is provided to store a basic operating system routine needed to boot up the HI/O microprocessor 1012 on start up. An opcode decode and control circuit 1130 is provided for decoding the 40-bit opcode word used by the HI/O microprocessor 1012. The HI/O microprocessor 1012 electrically enables the circuits specified in the opcode instruction. A block diagram of a portion of the opcode decoder is shown in FIG. 13. Note that the memory protect range value is compared with the value on the GP1 register bus by comparator 236. The output of this comparator controls the input to the decode modifier 238 to control whether memory protection is enabled or disabled for a particular location. The presently preferred embodiment handles several different instruction types designated LIM (Long Immediate Math), LIC (Long Immediate Compare) and COMBO. These are decoded from the op code and selected as inputs to the decoder modifier 238. An example of the instruction types utilized by the HI/O microprocessor 1012 is shown in FIGS. 14A and 14B. FIG. 14A shows the COMBO instruction at 38 and the Long Immediate Math instruction at 40. FIG. 14B shows the Long Immediate Compare instruction at 42. In FIGS. 14A and 14B the numbers 39 . . . 0 at the top of each chart represent the bit field widths. These charts show how the presently preferred embodiment decodes bits in the respective bit fields. By way of example, referring to the Long Immediate Math instruction set at 40, under the main math unit operation category (bits 33 . . . 31) a 0 value would specify the AND operation, a 1 value would specify the OR operation, a 2 value would specify the exclusive OR operation, and so forth.

When referring to FIGS. 14A and 14B, 40 bit operands are configured as follows. Bit 39 represents the sign, where 1 denotes a negative number; bits 38–15 represent 24 bits of the integer value; and bits 14–0 represent 15 bits of the fraction. All data source values of less than 40 bits are automatically padded with zeros. Further, bit source values, used in 40 bit operations are treated as positive integers and are aligned with the least significant bit (LSB) of all the 20 bit values at the bit 15 position of the 40 bit operand. Deviations from this practice are specifically noted in the Table below. When referring to the Table below, note that the PIMMED/GP1 field acts as an address for local RAM and memory mapped registers. There is no interrupt source modification in the LIM or LIC instruction types. Thus the interrupt source chosen during the last COMBO instruction executed is maintained while executing either Long Immediate instruction type. Interrupt source selection is forced to the "00" (binary) selection (representing "Always") when the context is descheduled or the processor goes through a hardware reset. The Table below explains the abbreviations used in FIGS. 14A and 14B.

TABLE

COMBO instruction type:

| | | |
|---|---|---|
| b39 | INST TYPE | Instruction Type. "0" indicates the instruction type is COMBO Interrupt Condition. Selects, via context's interrupt mux, the 1 (of 4) interrupt condition requisite for context to execute next instruction. Number of conditions (up to 4) along with type of conditions, vary with context type. |
| b38 . . . 37 | INT CND | |

TABLE-continued

| | | |
|---|---|---|
| | | Selections are: CD0 (condition0 of interrupt mux "Always" for all 24 contexts) CD1 (condition1 of interrupt mux; condition varies based on context) CD2 (condition2 of interrupt mux; condition varies based on context) CD3 (condition3 of interrupt mux; condition varies based on context) |
| b36 . . . 35 | JMP TGT | Jump Target. Value with which context's PC will be updated at end of instruction period in which this opcode is executed. Selections are: PC + 1 (PC of current instruction + 1) PC + 1 + IM (same as previous + PIMMED value, located at b7 . . . 0 of the opcode, PIMMED to be interpreted as 1 bit sign, 7 bits magnitude) GP3 (bits 34 . . . 15 of value in context's GP3 register RAM location) 0 (Zero) |
| b34 . . . 33 | COMP S2 | Comparitor Source2 operand. Selections are: GP2 (value in context's GP2 register RAM location) IMG1 (value of PIMMED/GP1 bus - the value on this 20-bit bus is equal to the right-justified value of the PIMMED field, as 8 bits integer, unless PIMMED = FFh, where the bus assumes the value of GP1) GP3 (value in context's GP3 register RAM location) 0 (Zero) |
| b32 . . 30 | COMP OP | Comparitor Operation, in form (COMP S1.COMP OP.COMP S2, like GP2.GTE.LRR). Selections are: EQ (equal) NEQ (not equal) GT (greater than) GTE (greater than or equal) LT (less than) LTE (less than or equal) S1@S2T (bit of comparitor source1 operand, at bit position equivalent to comparitor source2 operand integer value, is TRUE) S1@S2F (bit of comparitor source1 operand, at bit position equivalent to comparitor source2 operand integer value, is FALSE) |
| b29 . . . 28 | COMP S1 | Comparitor Source1 operand. Selections are: GP2 (value in context's GP2 register RAM location) LRR (value on multiplexed Local RAM/ (mmed) Registers bus) MVB (value on Move Bus) MMO (value on Main Math Output bus) |
| b27 . . . 25 | MMU S2 | Main Math Unit Source2 operand. Selections are: GP1 (value in context's GP1 register RAM location) GP2 (value in context's GP2 register RAM location) GP3 (value in context's GP3 register RAM location) LRR (value on multiplexed Local RAM/ (mmed) Registers bus) +1 (integer value of +1) 1's (all 40 bits of operand forced to 1's) PIMMED (8-bit Program Immediate field of the present opcode, used as integer) 0 (Zero) |
| b24 . . . 21 | MMU OP | Main Math Unit Operation, in form (MMU S1.MMU OP.MMU S2, like GP1.EXOR.1's). Selections are: AND (logical AND) OR (logical OR) EXOR (logical EXOR) + (addition) − (subtraction) * (integer 20-bit by 20-bit multiply; result MSB → LSB will be in bit positions |

TABLE-continued

| | | |
|---|---|---|
| | | 14 . . . 0, 39 . . . 15.) |
| | | / (software assisted, successive approximation divide - 40-bit numerator, 20-bit denominator, 20 bit quotient; numerator operand selected as COMP S2, denominator operand as MMU S2, and interim quotient as MMU S1. The PIMMED value, interpreted as an 8-bit, positive integer, will be used to point to each bit position of the temporary quotient to be calculated) |
| | | S1 IF CO ELSE S2 (MMU Source1 operand will be the MMU output IF the output of the comparitor is TRUE, else the value of the MMU Source2 operand will be the output) |
| | | S1 BSET@S2 (value of MMU Source1 operand with bit set at position pointed to by integer value of MMU Source2 operand value) |
| | | S1 BCLR@S2 (value of MMU Source1 operand with bit cleared at position pointed to by integer value of MMU Source2 operand value) |
| | | S1 BSUB@S2 (value of MMU Source1 operand with bit substituted with at position pointed to by integer value of MMU Source2 operand value) |
| | | ROTATE/MERGE 8 (value of rotated Source1 operand merged with Source2 operand on byte boundaries. Bits 7 . . . 5 of the PIMMED field furnish the code for 1 of 8 discrete rotation amounts. Bits 4 . . . 0 of the PIMMED field are the byte select bits, a "1" translated as "from rotated Source1 operand", "0" as "from Source2 operand") |
| | | CHKSUM (new checksum calculation with the Source1 operand as the input data value and the Source2 operand as the previous checksum value) |
| | | ENCR/DECR (encrypt/decrypt data with the Source1 operand as the data to be encrypted/decrypted, and the Source2 operand as the encryption/decryption dynamic key to use, with the static key provided by a Local RAM/(mmed) register) |
| | | DYNAMIC KEY (hardware permute the Dynamic Key value, provided as the Source1 operand) |
| | | PARITY (using Source1 operand only, exor bits 8 . . . 0, and substitute this 1 bit value for bit 7 of the Source1 operand, passing all other 39 bits of the Source1 operand unaltered) |
| b20 . . . 18 | MMU S1 | Main Math Unit Source1 operand. Selections are: |
| | | GP1 (value in context's GP1 register RAM location) |
| | | GP2 (value in context's GP2 register RAM location) |
| | | GP3 (value in context's GP3 register RAM location) |
| | | LRR (value on multiplexed Local RAM/(mmed) Registers bus) |
| | | CP (value in context's "Context Purpose", CP, register) |
| | | MVBUS (value on the Move Bus) |
| | | PC + 1 (PC of current instruction + 1) |
| | | RAWIN (raw, un-autodecrypted data from context's input register) |
| b17 | GP3 | GP3 update value. Selections are: |
| | | NO/-E (no change to context's GP3 value) |
| | | MMO (update context's GP3 value to that on Main Math Output bus) |
| b16 . . . 15 | GP2 | GP2 update value. Selections are: |
| | | NO/-E (no change to context's GP2 value) |
| | | MMO (update context's GP2 value with bits 34 . . . 15 of the value on the Main Math Output bus) |
| | | −1 (decrement context's current GP2 value by 1) |
| | | MVB (update context's GP2 value with bits 34 . . . 15 of the value on the Move Bus) |
| b14 . . . 13 | GP1 | GP1 update value. Selections are: |
| | | NO/-E (no change to context's GP1 value) |
| | | MMO (update context's GP1 value with bits 34 . . . 15 of the value on the Main Math Output bus) |
| | | +1 (increment context's current GP1 value by 1) |
| | | LRR (update context's GP1 value with bits 34 . . . 15 of the value on the multiplexed Local RAM/(mmed) Registers bus) |
| b12 . . . 8 | MOVE OPT. | Move Bus Option. This portion of the opcode handles 4 functions simultaneously, in the form W.X.Y.Z, where W is the source operand to be placed on the Move Bus, X is the destination of the Move Bus value, Y is the Local RAM/(mmed) Register update source, and Z is the CP register update source. Abbreviations are: DM - Data Memory, DI - Context's Default Input Register, DO - Context's Default Output Register, LR - multiplexed Local RAM/(mmed) Registers bus, G3 - Context's GP3 value, MB - Move Bus, NC - No Change, and MM - Main Math Output bus. The 32 selections are as follows: |
| | | 0. DM.MB.NC.NC |
| | | 1. DM.MB.MM.NC |
| | | 2. DM.MB.MB.NC |
| | | 3. DM.DO.NC.NC |
| | | 4. DM.DO.MM.NC |
| | | 5. DM.DO.MB.NC |
| | | 6. DM.MB.NC.MM |
| | | 7. DM.DO.NC.MM |
| | | 8. DI.DM.NC.MM |
| | | 9. DI.MB.NC.NC |
| | | 10. DI.MB.MM.NC |
| | | 11. DI.MB.MB.NC |
| | | 12. DI.DM.NC.NC |
| | | 13. DI.DM.MM.NC |
| | | 14. DI.DM.MB.NC |
| | | 15. LR.MB.NC.NC |
| | | 16. LR.MB.MM.NC |
| | | 17. LR.DM.NC.NC |
| | | 18. LR.DM.MM.NC |
| | | 19. LR.DO.NC.NC |
| | | 20. LR.DO.MM.NC |
| | | 21. MM.DO.NC.NC |
| | | 22. MM.DO.MM.NC |
| | | 23. DI.MB.NC.MM |
| | | 24. G3.DM.NC.MM |
| | | 25. G3.DM.NC.NC |
| | | 26. G3.DM.MM.NC |
| | | 27. G3.MB.MB.NC |
| | | 28. G3.DO.NC.NC |
| | | 29. G3.DO.MM.NC |
| | | 30. G3.DO.MB.NC |
| | | 31. G3.DO.NC.MM |
| b7 . . . 0 | PIMMED | Program Immediate field. 8 bits used in a variety of ways, as explained above. |

Long Immediate Math (LIM) instruction type:

| | | |
|---|---|---|
| b39 . . . 38 | INST TYPE | Instruction Type. "10" (binary) indicates the instruction type is Long Immediate Math. |
| b37 | JMP TGT | Jump Target. Value with which context's PC will be updated at end of instruction period in which this opcode is executed. Selections are: |
| | | PC + 1 (PC of current instruction + 1) |
| | | MMO (bits 34 . . . 15 of the value on the Main Math Output bus) |
| b36 . . . 34 | MMU S2 | Main Math Unit Source2 operand. Selections are: |
| | | GP1 (value in context's GP1 register RAM location) |
| | | GP2 (value in context's GP2 register RAM location) |
| | | GP3 (value in context's GP3 register RAM |

| Bits | Field | Description |
|---|---|---|
| | | location) |
| | | LINT0 (20 bits of Long Immediate field placed into bit positions 34 . . . 15, and padded with zeros) |
| | | LINT1 (20 bits of Long Immediate field placed into bit positions 34 . . . 15, and padded with ones) |
| | | LFRC0 (20 bits of Long Immediate field placed into bit positions 39 . . . 35 and 14 . . . 0, and padded with zeros) |
| | | LFRC1 (20 bits of Long Immediate field placed into bit positions 39 . . . 35 and 14 . . . 0, and padded with ones) |
| | | 0 (Zero) |
| b33 . . . 31 | MMU OP | Main Math Unit Operation, in form (MMU S1.MMU OP.MMU S2, like GP1.OR.LFRC0). Selections are: AND (logical AND) OR (logical OR) EXOR (logical EXOR) + (addition) − (subtraction) * (integer 20-bit by 20-bit multiply; result MSB → LSB will be in bit positions 14 . . . 0, 39 . . . 15.) ROTATE/MERGE 40 (value of rotated Source1 operand merged with Source2 operand on 4-bit, nibble boundaries, with LS nibble defined as bit positions 2 . . . 0 including bit 39 as the LS bit. Bits 15 . . . 10 of the Long Immediate field, LIMMED, furnish the continuous, right-rotation amount (rotated right 0 to 63 times). Bits 9 . . . 0 of the LIMMED field are the nibble select bits, a "1" translated as "from rotated Source1 operand", a "0" as "from Source2 operand") S2 (the value of the Source2 operand is output) |
| b30 . . . 28 | MMU S1 | Main Math Unit Source1 operand. Selections are: GP1 (value in context's GP1 register RAM location) GP2 (value in context's GP2 register RAM location) GP3 (value in context's GP3 register RAM location) LINT0 (20 bits of Long Immediate field placed into bit positions 34 . . . 15, and padded with zeros) CP (value in context's "Context Purpose", CP, register) MVBUS (value on the Move Bus) PC + 1 (PC of current instruction + 1) RAWIN (raw, un-autodecrypted data from context's input register) |
| b27 . . . 26 | GP3 | GP3 update value. Selections are: NO/−E (no change to context's GP3 value) MMO (update context's GP3 value to that on Main Math Output bus) PC + 1 (PC of current instruction + 1) MVBUS (value on the Move Bus) |
| b25 | GP2 | GP2 update value. Selections are: NO/−E (no change to context's GP2 value) MMO (update context's GP2 value with bits 34 . . . 15 of the value on the Main Math Output bus) |
| b24 | GP1 | GP1 update value. Selections are: NO/−E (no change to context's GP1 value) MMO (update context's GP1 value with bits 34 . . . 15 of the value on the Main Math Output bus) |
| b23 . . . 20 | MOVE OPT. | Move Bus Option. This portion of the opcode handles 3 functions simultaneously, in the form P.Q.R, where P is the source operand to be placed on the Move Bus, Q is the destination of the Move Bus value, and R is the CP register update source. Abbreviations are: DM - Data Memory, DI - Context's Default Input Register, DO - Context's Default Output Register, G3 - Context's GP3 value, MB - Move Bus, NC - No Change, and MM - Main Math Output bus. The 16 selections are as follows: 0. DM.MB.NC 1. DM.DO.NC 2. DI.MB.NC 3. DI.DM.NC 4. DI.DO.NC 5. MM.DO.NC 6. G3.DM.NC 7. G3.DO.NC 8. DM.MB.MM 9. DM.DO.MM 10. DI.MB.MM 11. DI.DM.MM 12. DI.DO.MM 13. MM.DO.MM 14. G3.DM.MM 15. G3.DO.MM |
| b19 . . . 0 | LIMMED | Long Immediate field. 20 bits used in a variety of ways, as explained above. |

Long Immediate Compare (LIC) instruction type:

| Bits | Field | Description |
|---|---|---|
| b39 . . . 38 | INST TYPE | Instruction Type. "11" (binary) indicates the instruction type is Long Immediate Compare. |
| b37 . . . 36 | JMP TGT | Jump Target. Value with which context's PC will be updated at end of instruction period in which this opcode is executed. Selections are: PC + 1 (PC of current instruction + 1) PC + 1 + IM (same as previous + PIMMED value, located at b27 . . . 20 of the opcode, PIMMED to be interpreted as 1 bit sign, 7 bits magnitude) GP3 (bits 34 . . . 15 of value in context's GP3 register RAM location) LI (value of 20-bit Long Immediate field) |
| b35 . . . 34 | COMP S2 | Comparitor Source2 operand. Selections are: GP2 (value in context's GP2 register RAM location) IMG1 (value of PIMMED/GP1 bus - the value on this 20-bit bus is equal to the value of the PIMMED field, as 8 bits integer, unless PIMMED = FFh, where the bus assumes the value of GP1) GP3 (value in context's GP3 register RAM location) 0 (Zero) |
| b33 . . . 31 | COMP OP | Comparitor Operation, in form (COMP S1.COMP OP.COMP S2, like GP2.GTE.LRR). Selections are: EQ (equal) NEQ (not equal) GT (greater than) GTE (greater than or equal) LT (less than) LTE (less than or equal) S1@S2T (bit of comparitor source1 operand, at bit position equivalent to comparitor source2 operand integer value1 is TRUE) S1@S2F (bit of comparitor source1 operand, at bit position equivalent to comparitor source2 operand integer value, is FALSE) |
| b30 . . . 29 | COMP S1 | Comparitor Source1 operand. Selections are: GP2 (value in context's GP2 register RAM location) LRR (value on multiplexed Local RAM/ (nmed) Registers bus) CP (value in context's "Context Purpose", CP, register) LINT0 (20 bits of Long Immediate field placed into bit positions 34 . . . 15, and padded with zeros) |
| b28 | LRR | Local RAM/(nmed) Registers update value. Selections are: NO/−E (no change to addressed Local RAM/ (nmed) Register's value) |

TABLE-continued

| | | |
|---|---|---|
| | | LINT0 (20 bits of Long Immediate field placed into bit positions 34 ... 15, and padded with zeros) |
| b27 ... 20 | PIMMED | Program Immediate field. 8 bits used in a variety of ways, as explained above. |
| b19 ... 0 | LIMMED | Long Immediate field. 20 bits used in a variety of ways, as explained above. |

Context Management and the Timed Context

The HI/O microprocessor 1012 also includes a context management circuit 1132 for controlling each of the 24 contexts which are arranged within the HI/O microprocessor. In this regard, a separate processing context is assigned for each of the input/output circuits discussed above. For example, six processing contexts are dedicated for the six SASMMU circuits 1110, while ten processing contexts are dedicated for the ten serial circuits 1108 and so forth. At the heart of the context management circuit is an interrupt priority encoder.

Figure 6:
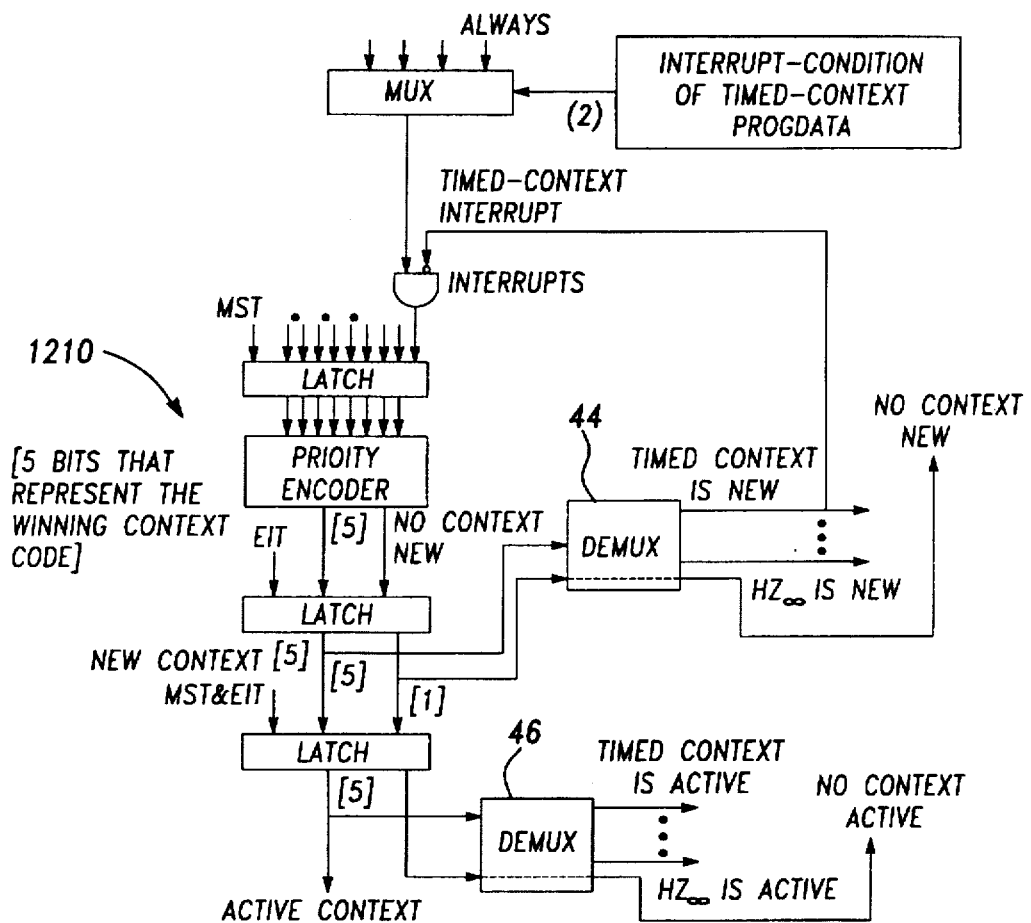
FIG. 6 is a detailed block diagram of an interrupt priority encoder circuit as generally shown in FIG. 3.

Referring to FIG. 6, a detailed block diagram of an interrupt priority encoder circuit 1210 is shown. The interrupt priority encoder circuit 1210 forms part of the context management circuits 1132, which are shown as a block in FIG. 3. Each context has at least one interrupt source and circuitry to select of multiple sources (if it has multiple sources). If no context is active, the processor executes a NOP so that no stored values are altered. The priority encoder receives the interrupts from all different contexts. The priority encoder interprets these, determines which job has the highest priority and then generates the new context code. As will be more fully explained, the system makes a distinction between the "active" context and the "new" context. The new context becomes the active context during the next instruction period. Demultiplexer 44 demultiplexes the new context code into one of 24 decoded lines that can be used for state machine control elsewhere in the system. Similarly, demultiplexer 46 demultiplexes the active context code into one of 24 decoded lines for a similar purpose.

Figure 7:
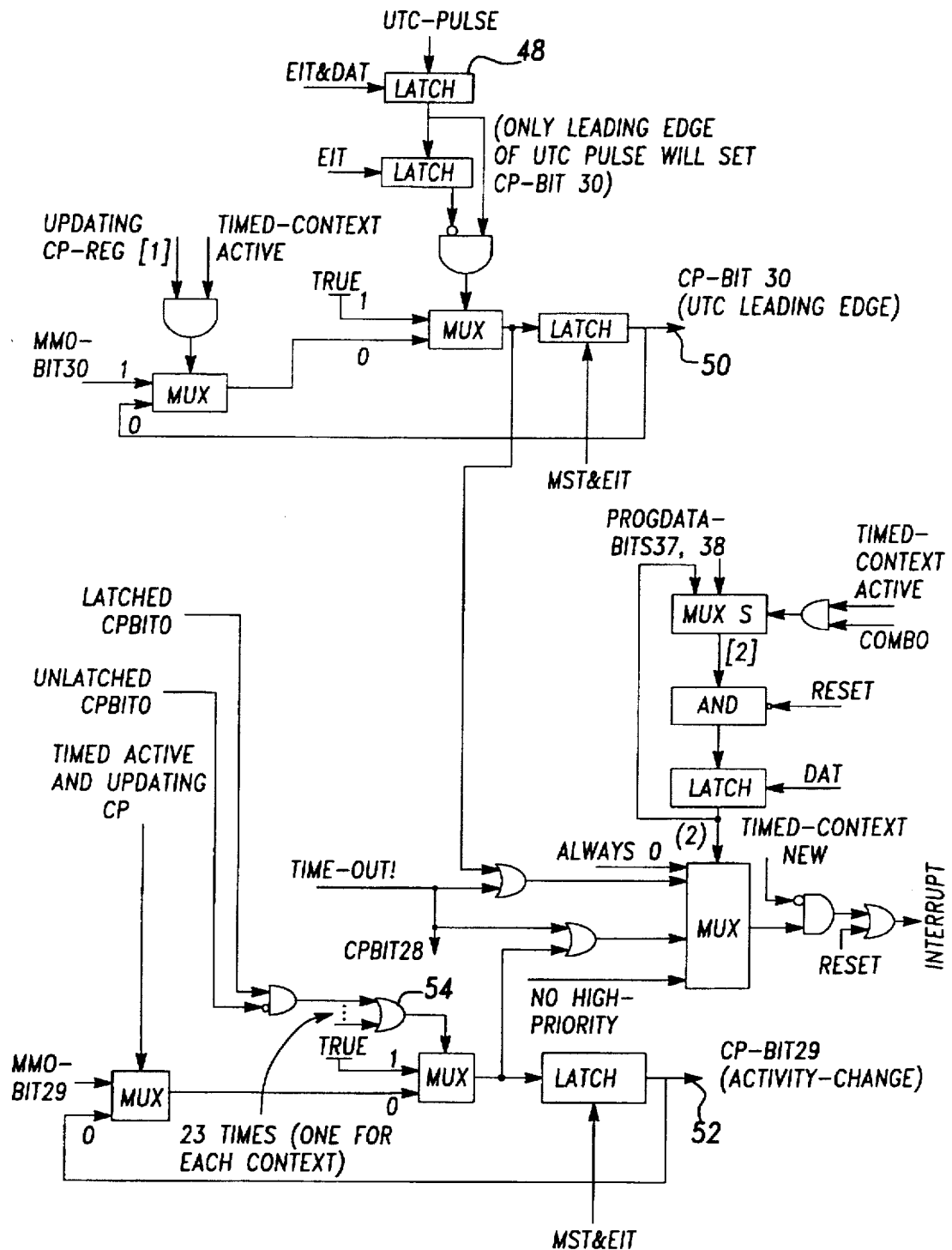
FIG. 7 is a detailed block diagram of the interrupt selection circuit for the timed context.

A detailed block diagram of the interrupt selection circuit for the timed context is shown in FIG. 7. The timed context serves a special purpose within the system of coordinating operation of the HI/O processor and the H2 processor. In FIG. 7, note that the source of the timed context interrupts can come from a UTC (universal time constant) pulse or a pulse from a global positioning satellite (GPS), for example. Note the UTC pulse input to latch 48. This is used to generate both CP-bit 30 at 50, and the UTC leading edge interrupt.

The timed context must also generate an interrupt when other contexts deschedule themselves. This is how the timed context knows when the other contexts are finished with a given task. This eliminates the need to wait for a timeout based on a time-clocked event, although time-clocked events can be used and are preferred when using the pseudo-queue. The "activity change" interrupt is generated for this purpose at 52. It is generated by monitoring the falling edge on any of the scheduler bits for any of the contexts. Essentially, the falling edges on all 23 of the bits corresponding to the other contexts are ORed together at OR gate 54.

External Memory Mapped Devices

The input/output circuits of the HI/O microprocessor 1012 also include a set of memory mapped register control circuits, generally designated by reference numeral 1112. As with all of the various input/output circuits disclosed herein, the number of such memory mapped control circuits may be varied as required. However, in the present embodiment, a total of 32 external memory mapped locations are provided, even though all of these locations may not necessarily be decoded. These control circuits perform address decoding in order to minimize the amount of external logic required for devices that are attached to the HI/O microprocessor 1012 through the external memory mapped data bus 1066. In other words, these external devices are memory mapped within the data memory space of the HI/O microprocessor itself. For example, such external devices may include a debug panel.

Dedicated Registers

Figure 8A:
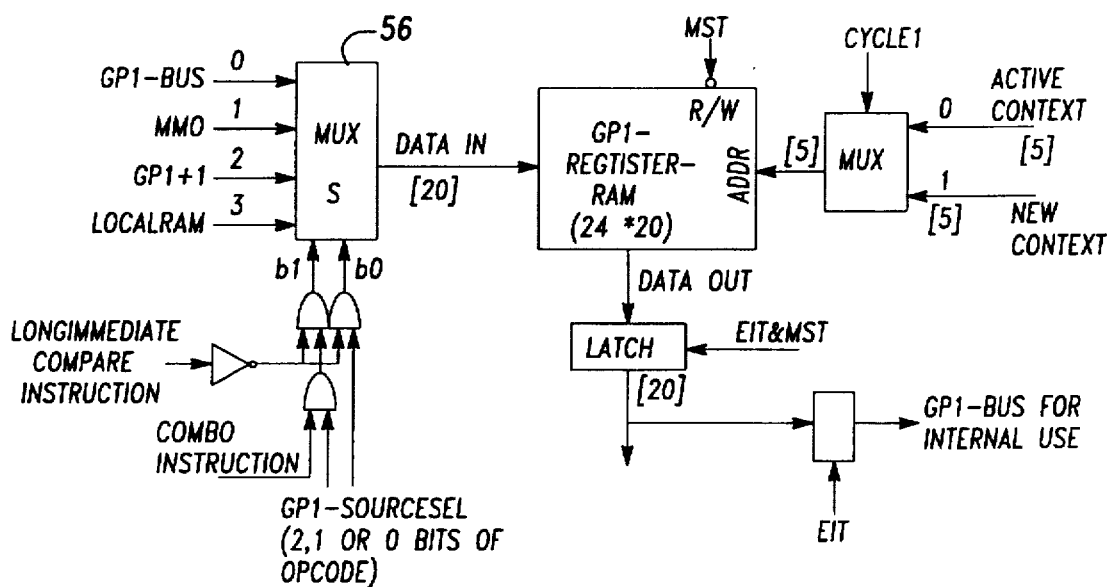
FIGS. 8A–8F are a set of detailed block diagrams which illustrate examples of the dedicated registers for the processing contexts.
Figure 8B:
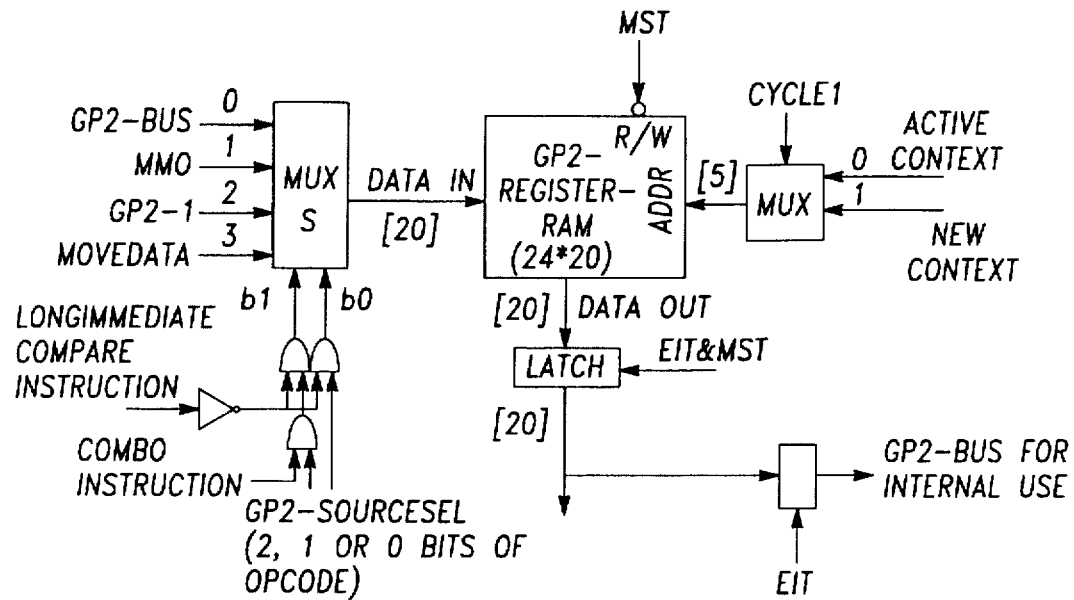
Figure 8C:
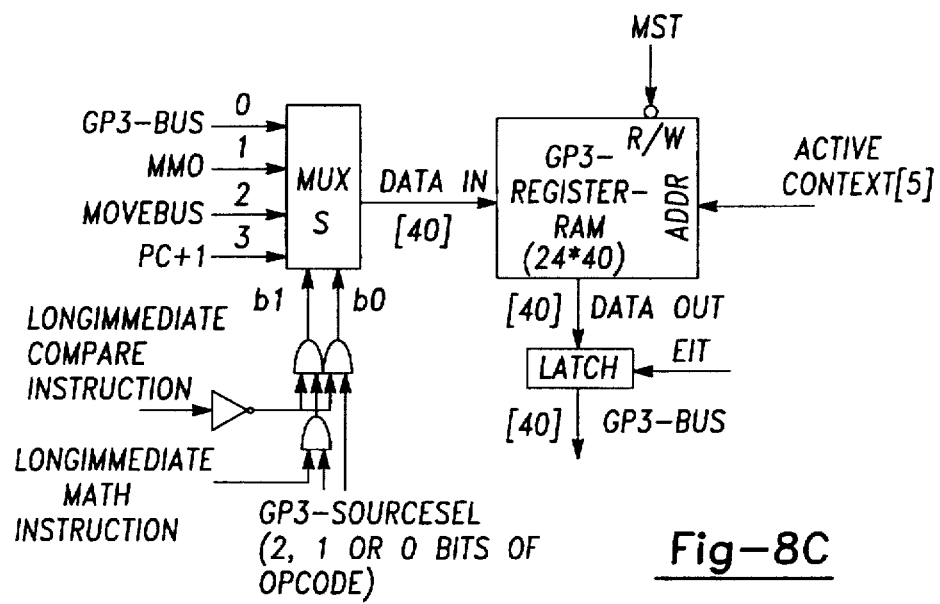

FIGS. 8A-8F comprise detailed block diagrams which illustrate each of the dedicated registers for the processing contexts. FIG. 8A illustrates how the GP1 register RAM is configured. In the preferred embodiment there are 24 locations of GP1 registers that are addressed by the context code (active context or new context). The update data is input through a multiplexer 56 that is switched according to the type of opcode instruction (e.g., Long Immediate Compare, COMBO). FIGS. 8B and 8C are similar to FIG. 8A but illustrating the general purpose registers GP2 and GP3, respectively. Note that the GP3 register is addressed only by the active context code, since the GP3 value is not prefetched as are the GP1 and GP2 values. Thus there is no need for an address multiplexer. Although the preferred embodiment does not require register GP3 to be addressed by both active context and new context, it would be feasible to implement register GP3 similar to register GP2, if desired. Generally, registers GP1 and GP2 are used as address generators and counters, respectively. These registers are 20 bits wide because that is the width of the address bus in the presently preferred embodiment. Register GP3 is a 40 bit wide random access memory to support the full data width (40 bits) of the current embodiment.

Figure 8D:
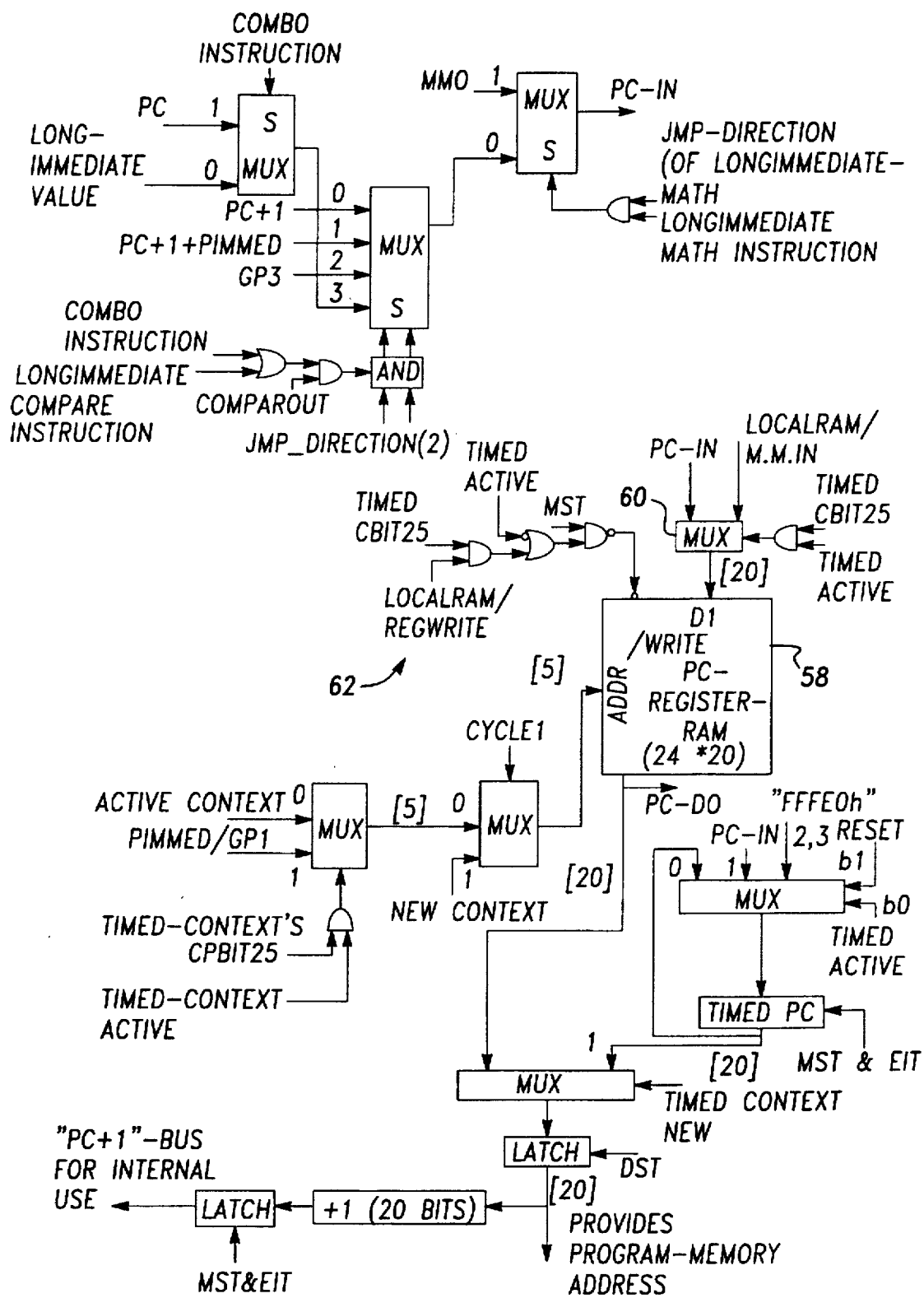

FIG. 8D depicts the logic of the program counter. Note that the program counter, implemented by RAM 58, can be loaded from various sources. Multiplexer 60 loads the program counter register RAM 58. The timed context may map the program counters of other contexts into the local RAM space via the addressing circuitry shown generally at 62, thus controlling context program counter initialization.

To help in accomplishing this, the timed context uses a register for its PC (rather than a location in the PC RAM) so that it can update the PC RAM location of another context while still updating its own PC (register). This eliminates the need for a double update of the PC RAM in one instruction period. In FIG. 8D the short PIMMED (Program Immediate) value of the COMBO instruction (8 bits) is evaluated as a signed displacement (sign/magnitude) when used to modify a PC value. This allows relative jumping 127 locations backward and forward.

Figure 8E:
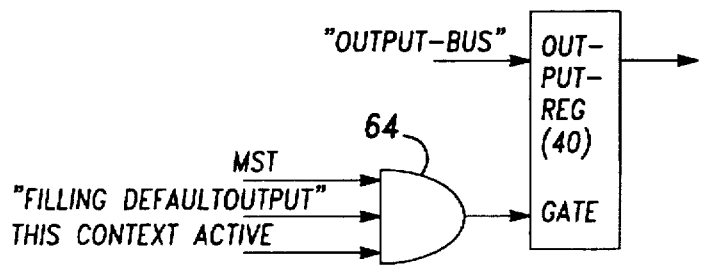

FIG. 8E illustrates an output register. The illustrated register is 40 bits wide. The register is written when gated by the signals supplied to AND gate 64. The signal designated Mst is the main store clock. This signal appears in numerous places throughout the circuitry. It is one of the principal timing signals that controls operation of the HI/O processor. This timing signal and the other principal timing signals will be more fully described in connection with FIG. 9.

Figure 8F:
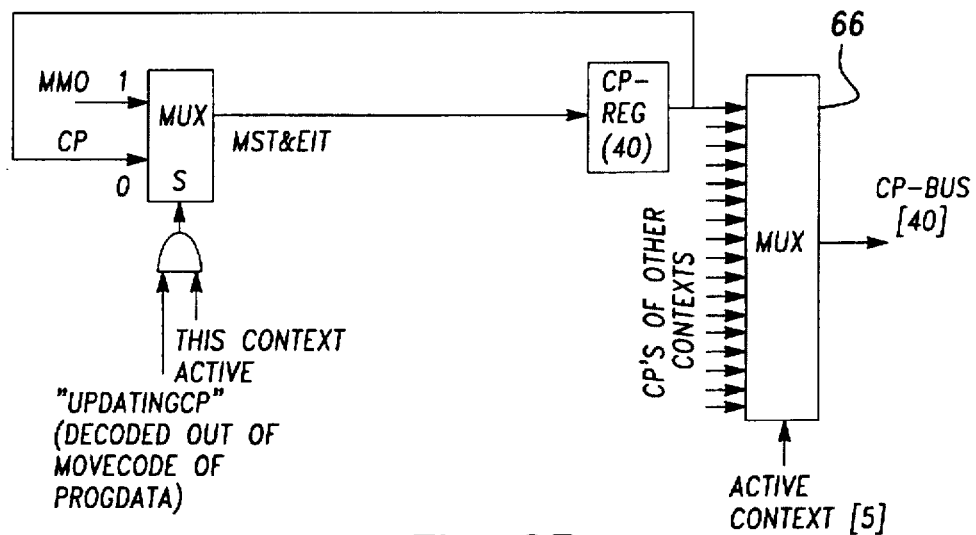

FIG. 8F illustrates a generic CP register configuration. There is a CP register for each context. This register is 40 bits wide, though size varies based on context need. It is updated by using the main math out (MMO) value. The CP register uses the "this context active" signal to ensure that the register is updated at the proper time relative to the context that is active. The multiplexer 66 supplies a signal on the CP-bus when a context's CP value is used in the main math unit. The active context code is used to select which CP register value is actually used in the main math unit. For instance, if another context is running a routine where it is required to AND out bit 26 of its CP register, the active context code (of this running context) will select its own CP value to be fed to the main math unit for ANDing. Thus its bit 26 gets ANDed out and then its CP register will be rewritten at the end of the current instruction.

Substantial on-board RAM capacity is also provided for the HI/O microprocessor 1012 through a set of RAM circuits 1138 which function as a collection of registers. These RAM circuits 1138 include a local RAM circuit 1140, which may be employed to store up to 128 40-bit words in this embodiment. The RAM circuits 1138 also include a set of registers which are dedicated to the 24 processing contexts of the HI/O microprocessor 1012. Each of these sets of dedicated registers includes a general purpose register GP1, a general purpose register GP2, a general purpose register GP3 and a program counter PC, each addressed by the active context code in a 24 location RAM. A checksum circuit 1142 also provides error checking on external data transmissions for 10 of the contexts (namely the SCSI and SASMMU contexts). A dynamic key RAM 1180 is also used to provide a dynamic key for an encryption algorithm to enhance the security of external data transmissions of some contexts.

Figure 11:
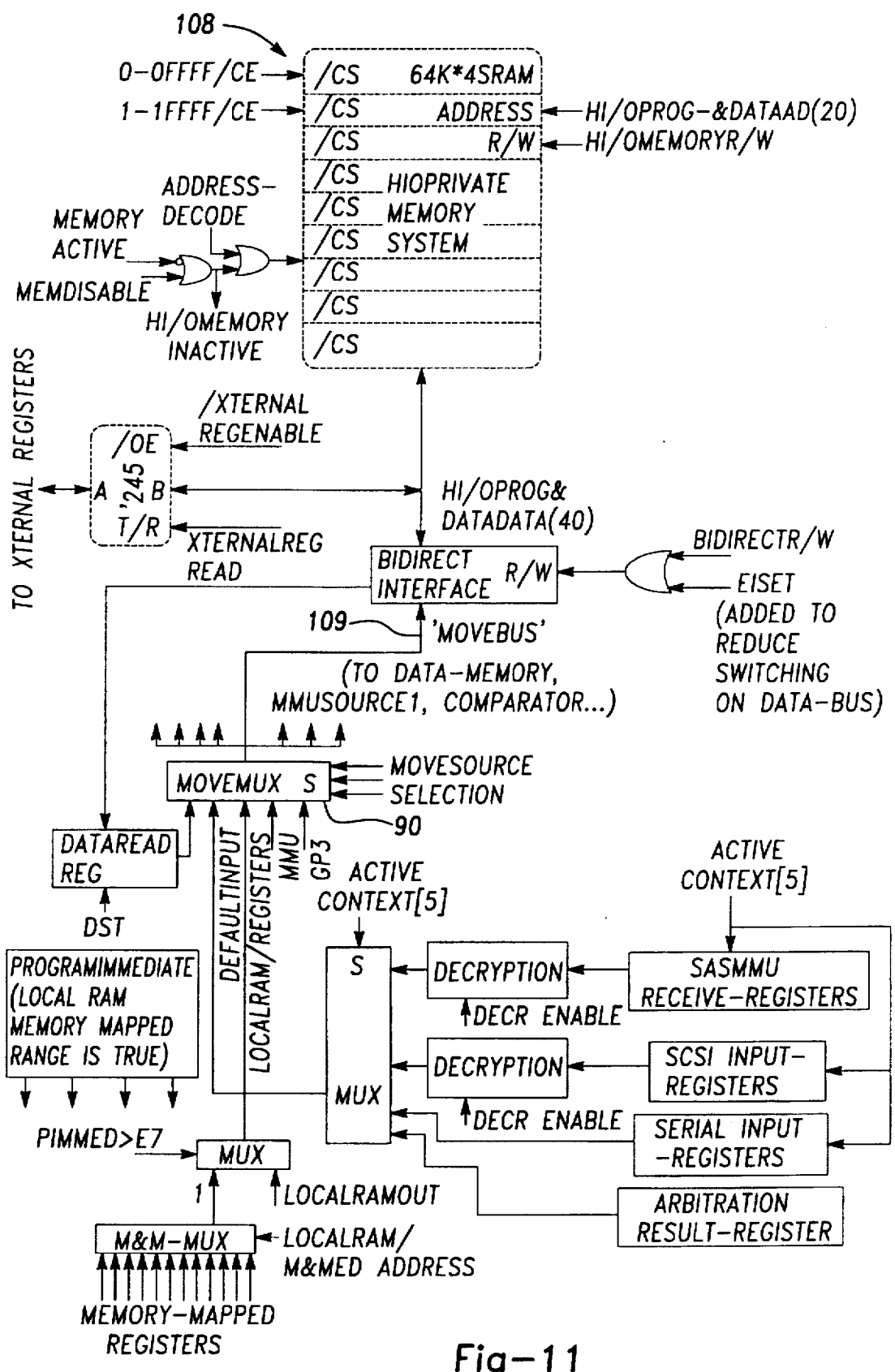
FIG. 11 is a detailed block diagram of the move multiplexer circuit contained in mux module circuit 1146 of FIG. 3 and of the external RAM and program data memory RAM.

FIG. 11 shows a more detailed schematic on how the external RAM and program data memory RAM is constructed. The RAM is configured into different banks and there are two pre-decoded chip enable signals (CE) to select which bank is being used. The chip enable signals are supplied at 108 in FIG. 11. The presently preferred embodiment implements multiple 64K banks of RAM. The presently preferred embodiment employs a 1 megabyte memory space for the HI/O processor. The chip enables can be selectively decoded to switch on banks of different sizes (64K, 128K, 512K and 1 meg). When operating in the 1 meg mode the 0-0FFFF chip enable signal will be active and the other chip enable signal will never be active. FIG. 11 also illustrates a portion of the move bus discussed below.

The HI/O microprocessor 1012 further includes a main math unit 1134 for performing a number of mathematical and logical operations. As shown in FIG. 3, the output bus 1135 from the main math unit 1134 is connected to several on-board circuits, including the input/output circuits, such as the SASMMU circuits 1110 and the SCSI circuits 1100-1106. A separate comparator circuit 1136 is provided for performing a number of alternative compare operations. It should be noted that the comparator circuit 1136 is capable of operating concurrently with and independently from the main math unit 1134. In other words, a single compound instruction may be used to cause the main math unit 1134 to perform an addition operation on one set of input source values, while the comparator 1136 is commanded to perform one of a number of possible compare operations on its own separate input source values, one of which may be the output of the math unit. Indeed, as shown in FIG. 3, the output from the comparator provides one of the selectable input sources for the main math unit 1134 during the same clock cycle. The output from the comparator 1136 could also be used to choose the source signals for the main math unit 1134 during the same clock cycle in which the main math unit conducts a desired computational/logical operation.

Centrally disposed in FIG. 3 is a mux module 1146 (move multiplexer) which represents the combination of a number of circuits used to rapidly move data between the input/output circuits and the main math unit 1134, the comparator circuit 1136, the dedicated registers of the processing contexts and the other circuits of the HI/O microprocessor 1012 as shown. The mux module 1146 is shown more fully at 90 in the schematic diagram of FIGS. 12A–12D. The mux module 1146 includes a move bus 109 (FIG. 11) which is tristate buffered onto the program and data bus 1050 of the HI/O microprocessor 1012.

Figure 12A:
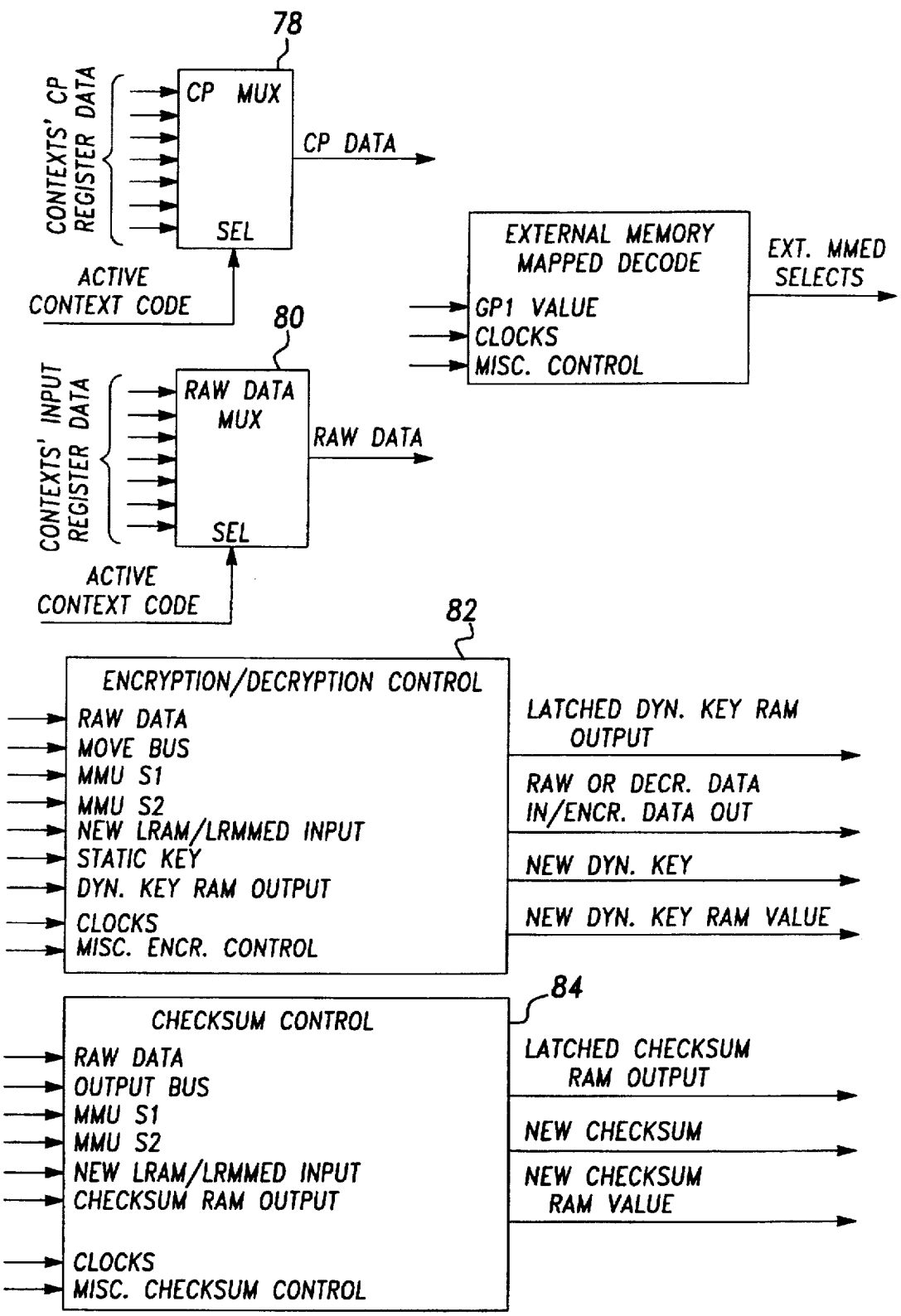
FIGS. 12A–12D represent a general schematic diagram of the move multiplexer and other multiplexing and data manipulation circuits contained in mux module circuit 1146 of FIG. 3.
Figure 12B:
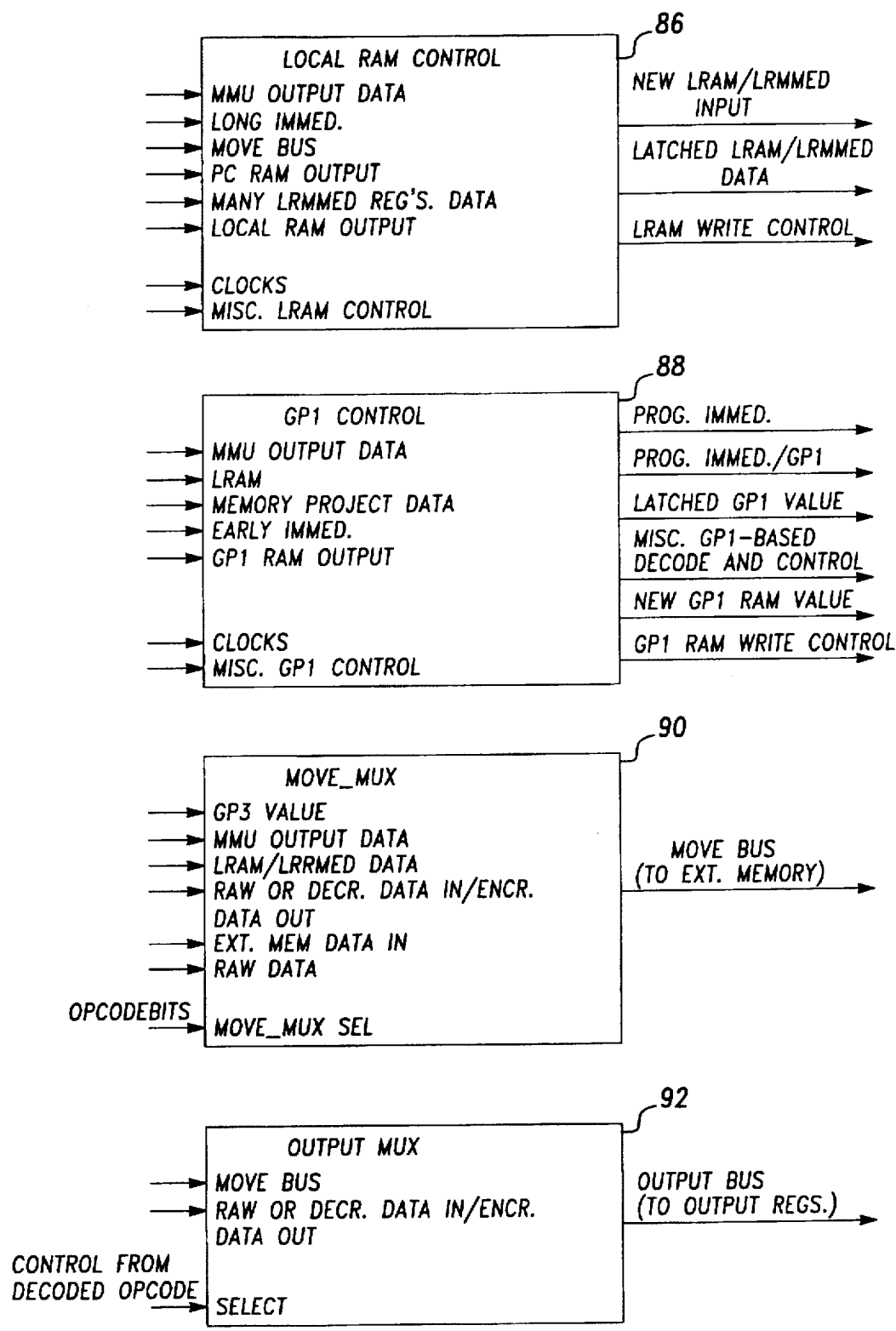
Figure 12C:
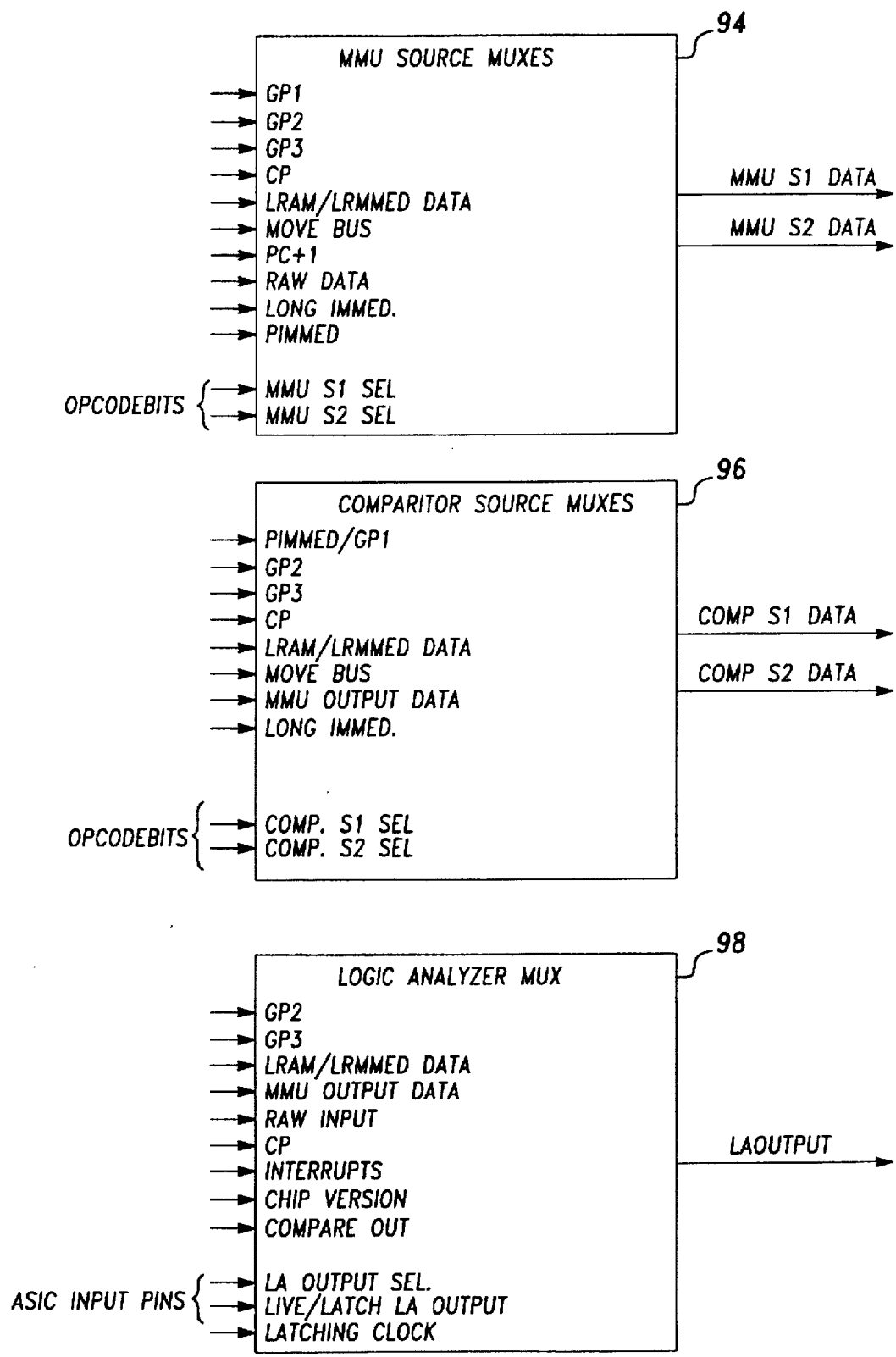
Figure 12D:
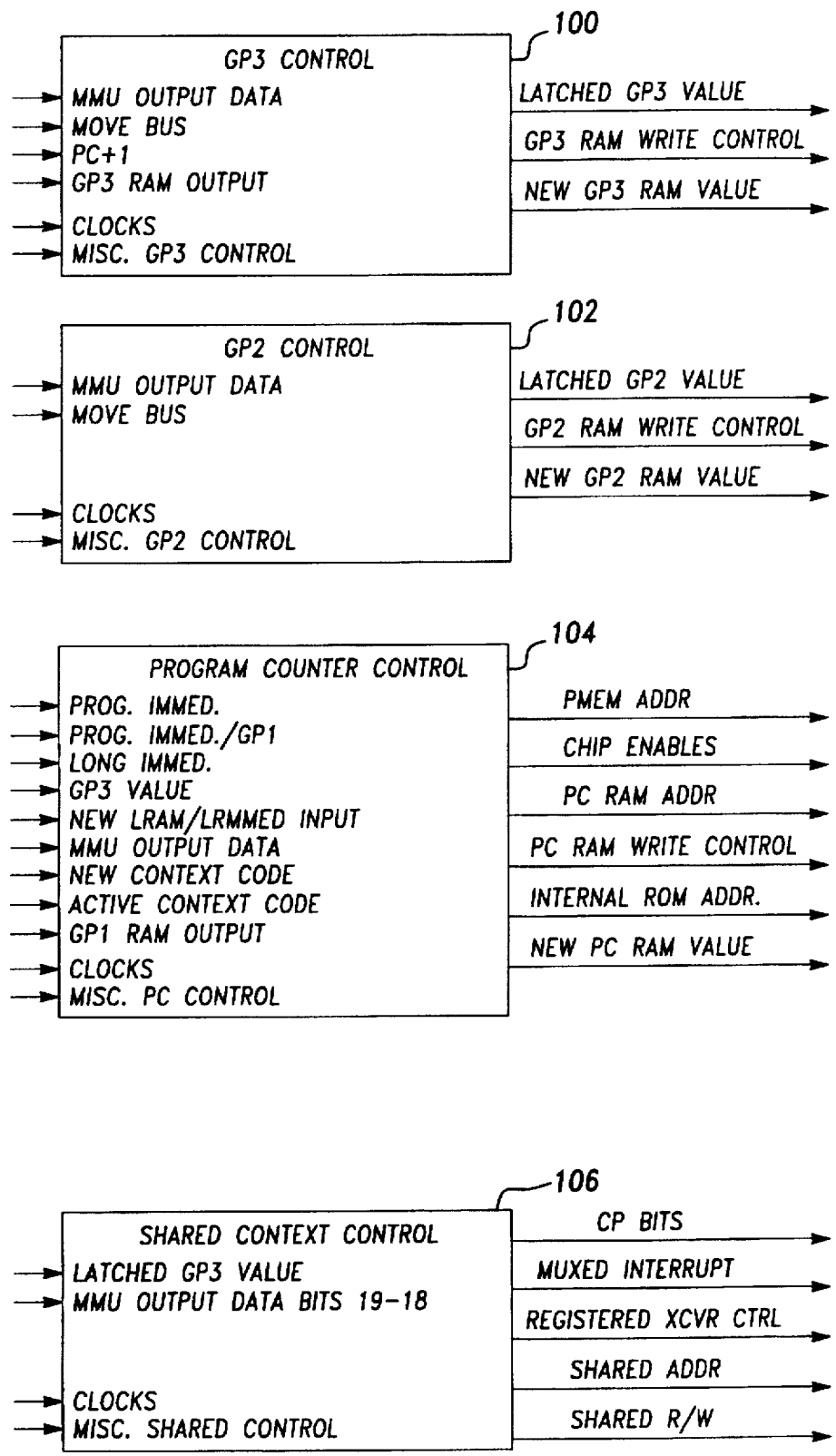

FIGS. 12A–12D are high level block diagrams showing, among other things, the circuitry found in the mux module. The mux module is also depicted at 1146 in FIGS. 3A–3B. Essentially this circuitry is a collection of multiplexers for different purposes. For example, the CP multiplexer 78 selects the appropriate CP register based on the active context code. The input multiplexer 80 selects raw data from the context's input registers, also based on the active context code. Also included is the encryption/decryption control module 82 that may be used to perform hardware encryption and decryption of data. The checksum control circuitry 84 generates checksums for data integrity control. FIGS. 12B–12D show high level block diagrams of the following additional circuitry: local RAM control 86, GP 1 control 88, mux module 90, output mux 92, MMU source muxes 94, comparitor source muxes 96, logic analyzer mux 98, GP3 control 100, GP2 control 102, program counter control 104 and shared context control 106.

Referring back to FIG. 11, a portion of the move bus 109 is depicted in further detail. The circuitry shows how the output of the move bus can be used as a source of data when writing to external data memory. The output of the move bus is always written to data memory. The processor selects what the source of the data is going to be. It can be general purpose register GP3, main math unit MMU, local RAM/ registers or default input. This is controlled by the mux module 90 based on the Move Source Selection input.

Context Cycling

Before proceeding to discuss the specific circuits which are associated with the processing contexts (illustrated in FIGS. 4A–8F), an overall discussion of the operation and interaction between the timed and device processing contexts may be in order. Each of the external devices coupled to the HI/O microprocessor 1012 are handled by separate subroutines running on HI/O microprocessor. Each of these subroutines will run in its own environment (referred to herein as a processing context) so that it does not need to know of the existence of other software running on the HI/O microprocessor 1012 (except for the existence of the timed context which acts as a "scheduler routine"). Because several resources are shared between different contexts (such as the computational functions of the main math unit 1134), only one context will be active at one time (with active meaning that its software instruction is currently being executed). Of course, it could be reasonable for more than one context to be active at one time, provided that more than one set of shared resources is also provided.

All processing contexts are preferably controlled by a scheduling mechanism. This mechanism schedules the different processing contexts so that they are coordinated in time (some tasks should run only after others have been completed, while some tasks should be coordinated with tasks in other computer systems), so that over allocation of resources is avoided. It is recognized that much of this scheduling can be orchestrated at compile time since many of the tasks are done over and over again each second one or more times at the same times within each second. Scheduling of those tasks would then be done through the "timed context" (the context enforcing a "timeline"). However there will also be some spontaneous tasks (nonrecurring) which have to be scheduled between the recurring ones.

Processing contexts are assigned different priorities and a priority encoder is used to activate the highest "bidding" context. Bidding requires (a) being scheduled, (b) having an interrupt present and (c) having that interrupt selected on the interrupt MUX. For a processing context to be scheduled, the timed context must set that processing context's scheduler bit, in order to enable the muxed interrupts of the processing context to be forwarded to the priority encoder. Each scheduler bit of a processing context is co-mapped in that processing context's CP register as well as in the timed context's CP register. A processing context will be bidding when it has been scheduled and it needs some software action. For instance, the processing context dealing with human input devices will normally only be bidding when the mouse or keyboard has been touched. After this event has been processed (meaning that this processing context has had the highest priority at least once and has executed at least one instruction), this processing context will not ask for service until the next human interaction. Until then, this processing context is said to be "inactive."

Most interrupts from external sources will be handled in a single instruction, so it should be appreciated that rapid context cycling will be enabled. To make this context cycling highly efficient, each processing context is provided with its own set of registers. In the present embodiment these registers preferably include a program counter, three general purpose registers, a context purpose register (for miscellaneous context hardware configuration) as well as input and output registers. However, it should be understood that a different set of hardware assets may be employed without departing from the principles of the present invention. For example, certain processing contexts may not need input or output registers and a greater or lesser number of general purpose registers could be provided in the appropriate application. The present embodiment uses the same number of general purpose registers for all contexts. When a processing context becomes "active," its program counter and other registers will be available to access or control the shared resources, such as the private program and data memory circuits 1049 shown in FIG. 1 and main math units and comparator (and all other singly provided common use resources).

A processing context can only be "active" when the context has been scheduled, it had the highest priority when priority encoding took place, its op code has been fetched, and it is now executing that op code. An interrupt can be an external event, but some may also be generated through software. Accordingly, it is preferred that each processing context have a set of different interrupt sources, with only one interrupt source selected at a given time. In the present embodiment, one to eight different interrupt sources are provided for each processing context. However, it should be appreciated that a greater or lesser number of interrupt sources may be provided in the appropriate application. As a result, the execution of each instruction effectively sets the condition to execute the next instruction (the interrupt source triggering the execution of the next instruction). The default for this condition would be "always," meaning that the next instruction should be executed regardless of external events, provided that this context is scheduled and it wins priority encoding.

As an example of this process, assume a reception on Serial 5. The timed context schedules Serial 5 several instruction cycles prior to the scheduled transmission of the data from an external source. Serial 5 runs an instruction to set interrupt source to "receive word" and becomes inactive, though still scheduled. When the autonomous state machine of Serial 5 clocks in a full 8-bit word, the received word interrupt is generated. Serial 5 bids for service, and when it wins, Serial 5 awakens and runs an instruction to empty its input register. Then Serial 5 becomes inactive until the next word comes in. This method processes one 8-bit word in one instruction.

Each processing context may be in one of a plurality of different states. In the present embodiment, each processing context may be in one of 4 possible states, which are summarized below. However it should be appreciated that other arrangements of processing context states may be employed without departing from the principles of the present invention. In the "idle" state, the context is waiting for the scheduler routine to set its scheduler latch. In the "inactive" state, the context has been scheduled, but it has no interrupt pending (that is, it is waiting for some event to occur). In the "bidding" state, the context has been scheduled, it also has an interrupt pending (the event has happened), and it is now competing for service based on priority of its interrupt.

Priority encoding for the next instruction takes place two instruction periods before the bidding contest winner's op code is executed. When the interrupt selected by a context becomes true, and it eventually wins priority encoding, its opcode (the function of which probably is to service the interrupt) is fetched during the next instruction period. Since the instruction will not be executed until the instruction period after this, the interrupt will still be present when the subsequent priority encoding takes place. This could cause this context to be active twice for the same interrupt. To assure that a single "event" (such as receiving a word) does not make that device context active for two consecutive instruction periods, a processing context is excluded from priority encoding when it is "new" (that is, when its instruction is being fetched). This guarantees that one instruction of the processing context is executed before that context can bid again. This also means that each processing context will get no more than 50% of the instruction periods. This mechanism also avoids the need for a jump pipeline. When a jump is performed within the HI/O microprocessor 1012, the next instruction is the first at the "jumped to" location.

In the present embodiment, processing contexts have preassigned priority levels. For example, those processing contexts requiring the shortest interrupt response could be assigned the highest priority. However, depending on what a processing context is doing, it might need a less immediate interrupt response than it normally does. So a mechanism is implemented that certain contexts (with preassigned high priorities) can lower their priority level in favor of contexts which are normally lower in priority. Accordingly, it should be appreciated that the HI/O microprocessor 1012 does provide a unique form of dynamic priority reassignment as warranted. A situation can also occur where no processing context is active. In this case, a "NOP" (meaning "no operation") is fetched out of internal bootstrap ROM 1128, so that all registers and memory remain unaffected.

All of the timed functions within HI/O microprocessor 1012 are controlled from the timed context. Based on time, other processing contexts will be scheduled, configurations will be changed, control signals to the H2 microprocessor 1014 generated and so forth. The timed context also governs the control of external devices, such as the debug panel or a crossbar signal communication switch. Indeed, when the HI/O microprocessor 1012 is "reset," all processing context are "descheduled," so that the timed context is the only context running. At RESET, the timed context's program counter "PC" is preset to a predetermined value, which is the first address of the internal bootstrap ROM 1128 program. This bootstrap program is a mini program that loads a slightly more complex program at address zero of the external program and data memory, and then jumps to address zero and begins execution. It should also be noted that the timed context can schedule multiple contexts at the same time up to the maximum number of processing contexts for the HI/O microprocessor 1012. In this regard, the HI/O microprocessor 1012 is provided with a total of 23 processing contexts, not including the timed context. However, it should be understood that the number of processing contexts will depend upon the particular implementation for a context cycling microprocessor according to the present invention.

It should also be appreciated that in some applications it would be preferable to create the general schedule for the timed context in advance. Within this general schedule, slots in time should be left to provide for "spontaneous" needs (such as for sporadic communication, disk transfers and so forth). Since the HI/O microprocessor 1012 does the time keeping for the common core computer, it is preferred that this schedule should be enforced by the HI/O microprocessor. This schedule would provide a pseudo-queue list, which should be both application and system dependent. For example, this schedule could contain the times to start transfers from the shared memory system to the private memory system to do sibling communication, arbitration and so forth. As such, this schedule should be coordinated with tasks to be performed by the H2 microprocessor 1014 and coordinated with other computers that communicate with the system. Besides providing the "start time" for a specific context, the timed context pseudo-queue schedule should also be able to control the specific task that a context is going to accomplish. This is achieved by giving the timed context access to all program counters of other processing contexts.

If tasks are to be started at specific times, the context running that task should be done with its previous task before it is scheduled again. Every scheduled context will need a certain amount of time to accomplish a specific task. Once this time has elapsed, its task should be finished and the context should have de-scheduled itself. Various reasons could cause the task not be completed in the assigned time period (broken data link, SCSI problem and so forth). In such an event, the task should be interrupted and the processing context should be "reset," so that it can resume proper operation. The timed context will set the timeout periods for each context by a scheduled "timeout" interrupt when the task should be completed. When the interrupt occurs, the timed context will determine whether the task was completed by reading the message status or scheduler latch (latch should have been cleared by that context if finished in time). If the task is unfinished, the timed context will first "deschedule" that context, then preset the PC of that context to an error service routine if appropriate, and then again schedule the context to run the error service routine. After this, this processing context's task should be ready to be rescheduled again. Note that the timed context may schedule or deschule other contexts, since it has access to the scheduler bits of the 23 other processing contexts (timed context is perpetually scheduled, thus has no need for its own scheduler bit). Each of the 23 other processing contexts, however, may not schedule itself, but only deschedule itself, since these each of these contexts must already be scheduled and active to update its scheduler bit.

Software Reference Model

Figure 18:
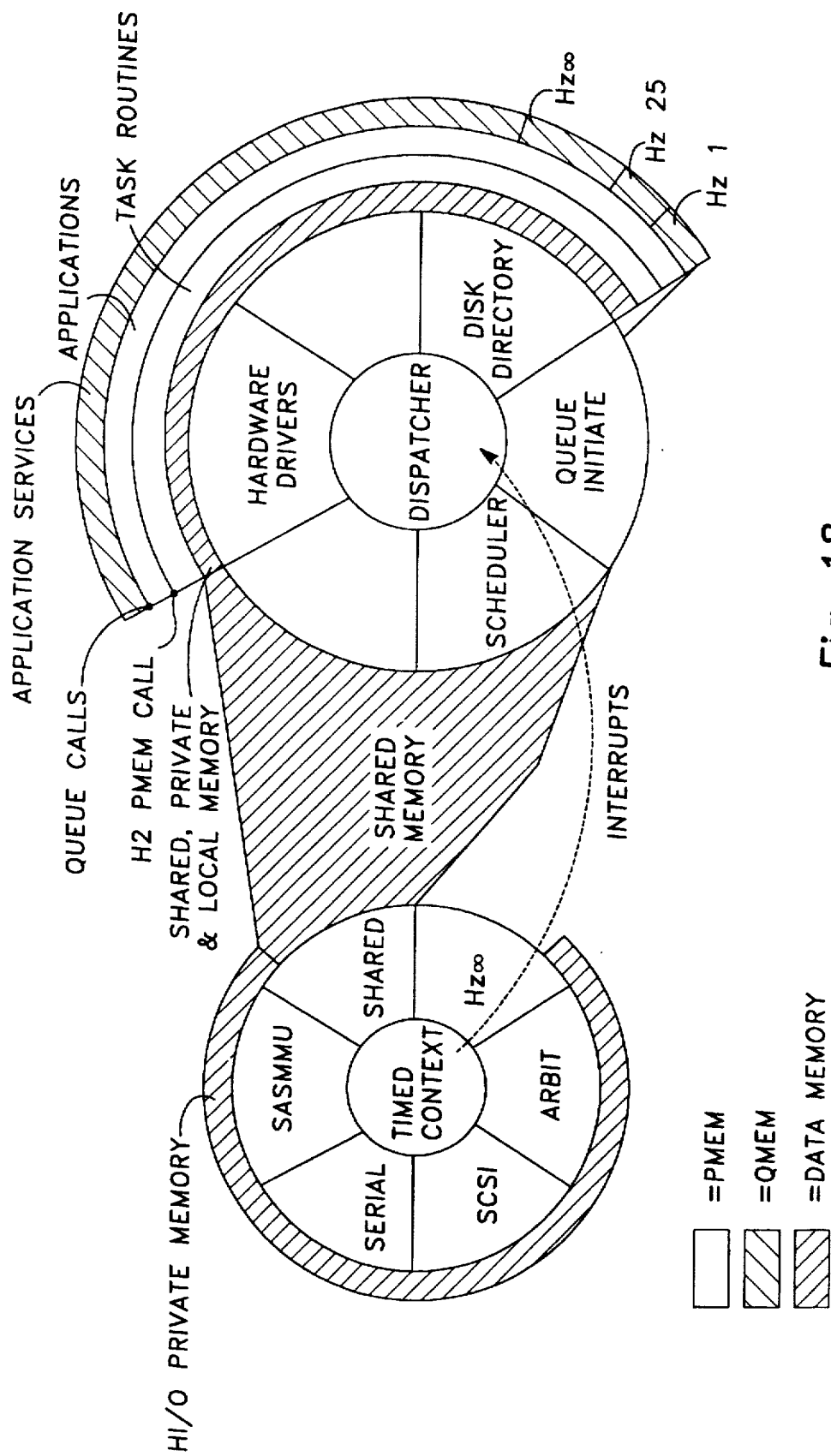
FIG. 18 is a diagram of the software reference model of the common core computer.

The H2 and HI/O processors of the common core computer 1000 interact with one another through shared memory and by means of interrupts and other control signals. FIG. 18 illustrates this relationship. As previously described, the H2 processor is primarily involved in performing process control applications developed by the process control engineer to accomplish different process control tasks. The HI/O processor is principally involved in handling asynchronous events, such as communication with external devices. Both processors are capable of operating independently of one another, although in the common core computer configuration these two processors have a symbiotic relationship, the H2 processor performing most of the mathematical and logical computation functions and the HI/O processor handling communication with the outside world. Although both processors have their own internal clocks, the HI/O processor controls the overall timing of the system. The HI/O processor supplies the H2 processor with its base 72 MHz clock.

Referring to FIG. 18, the timed context of the HI/O processor sends timing signals via interrupts to the H2 processor. These interrupts are responded to by the Dispatcher software routine of the H2 processor. In this way the H2 processor is able to be synchronized with the GPS system. This architecture allows all common core computers to be synchronized to a common time base (via GPS satellite, for example). Such synchronization is extremely valuable in a process control application, as many processes running concurrently will need to be coordinated possibly on a geographically large, worldwide scale. Note that the HI/O and H2 processors are able to share data through the shared memory that is accessible to both processors. In the presently preferred embodiment, the shared memory comprises a mutual data memory system of both processors. Although the presently preferred embodiment employs Harvard architecture for the H2 processor, this is not a requirement. The invention can be implemented using the Princeton or Von Neumann architecture. As noted above, the Harvard architecture is presently preferred because the illustrated Harvard implementation is able to execute instructions more quickly.

As illustrated in FIG. 18, the program memory (PMem) is dedicated principally to the handling of the different functional contexts. Essentially, these functional contexts break down commonly performed input/output, arbitration and timing tasks into separate functional modules that may be rapidly cycled through without undue computational overhead to save state. In a conventional processor arrangement the machine state is saved by pushing the values of all registers onto a stack, before a jump operation is executed to begin processing a different context. When the new context procedure is completed, the conventional system restores the state of the processor by popping from the stack all of the previously stored register values. This takes a great deal of time, particularly when the processor has a large number of registers that must be saved. The present invention is able to cycle through a plurality of contexts at high speed, without this computational overhead. Because the states are always saved automatically, context switching can occur virtually instantaneously.

The H2 processor of the preferred embodiment has program memory (PMem) that is dedicated to coordinating the schedule of process control tasks based on the timing information received by the Dispatcher from the timed context routines of the HI/O processor. This timing info is only one of the factors which influence the tasks to be scheduled. There are also dynamic inputs which influence this scheduling. Like the HI/O processor, the H2 processor has its own data memory. A portion of this data memory may be shared with the HI/O processor, as illustrated.

The presently preferred embodiment employs a particular improvement in the Harvard architecture whereby a third queue (QMem) memory system exists in which subroutines are called and executed. Unique to this system, all process control programs are, by design, required to run once every second and to fully execute all required steps within one second. To accomplish this a very rigorously enforced software architecture is employed in which all possible data constant and variable memory locations are allocated as part of the system design. This ensures that all memory locations are accessible by direct addressing to gain speed. In addition, each operating period is subdivided into different time segments, to ensure that all time critical applications are run every second, leaving any remaining unused cycle time available for less critical applications. In the preferred embodiment three different time segments are employed. These are labeled Hz1, Hz25 and Hz∞. The Hz1 time segment is used for all process control applications. This is where all time critical routines are run. The Hz25 segment is optional. It may be used for nontime-cricital tasks. The Hz∞ segment is used for any back burner or housekeeping operations that only need infrequent attention.

Figure 19:
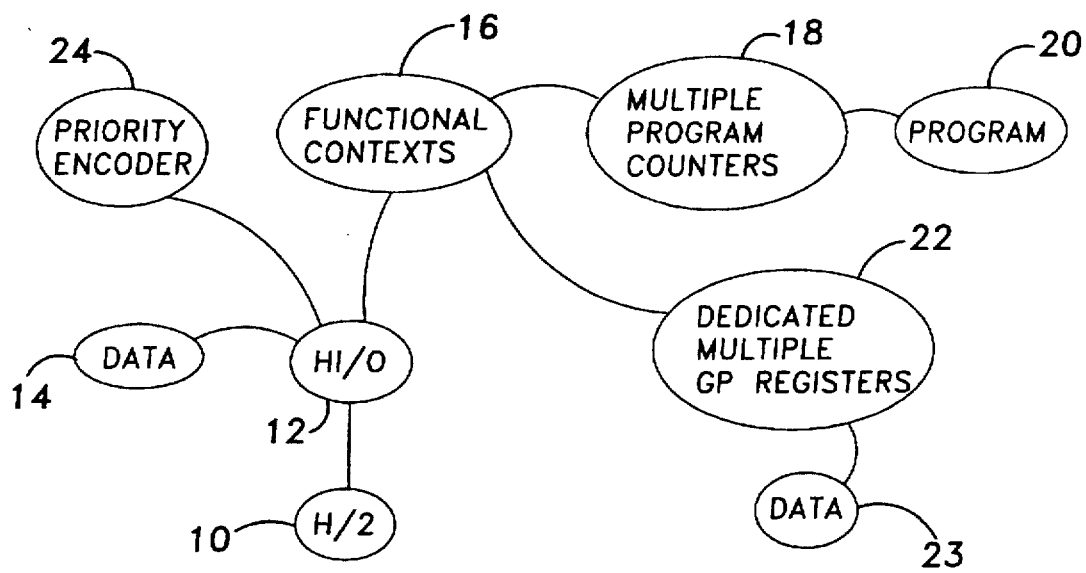
FIG. 19 is a data flow diagram illustrating how the HI/O processor saves state.

Referring to FIG. 19, the HI/O processor's function is further illustrated. In one respect, the HI/O processor may be considered a multi-protocol data router. It supplies data to the H2 processor through shared memory. Thus the H2 processor is able to concentrate on performing all time critical tasks without concern for coordination with external devices that may require asynchronous communication capability. Thus in FIG. 19 the H2 processor entity 10 communicates with the HI/O processor entity 12. External data is input and output through the HI/O processor as illustrated at 14.

The HI/O processor supports a plurality of functional contexts 16. These functional contexts may represent different protocol types (such as SCSI protocol or serial protocol) or they may represent different instances of a single protocol. (Multiple contexts, like the serial context, can execute the same routines.) Each of the functional contexts has associated with it its own dedicated program counter, depicted at 18. These individual program counters each support an individual processing program indicated at 20. Although programs 20 can be for any function, the principal function of these programs within the preferred embodiment is to handle communication and system timing, as previously discussed. The functional contexts 16 also each include dedicated general purpose (GP) registers 22. These registers are used to store the individual data 23 used by each of the functional contexts.

By providing an architecture to support functional contexts that have multiple program counters and dedicated multiple general purpose registers, the system is able to save state automatically when switching from context to context. Unlike conventional systems which push and pop register values on and off of a stack, the present system allows all important state variables, such as the program counter value and all register values, to be stored automatically in their respective dedicated program counters and GP registers. As the HI/O processor cycles from context to context, the operation of a given context may be suspended, but the state is fully preserved until that context is next given CPU attention.

The context cycling architecture of the HI/O processor allows for very rapid cycling between contexts. In fact, in the presently preferred embodiment, every successive instruction executed by the HI/O processor is within a different functional context. All of this is performed without the need to save state in the conventional fashion using a stack data structure. Recognizing that different functional contexts may have different priorities, the presently preferred architecture also includes a priority encoder 24 as part of the HI/O processor. The priority encoder tells the HI/O processor which of the active contexts to operate next.

Further Details of Processor Components

Figure 4A:
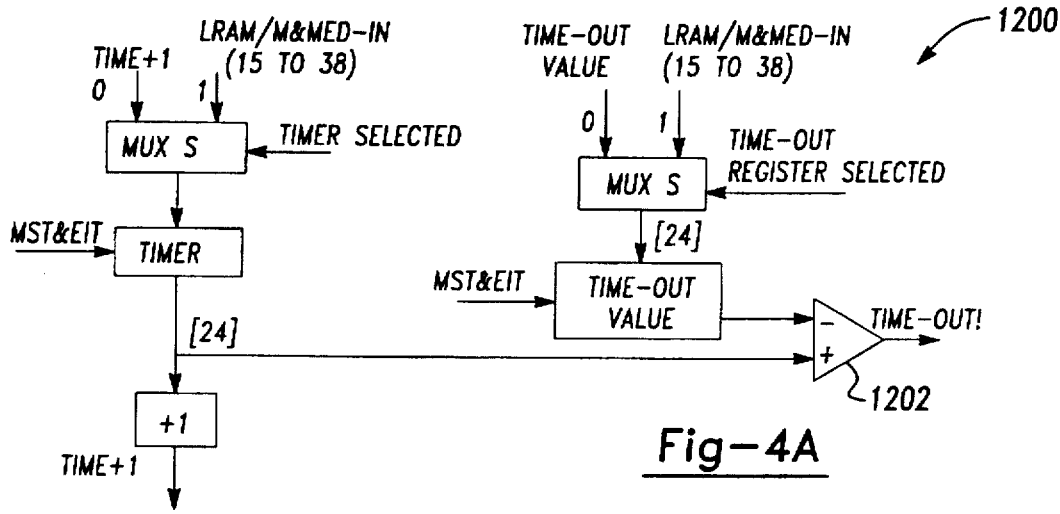
FIG. 4A is a detailed block diagram of the timer circuit associated with the timed context.

Referring now specifically to FIG. 4A, a detailed block diagram of a timer circuit 1200 for the timed context is shown. This 24-bit timer is presettable and should be synchronized to whatever synchronizing source of time is used for the HI/O microprocessor 1012 (such as the UTC or GPS pulse). The timer circuit 1200 increments at the 112 ns instruction period shown in FIG. 9 and its value is compared against a timeout value, which is also set by the timed context (or any other suitable context). The Mst and Eit clock signals are also illustrated in FIG. 9. The timer circuit 1200 includes a comparator 1202 for comparing an incrementing timer value with a preassigned timeout value. Once the timer exceeds this timeout value and timeout was selected as an interrupt source by the timed context, it will begin bidding and will immediately win priority encoding (because the timed context has the highest priority of all 24 contexts). In this particular embodiment the maximum period attainable with this 24-bit timer is approximately 1.8 seconds. However, other suitable timer periods could be provided in the appropriate application.

Once active, the timed context goes through a list of items to do for that moment. While this list may initially be built by the compiler, it may also be updated dynamically, such as by the H2 microprocessor 1014. Items on the list could include the configuring of the sibling ports, scheduling of the other processing contexts, descheduling of any processing contexts (if they have "timed out") the generation of an interrupt to the H2 microprocessor 1014, and the running of specific subroutines. As mentioned above, processing contexts are scheduled by setting the "scheduler" latch bit of the corresponding context. This latch is mapped into the timed context's CP register (that is the context purpose register). When the timeout period defined for that context is reached, the timed context will diagnose whether a particular context finished its task, and if it did not finish, then the timed context will "deschedule" it by resetting the same scheduler latch. Descheduling a processing context or resetting the microprocessor will automatically change the interrupt source selected by that context to the "always" selection. It should also be noted that the timed context can always deschedule another context, whether or not the other context has finished its task.

Figure 4B:
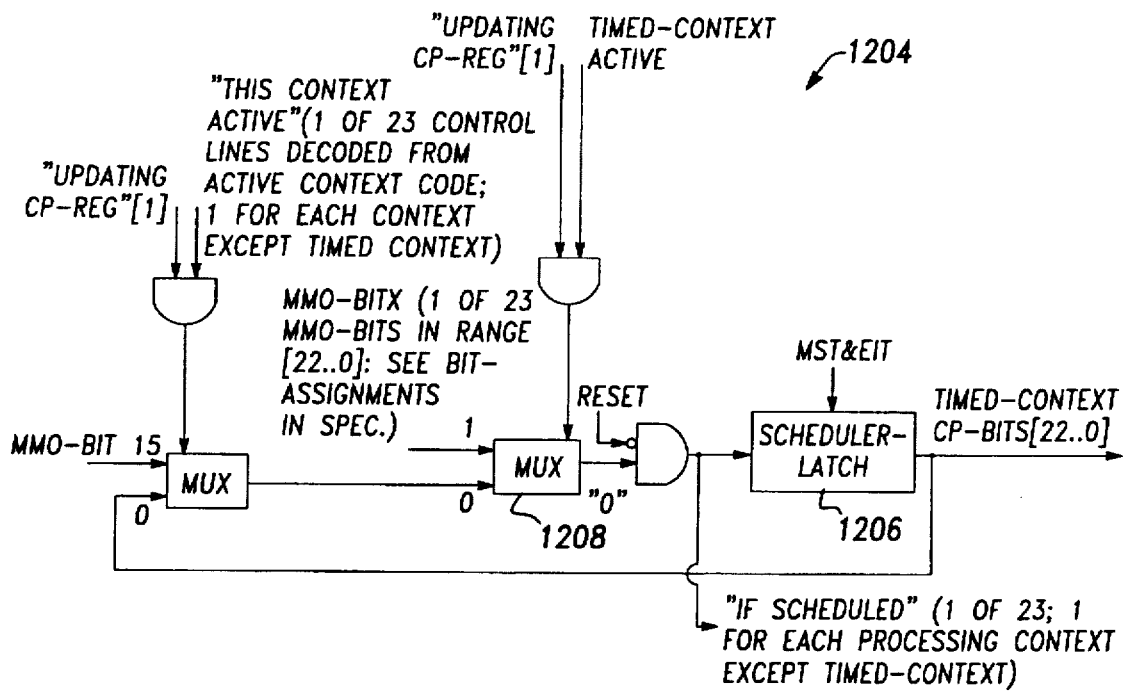
FIG. 4B is a detailed block diagram of a portion of the context purpose register for the timed-context, which is contained in the context management circuit (1132) generally shown in FIG. 3.
Figure 4B:
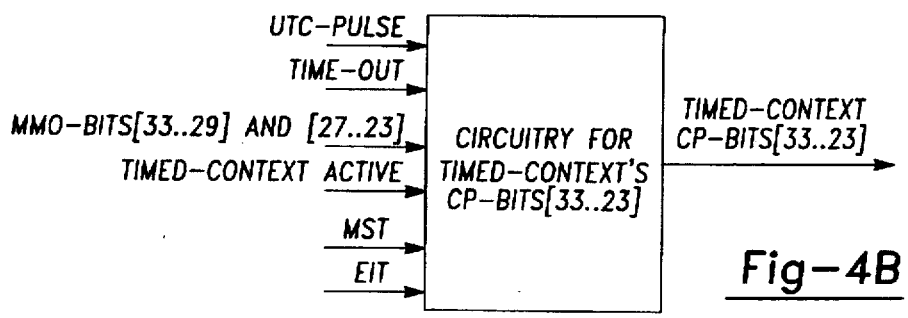

Referring to FIG. 4B, a detailed block diagram of a scheduler latch mechanism is shown. In this regard, the CP register 1204 includes a separate scheduler latch 1206 for each of the processing contexts of the HI/O microprocessor 1012. In this regard, the CP register 1204 includes a multiplexer 1208 which is connected to a different bit of the main math output bus 1135 (shown in FIG. 3). For example, in terms of the present embodiment, the list set forth below identifies one of the many possible connection schemes that could be employed. The preferred embodiment has 23 processing contexts corresponding to the context scheduler bits enumerated below as bits 0 through 22, and shown in FIG. 4B at 1204:

bit 0: (Sasmmu-)Receiver1 context scheduler bit bit 1: (Sasmmu-)Receiver2 context scheduler bit bit 2: (Sasmmu-)Receiver3 context scheduler bit bit 3: (Sasmmu-)Receiver4 context scheduler bit bit 4: (Sasmmu-)Transmitter1 context scheduler bit bit 5: (Sasmmu-)Transmitter2 context scheduler bit bit 6: Serial 1 context scheduler bit bit 7: Serial 2 context scheduler bit bit 8: Serial 3 context scheduler bit bit 9: Serial 4 context scheduler bit bit 10: Serial 5 context scheduler bit bit 11: Serial 6 context scheduler bit bit 12: Serial 7 context scheduler bit bit 13: Serial 8 context scheduler bit bit 14: Serial 9 context scheduler bit bit 15: Serial 10 context scheduler bit bit 16: Shared Context context scheduler bit bit 17: SCSI1 context scheduler bit bit 18: SCSI2 context scheduler bit bit 19: SCSI3 context scheduler bit bit 20: SCSI4 context scheduler bit bit 21: Arbitration context scheduler bit bit 22: Hz∞ context scheduler bit Other bits within the CP register 1204 have been assigned the following functions:

bit 23: H2-interrupt bit 24: Interrupt-vector ("0" is highspeed)

bit 25: "Unprotect" PC-registerRam

When this bit is set, the timed context sees the PCs of other context mapped into the LRAM space of Local RAM 1140 (this feature could be utilized during reset, scheduling or error recovery routines). This bit is automatically cleared at RESET bit 26: HI/OWatchdog bit 27: Immobilize bit 28: Timeout bit 29: activity-change bit 30: Received UTC-puls bit 31: H2-reset bit 32: Enable Sibling1 Reset bit 33: Enable Sibling2 Reset It should be noted that the timed context has no scheduler-latch since it runs the scheduling program. It is always scheduled, though possibly not active at any one moment. After a RESET, the timed context will be the only context running.

Pseudo-Queue

As previously noted, the H2 processor is preferably a Harvard architecture processor having separate program and data memories. In its presently preferred form the H2 processor also has an additional memory, called the queue memory, for storing the master program that calls other subroutines from program memory. This has been found to be a particularly desirable configuration for process control applications, as it segregates the prewritten, well-tested standard subroutines from the more application-specific programs written by the control engineer. Although the presently preferred embodiment of the HI/O processor is not a true Harvard architecture (it does not require physically separate program and data memories) the benefits afforded by a queue memory are nevertheless present. Accordingly, the present invention implements a software pseudo-queue.

Figures 5A, 5B:
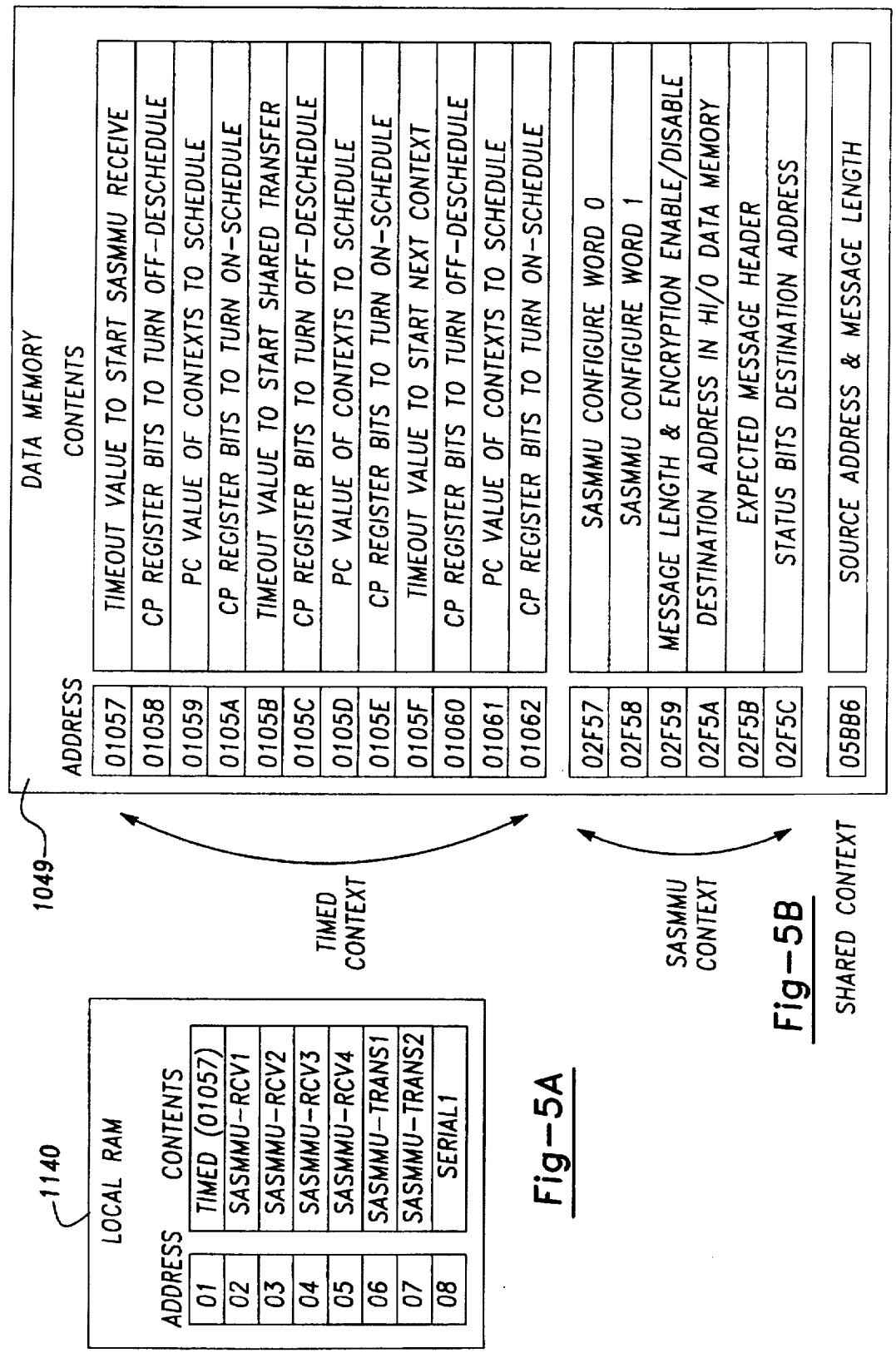
FIGS. 5A and 5B provide diagrammatic views of typical pseudo-queue entries according to the present invention.

FIGS. 5A and 5B give some examples of how this pseudo-queue memory works. The pseudo-queue memory is implemented as part of the HI/O data memory. Pseudo-queue pointers for each of the contexts are stored in local RAM. FIG. 5A depicts the memory space within local RAM circuit 1140. FIG. 5B depicts a portion of the memory space within the private program and data memory circuits 1049. Every context has its own pseudo-queue. In FIG. 5B, a portion of the pseudo-queue of the timed context, the SASMMU context and the shared memory context have been illustrated. There would be similar pseudo-queues for each of the remaining contexts. The entries in the pseudo-queue comprise groups of 40-bit values stored in data memory. These values function as subroutine calls and parameters necessary for those calls. The pseudo-queue for the timed context functions more like an event queue, triggering various events within the remaining contexts. The remaining pseudo-queues contain the parameters necessary for a particular context to complete its required function. These parameters may include where to read or write data, how to set up context specific resources and where in PMem to continue execution. In one respect, the remaining pseudo-queues behave more like job queues directing which subroutines to call next.

Referring to FIG. 5B, at the portion designated as "timed context," each scheduled event in the timed context pseudo-queue requires several 40-bit values. Note that the contents at addresses 01057, 0105B and 0105F each correspond to a timeout value used to start one of the other contexts. In this example, the value stored at 01057 is a timeout value at which time the timed context will start the SASMMU receive context by values at 0105C–0105E. The value at 0105B will start the shared transfer context. Following each timeout event are three additional 40-bit values used to toggle CP register bits and PC values to deschedule and schedule events.

Referring in FIG. 5B to that portion of the pseudo-queue that corresponds to the SASMMU context note that each entry is a parameter used in the subroutine that the timed context told the SASMMU context to jump to. Each context's pseudo-queue has a queue pointer stored in local RAM (shown in FIG. 5A). The timed context has the ability to update its queue pointer and those pointers of the other contexts. Thus when a routine within a certain context starts, its pointer is used to locate the correct parameters to use in running that routine. The timed context is therefore able to revector where the other contexts run and acquire their run parameters, by writing to the other contexts program counters and queue pointers. In this way the timed context can change the subroutines and the parameters that are used by the other contexts in executing these subroutines.

The timed context is used to enforce a desired task schedule for the various tasks that are to be executed by the HI/O microprocessor 1012 during the normal timeline. This software function is referred to as Time Enforcer. More specifically, the goal for the timed context is to look for timeline timeout events and then respond to these timeouts quickly. The number of consecutive instructions executed by the timed context should be kept to a minimum because the timed context has the highest priority in the HI/O microprocessor 1012 and running software in this context (with "Always" selected as the interrupt condition) will consume 50% of the available instruction cycles.

In the current pseudo-queue embodiment, there are two conditions which necessitate the execution of software in the timed context. The first condition for which the timed context must become involved is for each event which requires the initialization of a PC value for a context. Coincident with the initialization of a PC value for a context, the timed context may also deschedule that or other contexts. In conjunction with the scheduling and descheduling of contexts, the timed context can manipulate the bits in its CP register 1204 for such tasks as immobilizing the H2 microprocessor 1014 or resetting a sibling microprocessor. The second condition for which the timed context must become involved is when one or more bits in the CP register 1204 must be manipulated in order to have the events properly execute. For example, the timed context must clear the Immobilize bit in order to allow H2 microprocessor 1014 to begin its program execution. In this second case, there are no contexts which must have their PC values initialized—the requirement is that there is a manipulation of the timed context CP register, which involves setting and clearing of bits in that register.

The Time Enforcer function should not place restrictions on the number of contexts which can be scheduled or descheduled at a given time. In this way, the total number of instructions executed in the timed context can be minimized and the desired task scheduler software will be given the authority on how to most efficiently arrange the schedule. The number of contexts that may be scheduled or descheduled is the maximum number of HI/O contexts, not including the timed context, which is 23 in this particular embodiment. In this regard, it should be noted that the timed context does not have a scheduler bit.

A context may both be descheduled and then rescheduled as part of the same pseudo-queue event. An example of this situation occurs when the SASMMU-RCV reception routine is to be scheduled for one or more of the SASMMU circuits 1110. The timed context should deschedule the appropriate SASMMU-RCV context (ensuring that it was not still executing or waiting to execute), then set the SASMMU-RCV context's PC value to the initial location of the reception routine, and finally the timed context would schedule this same SASMMU-RCV context for the receiving of data.

In order to reduce the number of instructions run in the timed context, the resources that are initialized by this context should be kept to a minimum. Therefore the timed context only manipulates scheduler bits and other CP bits as well as PCs. The timed context is the only context that has access to the Program Counters (PCs) of the other contexts and the scheduler bits for the other contexts. Therefore, the timed context has the responsibility to initialize another context's PC and to set (or clear) the scheduler bits in order to have other contexts begin (or terminate) program execution. The timed context must also set or clear the other bits in its CP register 1204 (for example, H2 Immobilize and UTC Pulse Received) as appropriate. A further discussion of the manipulation of the bits which are a part of the CP register 1204 will be provided below. All required parameters that are accessible by the context which will be carrying out the actual task are to be initialized by that context. In other words, if the SASMMU-RCV context is to be scheduled to receive a message, then, except for pointers to parameters, the SASMMU-RCV context will be the one who initializes all necessary resources it has access to in order for the task to successfully complete.

The following information is required for the Time Enforcer function to successfully complete its task:

A. The Timeout Value for the Next Event

B. The CP Bits Which are to be Cleared for this Event

C. If Context are to be Scheduled for this Event, The Context IDs and the Initial PC Values for the Contexts Which are to be Scheduled D. The CP Register Bits Which are to be Set If the writing of at least one PC value of a context is required, then this information is stored in a minimum of 4 words in the timed context pseudo-queue. If only the timed context's CP register manipulation is required, then only 3 words are required. The specific parameters which are a part of the timed context pseudo-queue are discussed in detail below:

A. Timed Out Value Entry

1. Timeout Value (24 Bits)—the time (in HI/O 112 ns clock cycles) at which the next event is to occur. An event is defined as the scheduling of one or more contexts to carry out a given task or the bit manipulation of the timed context CP register 1204. This information requires one berth each instance the Time Enforcer routine is executed.

B. CP Register AND Mask Entry

1. CP Manipulation Only (1 Bit)—this bit is included in this word in order to support the case when only a timed context CP register manipulation is required. If this bit is true, then the CP register 1204 is only to be updated (no contexts require their PC values to be written). If this bit is false, then there are contexts which require their PC values to be written.

2. CP Register AND Mask (CP Bits to Clear) (34 Bits)—the mask for the timed context CP register 1204 is provided for the contexts that are to be descheduled and other bits which may concurrently need to be cleared (for example, the Activity Change flag). For the bits in the CP register 1204 which are to be cleared, the corresponding bits in this word should be false. Any bits that are true indicate that those bits are to be kept in the same state they are currently in. It is preferred to clear the scheduler bit for the context which is to have its PC register initialized to ensure that the context is not running when timed writes its PC value or to be descheduled until at least the next event. Therefore any context which will have its PC register written to by the Time Enforcer routine should have a zero in the bit position for this context's scheduler bit. This word is required each time the Time Enforcer routine is executed.

C. PC Value Entry

1. Final PC Value word (1 Bit)—this indicates there are more PC Value words which are required in the specification of the contexts that are to be scheduled at this time. If this bit is true, then this word is the final word in the specification of PC Values. If this bit is false, then there are more PC Value words in the pseudo-queue for this time. Each context that requires initialization to a separate PC Value will require a separate word in the timed context pseudo-queue.

2. PC Value for Context(s) (20 Bits)—the initial PC value for program execution of the consecutive context(s) that are to be scheduled at this PC value.

3. Number of Consecutive Contexts to Schedule (5 Bits)—the number of consecutive contexts that are to be scheduled at this PC value. Consecutive is defined as being in sequence in the PC Register RAM. If the contexts that are to be scheduled at the same PC value are not consecutive, then another word(s) is required in order to specify them appropriately. This field is included as a means to more efficiently schedule SASMMU-RCV contexts which run common routines such as to receive data from a sibling, for example.

4. First PC Register RAM Address (5 Bits)—the address in PC Register RAM that corresponds to the first context that is to be scheduled at this PC address. The first context is defined as the context with the lowest PC Register RAM address to be scheduled at the PC value identified in C.2 above. Note that the PC Register RAM address is done according to active context code number and not the context priority.

D. CP Register OR Mask Entry

1. Jump to Internal ROM (1 Bit)—this bit is a flag which determines whether or not a jump to internal ROM is to be executed. This bit will be cleared in normal operation and will be set when the processor is to execute a reload. In this way, a software reset can be performed. The timed context will jump to FFFE0H and begin executing the internal ROM code, which will in turn load in the external ROM software, performing any necessary QC tests and the loading procedure.

2. CP Register OR Mask (CP Bits to Set) (34 Bits)—the mask for the timed context CP register 1024 that is provided for the contexts that are to be scheduled and other bits which may concurrently need to be set (for example, when loading a H2 Program, the Immobilize Bit). For contexts that are to be scheduled and for other bits in the CP register which are to be set, the bits corresponding to the position in the timed context CP register should be true. Any bits that are false indicate that those bits are to be kept in the same state they are currently in. This information requires one word each time the Time Enforcer routine is executed.

At this point, it might be helpful to illustrate a further example of the pseudo-queue method of operation according to one form of the present invention. In this regard, each of the 24 contexts of HI/O microprocessor 1012 preferably has its own "Pseudo-Queue" (PQ) pointer contained in Local RAM (LRAM) memory 1140 at the address corresponding to that context's active context code. This concept is illustrated in FIG. 5A, which diagrammatically shows a series of addresses in LRAM 1140 and a label corresponding to the contents at each of these addresses.

FIG. 5B diagrammatically shows 3 sets of memory addresses in the a portion of the private program and data memory circuits 1049 for the HI/O microprocessor 1012. As will be seen in the example below, a portion of the time context (Time Enforcer) pseudo-queue data is stored at address locations 01057 through 01062. Similarly, a portion of the SASMMU context receive pseudo-queue data is stored at address locations 02F57 through 02F5C and a one word portion of the shared context transfer pseudo-queue data is stored at address location 05BB6. These small pseudo-queue sections are illustrated to provide an execution example of how a data block might be received and stored into the private program and data memory circuits 1049 by SASMMU Receiver 1 at t=285.594274 ms, and then transferred to shared data memory circuit 1042 by the shared context at t=285.761045 ms, all under the control of the timed context.

Assume that the timed context has just timed out at t=285.594274 ms and its PQ (pseudo-queue) pointer (at 01 hex in LRAM 1140) has the value 0105Bh. In other words, the comparator 1202 of timer circuit 1200 in FIG. 4A has just generated a HIGH timeout signal, which is directed to the priority encoder circuit shown in FIG. 6. Since the timed context has the highest priority of all the contexts, it will win the bidding process, become the "new" context during the next instruction period and then become the "active" context on the next fundamental instruction period of the HI/O microprocessor 1012. While not all operations listed below are necessarily performed on one instruction, the execution sequence is illustrative of the pseudo-queue method of operation according to the present invention.

The timed context reads the word stored in the private program and data memory circuits 1049 (DMem) at PQ pointer value (0105Bh), then increments its pseudo-queue pointer to 0105Ch, and writes the data memory value read to a MMED register FD hex (timeout register mapped into one of the upper 128 locations of the local RAM address space thus updating the next timeout value). In other words, the pointer stored at address "01" in LRAM 1140 will be changed from 0105B to 0105C. The data value, written to FD hex, will be the hex equivalent of t=285.761045 ms in the 1 second timeline of a repeating process control cycle.

Timed context reads the next PQ value from DMem (0105Ch), increments its PQ pointer, ANDs the PQ value read with its CP register 1204, turning off SASMMU1 and writing out the new CP (all in one instruction period). It should be noted here that these timed context operations will not be absolutely time sequential in terms of instruction to instruction execution within the HI/O microprocessor 1012, as the timed context is not permitted to monopolize all of the microprocessor execution time. (Only 50% maximum is permitted).

Timed context reads DMem at PQ pointer value (0105Dh), increments its PQ pointer and uses 20 bits of the PQ value data to set the PC of SASMMU1 to a "receive" routine address. Only SASMMU1 will be scheduled at this time at this PC (bits 9:5 of the data word read=00001b, indicating that only one context should be scheduled at this PC). SASMMU1's active context code (00001b) is also contained in this data word. Finally, the most significant bit in this data word is set to indicate that this is the last PC value word corresponding to this PQ time segment. As will be seen in a subsequent example, more than one processing context can be concurrently operating and even use the same software routine in the process.

Timed context reads DMem at its PQ pointer (0105Eh), increments its PQ pointer, and ORs the PQ value with its CP register in order to schedule SASMMU1 (CP bit 1). The timed context then switches its interrupt source to "Timeout" and is inactive until the timeout at t=285.761045. Accordingly, it should be appreciated that the timed context effectively sets an alarm clock, issues marching orders to one or more processing contexts and simply goes to sleep until the alarm goes off. Each of the other 23 processing contexts are going about their tasks, if so ordered, on an independent basis.

The SASMMU1 context reads DMem at PQ pointer (02F57h), increments its PQ pointer and uses the PQ value as an AND mask for the SASMMU configuration MMed register in the LRAM address space. Thus, as shown in FIG. 5B, a pseudo-queue may be provided for both the timed and device processing contexts.

The SASMMU1 context reads DMem at PQ pointer (02F58h), increments its PQ pointer, and uses the PQ value as an OR mask for the SASMMU configuration MMed register in the LRAM address space. This mask combined with the AND mask will generate a new input/output mux configuration for the physical SASMMU1 circuit. (Generally, a SASMMU context should only modify the bits of this configuration register pertaining to its own multiplexer settings as bits of other SASMMU contexts are maintained in this register as well).

The SASMMU1 context reads DMem at PQ pointer (02F59h), increments its PQ pointer and uses 20 bits of the PQ value as the length of the message it is to receive, with another bit indicating whether or not to decrypt the incoming data.

SASMMU1 reads DMem at PQ pointer (02F5Ah), increments its PQ pointer and uses 20 bits of the PQ value as the destination address of the received data block and the other 20 bits as the PC value of the routine where the SASMMU1 context will jump to do the actual receiving. The SASMMU1 context then jumps to the receive routine and receives the data.

After receiving the block of data of the length specified, the SASMMU1 context reads DMem at PQ pointer (02F5Bh), increments its PQ pointer and uses the PQ value as the "Expected Message Header."

SASMMU1 reads DMem at PQ pointer (02F5Ch), increments its PQ pointer and uses the PQ value as the destination address for the message reception diagnostic bits. Some of the message reception diagnostic bits are generated by comparison of the expected message header to the actual message header and these bits are then written out to data memory at the address value stored at 02F5Ch.

The SASMMU reception task provides two outputs as a result of its execution. These two outputs are: "reception diagnostics" and received data. The message diagnostics are provided in two separate places. One is intended to be short-term and the other is intended to be longer term. The short-term diagnostics are stored just preceding the received data and are utilized by the arbitration processing context in order to determine the validity of the data. The longer term diagnostics are stored at the HI/O DMem location specified in the pseudo-queue for this task. Both locations contain identical information. This information and their relative bit positions are as follows: Checksum Error Detected (MSB); Bad Message Header; Context Not Descheduled; No Data Received (LSB). The short-term diagnostics store this information in the lower 4 bit positions in the word. The longer term diagnostics store this information based on receiver number (it is not configurable via pseudo-queue). The bit positions which are occupied are as follows: Me (Receiver 3 or 4)—Bits 3–0; Sib1 (Receiver 1)—Bits 7–4; Sib2 (Receiver 2)—Bits 11–8.

After the timeout at t=285.761045 ms the timed context reads DMem at PQ pointer (0105Fh) writes the PQ value read to the LRAM MMed register (timeout register) at FDh, updating next timeout value and then incrementing its PQ pointer to 01060h.

The timed context reads DMem at PQ pointer (01060h), increments its PQ pointer, ANDs the PQ value read with its CP register, turning off the shared context (and also turning off SASMMU1 if not already off). The Most Significant Bit (MSB) is equal to zero in the mask data word (NOT CP register manipulation only).

The timed context reads DMem at PQ pointer (01061h), increments its PQ pointer and uses 20 bits of the PQ value to set the PC of the shared context to a "write transfer" routine address. Only one context (the shared context) will be scheduled at this time at this PC (bits 9:5 of the data word read=00001b). The shared context's active context code (01011b) is also contained in this data word in bits 4–0. Finally, the MSB is set in this data word to indicate that this is the last PC value word corresponding to this PQ time segment.

The timed context reads DMem at PQ pointer (01062h), increments its PQ pointer and ORs the PQ value with its CP register in order to schedule shared (CP register bit 16). The timed context then switches its interrupt source to "Timeout" and is inactive until the next timeout.

The shared context reads its first PQ pointer from LRAM and uses this value to read DMem at PQ pointer (05BB6h), increments its PQ pointer and uses 20 bits of the PQ value as the source address of HI/O DMem from where the data block is to be read. Some of the other bits are used as the length of the data block. (It should be noted that the shared context maintains two separate PQ pointers in LRAM, one to point to items in HI/O program and data memory, the other to point to items in shared memory.

The shared context reads its second PQ pointer from LRAM and uses this value to read a transfer parameter stored in shared memory at the PQ pointer. It then increments its PQ pointer and uses 24 bits of the PQ value (transfer parameter) as the shared memory destination address of the data block to be transferred, with 1 more bit to indicate whether this block is to go to the shared data memory circuit 1042 or to H2's program memory circuit 1032 (both of which are preferably mapped into the shared memory space). The shared context then transfers the data block and deschedules itself (clears its CP bit 15).

More than one context can be scheduled at any PQ time segment (turning on all SASMMU Receive contexts, for example) and, if desired, each can run the same code. Contexts running the same code can determine their "context specific" parameters by first reading their active context ID from an LRAM MMed (memory mapped) register and using this information to generate data memory address locations, LRAM address locations, offsets and so forth. While running several contexts in parallel, care should be taken to not over-schedule the processor, as asynchronous data (SASMMU, Serial) may be lost if these context do not win priority to run when they need to.

There are a number of variables which will affect the execution timing which is required by a time enforcement routine. Note that a task scheduler must be aware of the duration required for the time enforcement routine as this time will limit the times at which a context may be scheduled. In other words, the task scheduler cannot choose to schedule contexts at every 112 ns boundary.

The following factors will influence the execution timing of the time enforcement routine:

A. Whether CP register manipulation is the only function which is needed or if PC values are also required to be written to specific contexts.

B. The number of consecutive contexts which are to be scheduled at the same PC value (the number of consecutive contexts that will be scheduled at a given PC value will be referred to as n. This value is equal to the number which is stored in the PC value word).

C. The number of groups of contexts (a single group is a number of consecutive contexts which are to be scheduled at a given PC value and will be referenced as m. One group corresponds to a single word in the pseudo-queue).

Additionally, in this particular embodiment, the number of execution cycles required if only CP manipulation is required is 11. Accordingly, in this embodiment, the number of execution cycles required if PC values are to be written to contexts is:

$$12 + 7m + \sum_{m=1}^{m} (n(m-1)$$

The conclusions that can be drawn about this equation are:
(1) Scheduling a single context requires 19 instructions.
(2) Each context which requires a different PC value (or is not consecutive with the first) requires 7 additional instructions.
(3) Each consecutive context which is scheduled at the same PC value requires 1 additional instruction.

The following provides two examples which further illustrate the concept of concurrently running more than one processing context using the same software routines for at least some of these contexts. In the first of these two examples, the SASMMU-RCV 1 and SASMMU-RCV 2 circuits will be employed to receive corresponding data from sibling microprocessors, while the SASMMU-RCV 3 circuit will be employed to receive data from a network level microprocessor. Then, in the second example, the process of arbitrating between the data received by the SASMMU-RCV 1 and SASMMU-RCV 2 circuits will be initiated.

Commencing then with the first of these examples, it will be assumed that the timeout for the next event is 145Ah. No contexts are to be descheduled at this time and no other bits in the CP register 1204 need to be cleared. The contexts that are currently to be scheduled are SASMMU-RCV 1 (to receive data from Sibling 1), SASMMU-RCV 2 (to receive corresponding data from Sibling 2) and SASMMU-RCV 3 (to receive data from the network) and no other bits in the timed context CP register need to be set. All 3 SASMMU-RCV contexts will be running the common SASMMU-RCV software, which has an initial PC address of 0586h. It should be noted that each of the addresses provided herein are fictitious and are given simply to facilitate understanding of the methods of operation for the present invention. The pseudo-queue entries for this event are as follows:

A. Timeout Value Entry
1. The timeout for the next event is 145Ah, therefore the initial word in the pseudo-queue for this event contains this value.

B. CP Register AND MASK Entry
1. There are (3) contexts which are going to be scheduled, therefore the CP register Manipulation Only bit is false.
2. Since the SASMMU-RCV 1, SASMMU-RCV 2 and SASMMU-RCV 3 contexts will have their PCS written to, they will have their scheduler bits cleared prior to the writing to their PCS. This clearing prior to the writing of the CPs is the preferred practice. However, it should be understood that this and other similarly situated steps may be modified in the appropriate application.

C. PC Value Entry
1. The PC for the contexts that are to be scheduled is the initial address at which the SASMMU-RCV common routine is stored in the program and data memory 1049 (PMem).
2. The PC Register RAM address for the first context (which is SASMMU-RCV 1's active context code) is 00h.
3. The number of contexts to schedule is 3, therefore, the number specified in the (Number of Contexts to Schedule) field must be 03h.
4. This is the final PC address word, therefore the Final PC Address Word bit must be true.

D. CP Register OR Mask Entry
1. The contexts that are to be scheduled are SASMMU-RCV 1 (whose scheduler bit is in bit position 0), SASMMU-RCV 2 (whose scheduler bit is in bit position 1) and SASMMU-RCV 3 (whose scheduler bit is in bit position 2). Therefore, the lower 3 bits in the word will be true and all the others will be false.

In the second of these two examples, it will be assumed that the timeout value for the next event is 2495h. As indicated above, data has been exchanged with the siblings and arbitration is now to occur. Also, this example will include the task of moving a previously arbitrated message to the shared DMem 1042. Accordingly, the SASMMU-RCV 1, SASMMU-RCV 2 and SASMMU-RCV 3 contexts are to be descheduled and the Activity Change bit is also to be cleared at this time. The initial PC for the arbitration common routine is 0642h and the initial PC for transferral of data to shared memory is 0824h. The pseudo-queue entries for this event are as follows:

A. Timeout Value Entry
1. The timeout for the next event is 2495H, therefore the initial word in the pseudo-queue for this event contains this value.

B. CP Register AND Mask Entry
1. There are contexts which require that their PC Register be written, therefore the CP Manipulation Only bit is false.
2. SASMMU-RCV 1, SASMMU-RCV 2 and SASMMU-RCV 3 contexts are to be descheduled, as well as the Arbitration and Shared&Host context. The Activity Change bit is to be cleared, therefore bit 29 will also be false.

C1. PC Value Entry (Word 1)
1. The PC for the contexts that are to be scheduled is the initial address at which the Arbitration common routine is stored in PMem: 0642h.
2. The PC Register RAM address for the first context (which is arbitration context's active context code) is 16h.
3. The number of contexts to schedule at this PC Address is 1, therefore, the number specified in the (Number of Contexts to Schedule) field must be 01h.
4. This is not the final PC Address Word, therefore the Final PC Address Word bit must be false.

C2. PC Value Entry (Word 2)
1. The PC for the contexts that are to be scheduled is the initial address at which the Shared&Host common routine is stored in PMem: 0825h.
2. The PC Register RAM address for the first context (which is the Shared&Host Context) is 0Bh.
3. The number of contexts to schedule at this PC Address is one, therefore, the number specified in the field must 01h.

4. This is the final PC Address word, therefore, the Final PC Address word bit must be true. Accordingly, it should be clear by this point that a series of PC Value Entry Words may be sequentially stored in the program and data memory (DMem) 1049, in contrast to the example of only one such word in FIG. 5B.

D. CP Register OR Mask Entry

1. The arbitration (bit 21) and the shared memory (bit 16) contexts are to be scheduled, therefore, the CP register OR Mask will contain those two bits true, while all other bits will be false.

Some special consideration is required in the handling of the nonscheduler bits in the timed context CP register 1204. These considerations are handled on a bit-by-bit basis as described below.

H2 Interrupt (Bit 23)—The H2 Interrupt line is preferably handled in the time enforcer routine. This bit will be set, when required by the CP Register OR Mask, which has been described above. The clearing of this interrupt line is done the instruction after the CP register bits are set in order to assure that the generation of the interrupt is not interpreted by H2 microprocessor 1014 as multiple interrupts. The clearing of this line is preferably done every time the timed context executes this routine.

Interrupt Vector (Bit 24)—This line is handled by the time enforcer routine. It will be initialized to its proper state either during the writing of the CP Register AND Mask (for clearing the interrupt vector so that it is in the zero state) or during the writing of the CP Register OR Mask (for setting the interrupt vector to a 1 state). This Interrupt Vector need only be altered when a H2 interrupt is to be generated. It should be left in the state of the last interrupt until it is rewritten.

Unprotect PC Register RAM (Bit 25)—This bit is set when the timed context is required to write to the PCs of the other contexts. This bit is an integral part of the time enforcer routine, so that the timed context can initialize contexts which are required to perform particular tasks. The setting and clearing of this bit is done independently from the AND mask and the OR mask which is provided in the timed context pseudo-queue.

HI/O Watchdog (Bit 26)—The HI/O Watchdog bit is ANDed with the H2 Watchdog bit and this result is an output signal from the HI/O Microprocessor 1012. The bit can be cleared by the CP Register AND Mask or set by the CP Register OR Mask. The determination of the conditions for the setting and clearing of the HI/O Watchdog bit is not the prerogative of the time enforcer.

Immobilize (Bit 27)—This bit is set when HI/O microprocessor 1012 is to load a program into PMem (program memory circuit 1032) of the H2 microprocessor 1014. The setting of the Immobilize bit will be handled concurrently with the setting of the other bits in the CP register by the CP register OR Mask. It will be cleared by the CP Register AND Mask.

Timeout (Bit 28)—This bit reflects the state of a timeout and is true if a timeout has occurred and false if a timeout has not occurred. This bit is read-only and therefore does not allow any software manipulation.

Activity Change (Bit 29)—As discussed above, the time enforcer routine bases its operation on timeouts and not on the asynchronous nature of an activity change (which indicates that a context has descheduled itself). Consequently, the manipulation of this bit is not necessary.

Received UTC Pulse (Bit 30)—The time enforcer software handles this bit the same as any of the other bits in the CP register (that is, it can be set or cleared with the CP register masks provided in the pseudo-queue). In the preferred embodiment the bit is set by a leading edge detected on an input pin of the HI/O processor.

H2 Reset (Bit 31)—This bit will be set, when required, by the CP Register OR Mask, which is described above. The setting of this bit will cause the H2 microprocessor 1014 to be reset (that is, H2 microprocessor will have its PC set to zero). The clearing of this reset line is done the instruction after the CP bits are set since this will cause the H2 microprocessor to reset. The clearing of this line is preferably done every time the timed context executes this routine. The H2 microprocessor should be Reset for a minimum of two instruction cycles.

Enable Sibling 1 Reset (Bit 32) and Enable Sibling 2 Reset (Bit 33)—These bits are set via the PC Register OR Mask when it is the intent to enable the reset of one or both of the sibling microprocessors.

The present invention has been described in an illustrative manner. In this regard, it is evident that those skilled in the art once given the benefit of the foregoing disclosure, may now make modifications to the specific embodiments described herein without department from the spirit of the present invention. Such modifications are to be considered within the scope of the present invention which is limited solely by the scope and spirit of the appended claims.

What is claimed is:

1. A dedicated context-cycling microprocessor comprising:

a plurality of input/output circuits for receiving and transmitting information;

a plurality of processing contexts each having an individual set of affiliated registers in which a distinct processing context is provided for each of said plurality of said input/output circuits, said processing contexts also including a time context for concurrently scheduling multiple processing contexts and enforcing time constraints associated with said schedule;

at least one computational unit for performing mathematical and/or logical functions;

a bus structure for transferring instructions and data with external memory devices; and multiplexer circuit for moving data between said input/output circuits, said dedicated registers and said computational unit, said multiplexer circuit having a move bus coupled to said bus structure, wherein said processing contexts include an idle state in which the context is waiting to be scheduled, an inactive state in which a scheduled context is waiting for an event to occur, a bidding state in which a scheduled context is competing for service and an active state in which the scheduled context has been granted the highest priority and is now executing a fetched instruction; and wherein a scheduler latch is provided for each of said processing contexts except for said timed context and a context purpose register is provided for said timed context, with each of said scheduler latches being mapped into said context purpose register for said timed context in order to schedule one or more of said processing contexts for service.

2. The invention according to claim 1 wherein each of said sets of dedicated registers includes at least one general purpose registers and a program counter.

3. The invention according to claim 2 wherein said timed context has access to at least the program counter of said dedicated registers in all of the other of said processing contexts.

4. The invention according to claim 1, wherein said microprocessor further includes a priority encoding circuit which ensures that more than one instruction of an active processing context must be executed before the active processing context is permitted to bid again for service.

5. The invention according to claim 1 wherein said processing contexts have preassigned priority levels and at least some high priority processing contexts are capable of lowering their own priority.

6. The invention according to claim 1 further comprising a local RAM, a program memory and at least said timed context has a pseudo-queue list whose pointers are stored in said local RAM, said pseudo-queue list representing an ordered set of pointers to data and program memory words to be used for scheduling said processing contexts.

7. The invention according to claim 1 wherein said input/output circuits include at least one serial and shared memory management unit comprised of a parallel-to-serial converter and a transmitter circuit which is capable of transmitting a plurality of serial word frames without any spaces between them, said serial and shared memory management unit having its own processing context.

8. The invention according to claim 7 wherein said input/output circuits also include a plurality of SCSI interfaces with each of said SCSI interfaces having its own programming context.

9. A common core computer comprising:
a first microprocessor;
a first private memory system connected to said first microprocessor;
a second microprocessor;
a second private memory system connected to said second microprocessor; and
a shared memory system connected to both said first and second microprocessors;
said second microprocessor including a plurality of input/output circuits for receiving and transmitting information with external communication devices and timing means for controlling the operation of said first microprocessor and access to said shared memory system, wherein said second microprocessor includes:
an individual set of dedicated registers for each of a plurality of processing contexts in which a distinct processing context is provided for each of a plurality of said input/output circuits, said processing contacts also including a timed context for concurrently scheduling multiple processing contexts and enforcing time constraints associated with said schedule;
at least one computational unit for performing mathematical and/or logical functions, said computation unit being coupled to at least one of said input/output circuits;
a bus structure for transferring instructions and data with said shared memory system and said second private memory system; and
multiplexer circuit means for moving data between said input/output circuits said dedicated registers and said computational unit said multiplexer circuit means having a move bus coupled to said bus structure.

10. The invention according to claim 9 wherein said first microprocessor has a Harvard architecture and said second microprocessor has an opcode width corresponding to a data word width of said first microprocessor.

11. The invention according claim 9 wherein at least some of said processing contexts have their own plurality of interrupt signal inputs.

12. The invention according to claim 9 wherein each of said sets of dedicated registers includes at least one general purpose register and a program counter.

13. The invention according to claim 12 wherein said timed context has access to at least the program counter of said dedicated registers in all of the other of said processing contexts.

14. The invention according to claim 9 wherein said processing context include an idle state in which the context is waiting to be scheduled, an inactive state in which a scheduled context is waiting for an event to occur, a bidding state in which a scheduled context is competing for service, and an active state in which the scheduled context has been granted the highest priority and is now executing a fetched instruction.

15. The invention according to claim 14 wherein said second microprocessor further includes a priority encoding circuit which ensures that than one instruction of an active processing context must be executed before the active processing context is permitted to bid again for service.

16. The invention according to claim 14 wherein said processing contexts have preassigned priority levels, which high priority processing contexts being capable of lowering their own priority.

17. The invention according to claim 14 wherein a scheduler latch is provided for each of said processing contexts except for said timed context, and a context purpose register is provided for said timed context, with each of said scheduler latches being mapped into said context purpose register for said timed context in order to schedule one or more of said processing contexts for service.

18. The invention according to claim 9 further comprising a local RAM, a program memory, and at least said timed context has a pseudo-queue list stored in said local RAM which represents an ordered set of pointers to data and program memory words to be used for scheduling said processing contexts.

19. The invention according to claim 9 wherein said input/output circuits include at least one serial and shared memory management unit comprising parallel-to-serial transmitter circuit which is capable of transmitting a plurality of serial word frames without deadtime, said serial and shared memory management unit having its own processing context.

20. The invention according to claim 19 wherein said input/output circuits also include a plurality of SCSI interfaces with each of said SCSI interfaces having its own programming context.

21. A method of processing input/output signals of different types by a computer, comprising:
defining a plurality of functional contexts corresponding to said different types of input/output signals;
configuring an input/output processor to have a dedicated program counter and at least one dedicated general purpose register for each of said functional contexts, said input/output processor being operable in synchronism with a system clock that defines a fundamental clock interval;
operating said input/output processor to cycle from one context to another such that one context is active during a given fundamental clock interval and such that that processing state of a first context is saved in the dedicated program counter and dedicated general purpose register of that first context while switching to process a second context by accessing the program counter of that second context; and
subdividing said fundamental clock interval into a first component and a second component that follows said first component, wherein the processing state of said first context is saved in the dedicated general purpose register of the first context during the first component of a first fundamental clock interval, and wherein the program counter of the second context is accessed in preparation to process the second context during the second component of the said first fundamental clock interval.

22. The method of claim 21 further comprising configuring a second processor to have a memory space that is shared with said input/output processor and using said input/output processor to communicate information about to said input/output signals to said second processor by storing said information as data in said shared memory space.

23. The method of claim 21 further comprising configuring a second processor to have a memory space that is shared with said input/output processor and using said input/output processor to supply timing information to said second processor.

24. The method of claim 21 wherein said plurality of contexts includes a timed context that oversees the order in which context switching is performed.

25. The method of claim 21 wherein said functional contexts are assigned different priorities and wherein said step of operating said input/output processor is performed by selecting said second context based on priority bidding.

26. A multi-protocol data processing computer for communicating with multiple processes comprising:

an input/output (I/O) processor for communicating with multiple processes using different protocols;

said I/O processor having context cycling system for defining a plurality of independent operating-state contexts, each context devoted to one of said protocols;

said context cycling system having a plurality of program counter registers and a plurality of general purpose registers each dedicated to said contexts such that each context has its own program counter register and its own general purpose registers;

said context cycling system having priority encoder for selecting one of said contexts as the operative context, such that the program counter register and general purpose registers of the operative context are identified to said I/O processor as the operative program counter register and the operative general purpose registers and the remaining program counter registers and general purpose registers are treated by said I/O processor as inoperative;

said I/O processor communicating with one of said multiple processes by accessing the operative program counter register and the operative general purpose registers, such that communication is effected in accordance with the operative context;

said I/O processor saving the state of the contexts not selected as operative by leaving the contents of the inoperative program counters and general purpose registers unchanged while communication is effected in accordance with the operative context.

27. A multi-protocol multiprocessor data processing system for communicating with and controlling multiple processes comprising:

an input/output (I/O) processor for communicating with multiple processes using different protocols, said I/O processor having first private memory accessed by said I/O processor in communicating with said multiple processes;

a second processor for executing process control instructions to control said multiple processes, said second processor having second private memory accessed by said second processor in executing process control instructions;

a shared memory separate from said first and second private memories and accessed by both said I/O processor and said second processor for establishing communication between said I/O processor and said second processor;

said I/O processor having context cycling system for defining a plurality of independent operating-state contexts, each context devoted to one of said protocols;

said context cycling system having a plurality of program counter registers and a plurality of general purpose registers each dedicated to said contexts such that each context has its own program counter register and its own general purpose registers;

said context cycling system having priority encoder for selecting one of said contexts as the operative context, such that the program counter register and general purpose registers of the operative context are identified to said I/O processor as the operative program counter register and the operative general purpose registers and the remaining program counter registers and general purpose registers are treated by said I/O processor as inoperative;

said I/O processor communicating with one of said multiple processes by accessing the operative program counter register and the operative general purpose registers, such that communication is effected in accordance with the operative context;

said I/O processor saving the state of the contexts not selected as operative by leaving the contents of the inoperative program counters and general purpose registers unchanged while communication is effected in accordance with the operative context.

* * * * *